(12) United States Patent
Kihara et al.

(10) Patent No.: US 11,992,150 B2
(45) Date of Patent: May 28, 2024

(54) APPARATUS, METHOD, PROGRAM AND SYSTEM

(71) Applicant: DAITO GIKEN, INC., Tokyo (JP)

(72) Inventors: Kaishun Kihara, Tokyo (JP); Taisuke Torizu, Tokyo (JP)

(73) Assignee: DAITO GIKEN, INC., Tokyo (JP)

( * ) Notice: Subject to any disclaimer, the term of this patent is extended or adjusted under 35 U.S.C. 154(b) by 796 days.

(21) Appl. No.: 17/262,943

(22) PCT Filed: Aug. 2, 2019

(86) PCT No.: PCT/JP2019/030544
§ 371 (c)(1),
(2) Date: Jan. 25, 2021

(87) PCT Pub. No.: WO2020/031906
PCT Pub. Date: Feb. 13, 2020

(65) Prior Publication Data
US 2021/0307559 A1 Oct. 7, 2021

(30) Foreign Application Priority Data
Aug. 7, 2018 (JP) ................................ 2018-148568

(51) Int. Cl.
*A47J 31/52* (2006.01)
*A47J 31/18* (2006.01)
*A47J 31/36* (2006.01)
*G06T 7/00* (2017.01)

(52) U.S. Cl.
CPC ............ *A47J 31/525* (2018.08); *A47J 31/18* (2013.01); *A47J 31/36* (2013.01); *G06T 7/0004* (2013.01); *G06T 2207/30128* (2013.01)

(58) Field of Classification Search
CPC .......... A47J 31/18; A47J 31/36; A47J 31/521; A47J 31/525; G01B 11/022; G06T 2207/30128; G06T 7/0004
See application file for complete search history.

(56) References Cited

U.S. PATENT DOCUMENTS

| | | |
|---|---|---|
| 2012/0285986 A1 | 11/2012 | Irvin |
| 2014/0282198 A1 | 9/2014 | Mayworm |
| 2016/0174590 A1 | 6/2016 | Boggavarapu |

(Continued)

FOREIGN PATENT DOCUMENTS

| | | |
|---|---|---|
| CN | 101510093 A | 8/2009 |
| CN | 102188155 A | 9/2011 |

(Continued)

OTHER PUBLICATIONS

Sep. 3, 2019 International Search Report issued in International Patent Application No. PCT/JP2019/030544.

(Continued)

*Primary Examiner* — Dana Ross
*Assistant Examiner* — Joe E Mills, Jr.
(74) *Attorney, Agent, or Firm* — Oliff PLC

(57) ABSTRACT

An apparatus estimates a property of an ingredient of a beverage based on photograph data of the ingredient of the beverage. An apparatus obtains photograph data of an ingredient of a beverage used for preparation of the beverage, and estimates a property of the ingredient of the beverage based on the obtained photograph data.

8 Claims, 35 Drawing Sheets

(56) References Cited

U.S. PATENT DOCUMENTS

| | | | |
|---|---|---|---|
| 2017/0215632 A1 | 8/2017 | Tinkler et al. | |
| 2018/0000108 A1* | 1/2018 | Boggavarapu | A47J 31/5251 |
| 2018/0129379 A1 | 5/2018 | Suh | |

FOREIGN PATENT DOCUMENTS

| | | |
|---|---|---|
| CN | 106136907 A | 11/2016 |
| CN | 106361154 A | 2/2017 |
| EP | 2085000 A1 | 8/2009 |
| JP | 2016-123303 A | 7/2016 |
| JP | 2016-521139 A | 7/2016 |
| JP | 2018-25419 A | 2/2018 |
| JP | 6312052 B2 | 4/2018 |
| KR | 10-2015-0015850 A | 2/2015 |
| KR | 20-2017-0000902 U | 3/2017 |
| WO | 2014/164903 A2 | 10/2014 |

OTHER PUBLICATIONS

May 23, 2022 Office Action issued in Chinese Patent Application No. 201980052454.4.
Aug. 5, 2021 Search Report issued in European Patent Application No. 19847124.5.
Feb. 9, 2021 International Preliminary Report on Patentability issued in International Patent Application No. PCT/JP2019/030544.
Feb. 1, 2024 Request for the Submission of an Opinion issued in Korean Patent Application No. 10-2020-7035641.

\* cited by examiner

| | | |
|---|---|---|
| 2501 | IDENTIFICATION INFORMATION | 0001 |
| 2502 | CONTOUR SHAPE | 0.49 |
| 2503 | CENTER CUT LENGTH | 13.0mm |
| 2504 | CENTER CUT WIDTH | 1.6mm |
| 2505 | CENTER CUT END WIDTH | 2.2mm |
| 2506 | SCREEN SIZE | 6.4mm |
| 2507 | CENTER CUT SHAPE | 0.73 |
| 2508 | COLOR | Dark Brown |

Fig. 27

| | | |
|---|---|---|
| 2701 | UserAAAA | |
| 2702 | Bean0001 | |
| 2703 | CONTOUR SHAPE | 0.69 |
| 2704 | CENTER CUT LENGTH | 12.0mm |
| 2705 | CENTER CUT WIDTH | 2.0mm |
| 2706 | CENTER CUT END WIDTH | 2.1mm |
| 2707 | SCREEN SIZE | 8.3mm |
| 2708 | CENTER CUT SHAPE | 0.95 |
| 2709 | COLOR | Dark Brown |
| 2710 | Bean0002 | |
| 2711 | CONTOUR SHAPE | 0.58 |
| 2712 | CENTER CUT LENGTH | 11mm |
| 2713 | CENTER CUT WIDTH | 2.0mm |
| 2714 | CENTER CUT END WIDTH | 3.2mm |
| 2715 | SCREEN SIZE | 6.4mm |
| 2716 | CENTER CUT SHAPE | 0.63 |
| 2717 | COLOR | Brown |

⋮

APPARATUS, METHOD, PROGRAM AND SYSTEM

TECHNICAL FIELD

The present invention relates to an apparatus, a method and a program that can be used in a system including a beverage making apparatus, and the system.

BACKGROUND ART

Patent Literature 1 describes that sampling evaluation of a roasting process can be achieved with a camera, rather than by conventional visual observation. Patent Literature 2 describes that once a model coffee beverage is selected, properties of the model coffee beverage are converted to brew parameters. It is also described that the brew parameters include a size distribution of ground coffee beans. Patent Literature 3 describes whether a coffee bean satisfies selection conditions is analyzed based on an image of the coffee bean. It is also described that the selection conditions include flavor, cost, breed and size, in addition to whether the coffee bean is bad or not.

CITATION LIST

Patent Literature

Patent Literature 1
  Japanese Patent Laid-Open No. 2016-123303
Patent Literature 2
  Japanese Patent Laid-Open No. 2016-521139
Patent Literature 3
  Japanese Patent No. 6312052

SUMMARY OF INVENTION

Technical Problem

However, any of Patent Literatures does not make a mention of estimating a property of an ingredient of a beverage based on photograph data of the ingredient of the beverage.

An object of the present invention is to provide an apparatus, a method, a program, and a system for estimating a property of an ingredient of a beverage based on photograph data of the ingredient of the beverage.

Solution to Problem

An apparatus according to the present invention includes photograph data obtaining means for obtaining photograph data of an ingredient of a beverage used for preparation of the beverage, and estimation means for estimating a property of the ingredient of the beverage based on the photograph data obtained by the photograph data obtaining means.

Advantageous Effects of Invention

According to the present invention, a property of an ingredient of a beverage can be estimated based on photograph data of the ingredient of the beverage.

BRIEF DESCRIPTION OF THE DRAWINGS

FIG. 27 is a diagram showing feature values of each group classified.

DESCRIPTION OF EMBODIMENTS

Figure 1:
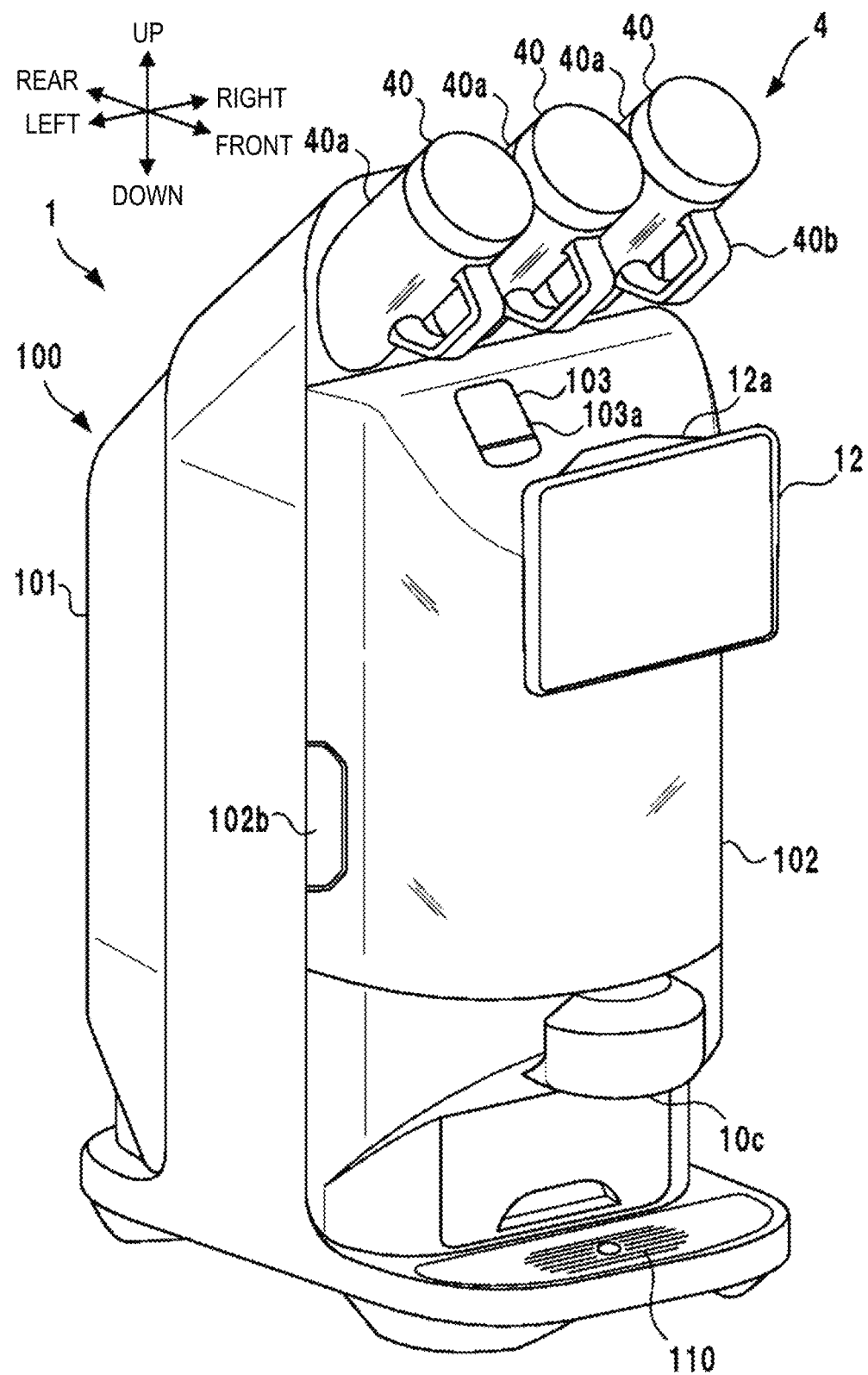
FIG. 1 is a diagram showing an appearance of a beverage making apparatus.

Embodiments of the present invention will be described with reference to the drawings. Like components are denoted by like reference numerals, and descriptions thereof will be omitted.

<1. Overview of Beverage Making Apparatus>

FIG. 1 shows an appearance of a beverage making apparatus 1. The beverage making apparatus 1 according to an embodiment is an apparatus that automatically produces a coffee beverage from roasted coffee beans and a liquid (water in this example). The apparatus can produce a cup of coffee beverage in one production operation. Roasted coffee beans as an ingredient can be stored in a canister 40. The beverage making apparatus 1 has a cup mount 110 provided in a lower part thereof, and the produced coffee beverage is poured into a cup from a pouring part 10c.

The beverage making apparatus 1 includes a housing 100 that forms an outer casing of the apparatus 1 and encloses an internal mechanism of the apparatus 1. The housing 100 is generally divided into a main body part 101 and a cover part 102 that forms a part of the front face and a part of the side faces of the beverage making apparatus 1. The cover part 102 is provided with an information display device 12. In this embodiment, the information display device 12 is a touch-panel display, and can display various types of information and receive inputs from an administrator of the apparatus or a consumer of the beverage. The information display device 12 is attached to the cover part 102 by a movement mechanism 12a, which allows the information display device 12 to move in the up-down direction within a certain range.

The cover part 102 is further provided with a bean inlet 103 and a door 103a that opens and closes the bean inlet 103. The opening and closing door 103 can be opened to input a different type of roasted coffee beans than the roasted coffee beans stored in the canister 40. In this way, a special cup of beverage can be provided to the beverage consumer.

In this embodiment, the cover part 102 is made of a material having a transparency, such as acrylic or glass, and forms a transparent cover the whole of which is transparent. Therefore, the internal mechanism covered by the cover part 102 is visible from outside. In this embodiment, a part of a production part that produces the coffee beverage is visible through the cover part 102. In this embodiment, the whole of the main body part 101 is nontransparent, the mechanism in the main body part 101 is difficult to see from outside.

Figure 2:
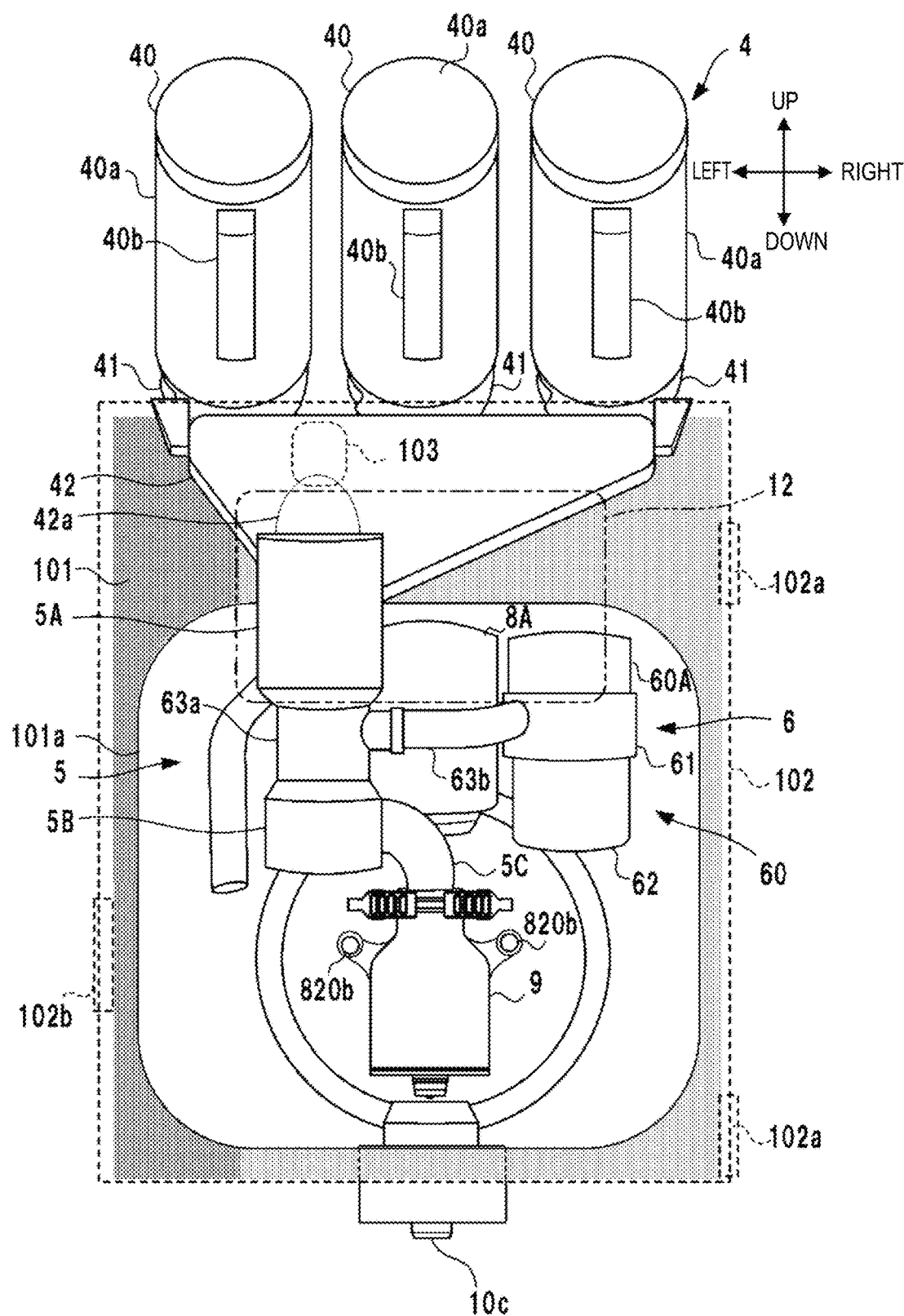
FIG. 2 is a partial front view of the beverage making apparatus in FIG. 1.

FIG. 2 is a partial front view of the beverage making apparatus 1, which shows a part of the production part that can be seen by a user from the front of the beverage making apparatus 1. The cover part 102 and the information display device 12 are shown by imaginary lines.

On the front of the beverage making apparatus 1, the housing 100 has a double-layer structure formed by the main body part 101 and the cover part 102 on the outer side (front side) thereof. A part of the mechanism of the production part is arranged between the main body part 101 and the cover part 12 in the front-rear direction, and is visible to the user through the cover part 102.

In this embodiment, the part of the mechanism of the production part that is visible to the user through the cover part 102 includes a gathering and conveying part 42, grinders 5A and 5B, a separating device 6, and an extraction vessel 9 described later, for example. In the front of the main body part 101, a rectangular recess part 101a, which is recessed toward the rear of the main body part 101, is formed, and the extraction vessel 9 and the like are positioned toward the rear in the recess part 101a.

Since these components are visible from outside through the cover part 102, the administrator can easily perform inspections and operational checks. In addition, the consumer can enjoy seeing the process of producing the coffee beverage.

The cover part 102 is attached to the main body part 101 via a hinge 102a at the right edge thereof so that the cover part 102 can be horizontally opened and closed. The cover part 102 has, at the left edge thereof, an engaging part 102b for maintaining the main body part 101 closed with the cover part 102. The engaging part 102b is a combination of a magnet and a piece of iron, for example. The administrator can open the cover part 102 to perform an inspection or the like of the part of the production part inside the cover part 102 described above.

In this embodiment, the cover part 102 has been described as being horizontally opened. However, the cover part 102 may be of a vertical opening type or a sliding type. The cover part 102 may be unable to be opened.

Figure 3:
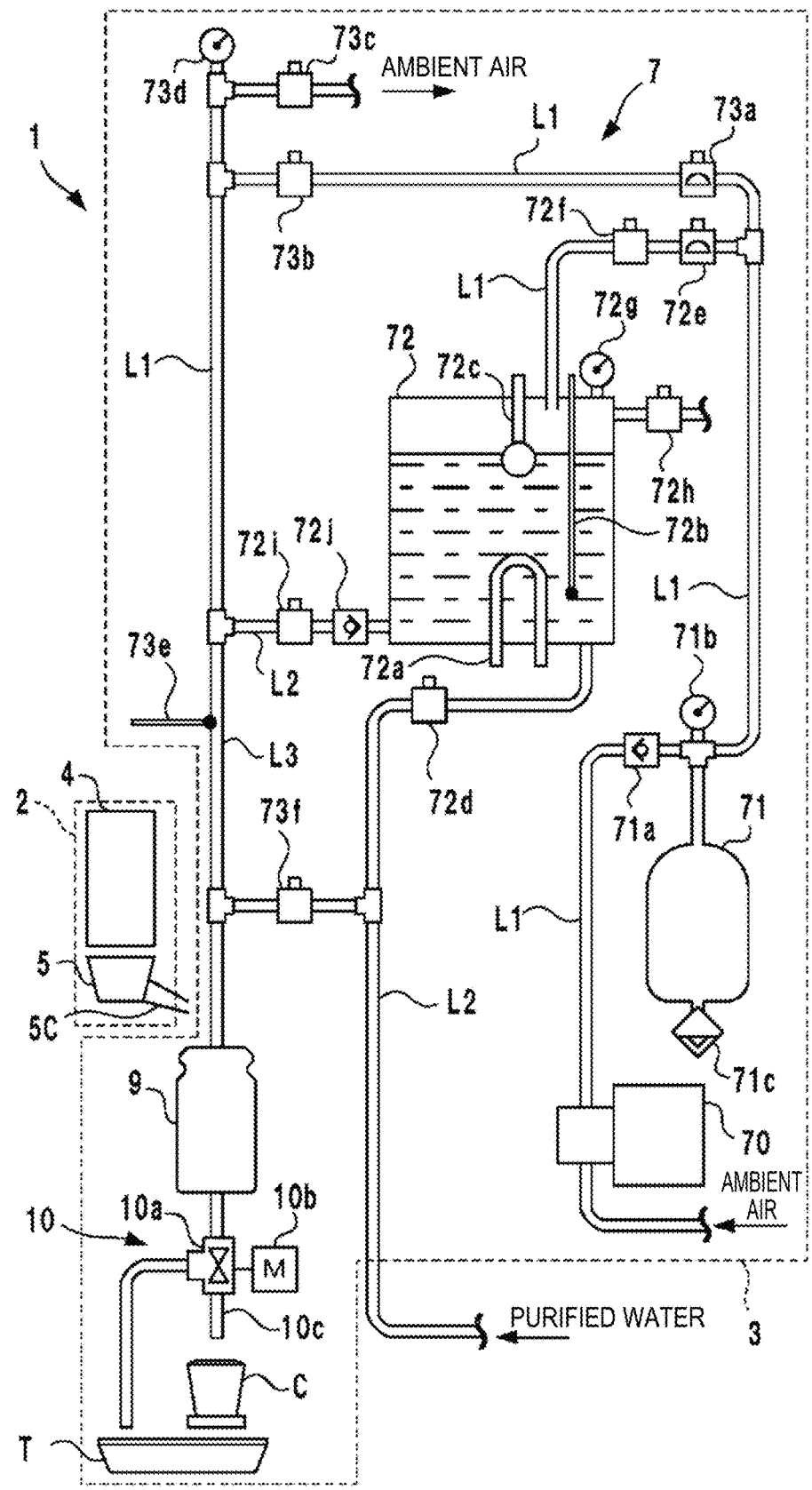
FIG. 3 is a schematic diagram for illustrating a function of the beverage making apparatus in FIG. 1.

FIG. 3 is a schematic diagram for illustrating a function of the beverage making apparatus 1. The beverage making apparatus 1 includes a bean processing device 2 and an extraction device 3 as the coffee beverage production part.

The bean processing device 2 produces ground beans from roasted coffee beans. The extraction device 3 extracts coffee liquid from the ground beans supplied from the bean processing device 2. The extraction device 3 includes a fluid supply unit 7, a drive unit 8 described later, the extraction vessel 9, and a switch unit 10. The ground beans supplied from the bean processing device 2 are input to the extraction vessel 9. The fluid supply unit 7 inputs hot water to the extraction vessel 9. In the extraction vessel 9, coffee liquid is extracted from the ground beans. Hot water containing the extracted coffee liquid is delivered into a cup C as a coffee beverage via the switch unit 10.

<2. Fluid Supply Unit and Switch Unit>

Configurations of the fluid supply unit 7 and the switch unit 10 will be described with reference to FIG. 3. First, the fluid supply unit 7 will be described. The fluid supply unit 7 supplies hot water to the extraction vessel 9 and controls the air pressure in the extraction vessel 9, for example. In this specification, any numeric value of the air pressure means an absolute pressure unless otherwise specified, and a gauge pressure means a pressure provided that the atmospheric pressure is 0 atmosphere. The term "atmospheric pressure" means the air pressure of the surroundings of the extraction vessel 9 or the air pressure around the beverage making apparatus. For example, when the beverage making apparatus is located at sea level, the atmospheric pressure is the standard atmosphere (1013.25 hPa) at sea level of International Standard Atmosphere (ISA) defined in 1976 by International Civil Aviation Organization (ICAO).

The fluid supply unit 7 includes systems of piping L1 to L3. The piping L1 is piping in which air flows, and the piping L2 is piping in which water flows. The piping L3 is piping in which both air and water can flow.

The fluid supply unit 7 includes a compressor 70 as a pressure source. The compressor 70 compresses and delivers air. The compressor 70 is driven by a drive source, such as a motor (not shown). The compressed air delivered from the compressor 70 is supplied to a reserve tank (accumulator) 71 via a check valve 71a. The air pressure in the reserve tank 71 is monitored by a pressure sensor 71b, and the compressor 70 is driven so as to keep the air pressure in the reserve tank 71 at a predetermined air pressure (7 atmospheres (a gauge pressure of 6 atmospheres) in this embodiment). The reserve tank 71 includes a drain 71c for drainage, through which water resulting from the compression of air can be discharged.

A water tank 72 stores hot water (water) used as an ingredient of the coffee beverage. The water tank 72 is provided with a heater 72a that heats the water in the water tank 72 and a temperature sensor 72b that measures the temperature of the water. The heater 72a maintains the temperature of the stored hot water at a predetermined temperature (120° C. in this embodiment) based on the result of detection by the temperature sensor 72b. For example, the heater 72a is turned on when the temperature of the hot water decreases to 118° C. and turned off when the temperature of the hot water increases to 120° C.

The water tank 72 is also provided with a water level sensor 72c. The water level sensor 72c detects the water level of the hot water in the water tank 72. When the water level sensor 72c detects that the water level is lower than a predetermined water level, water is supplied to the water tank 72. In this embodiment, tap water is supplied via a water purifier (not shown). The piping L2 from the water purifier is provided with a solenoid valve 72d at a midpoint. When the water level sensor 72c detects a drop of the water level, the solenoid valve 72d is opened to supply water, and when a predetermined water level is reached, the solenoid valve 72d is closed to stop the supply of water. In this way, the hot water in the water tank 72 is kept at a certain water level. Water supply to the water tank 72 may be performed each time hot water is discharged to produce a cup of coffee beverage.

The water tank 72 is also provided with a pressure sensor 72g. The pressure sensor 72g detects the air pressure in the water tank 72. The air pressure in the reserve tank 71 is supplied to the water tank 72 via a relief valve 72e and a solenoid valve 72f. The relief valve 72e decreases the air pressure supplied from the reserve tank 71 to a predetermined air pressure. In this embodiment, the relief valve 72e decreases the air pressure to 3 atmospheres (a gauge pressure of 2 atmospheres). The solenoid valve 72f switches between allowing and not allowing the air pressure regulated by the relief valve 72e to be supplied to the water tank 72. The solenoid valve 72f is controlled to be opened and closed to maintain the air pressure in the water tank 72 at 3 atmospheres except when tap water is supplied to the water tank 72. When supplying tap water to the water tank 72, the air pressure in the water tank 72 is reduced with a solenoid valve 72h to a pressure (a pressure lower than 2.5 atmospheres, for example) lower than the water pressure of the tap water so that the water tank 72 is smoothly replenished with the tap water under the water pressure of the tap water. The solenoid valve 72h switches between opening and not opening the water tank 72 to the ambient air, and opens the water tank to the ambient air when reducing the air pressure in the water tank 72. The solenoid valve 72h opens the water tank 72 to the ambient air to maintain the interior of the water tank 72 at 3 atmospheres not only when tap water is supplied to the water tank 72 but also when the air pressure in the water tank 72 is higher than 3 atmospheres.

The hot water in the water tank 72 is supplied to the extraction vessel 9 via a check valve 72j, a solenoid valve 72i and the piping L3. The hot water is supplied to the extraction vessel 9 when the solenoid valve 72i is opened, and the supply of the hot water is stopped when the solenoid valve 72i is closed. The amount of the hot water supplied to the extraction vessel 9 can be controlled by adjusting the open time of the solenoid valve 72i. However, the amount of the supplied hot water may be measured to control the opening and closing of the solenoid valve 72i. The piping L3 is provided with a temperature sensor 73e that measures the temperature of hot water, and the temperature of the hot water supplied to the extraction vessel 9 is monitored.

The air pressure in the reserve tank 71 is supplied to the extraction vessel 9 via a relief valve 73a and a solenoid valve 73b. The relief valve 73a reduces the air pressure supplied from the reserve tank 71 to a predetermined air pressure. In this embodiment, the relief valve 73a reduces the air pressure to 5 atmospheres (a gauge pressure of 4 atmospheres). The solenoid valve 73b switches between allowing and not allowing the air pressure regulated by the relief valve 73a to be supplied to the extraction vessel 9. The air pressure in the extraction vessel 9 is detected by a pressure sensor 73d. When pressurizing the extraction vessel 9, the solenoid valve 73b is opened based on the detection result from the pressure sensor 73d to pressurize the extraction vessel 9 to a predetermined air pressure (up to 5 atmospheres (a gauge pressure of 4 atmospheres) in this embodiment). The air pressure in the extraction vessel 9 can be reduced with a solenoid valve 73c. The solenoid valve 73c switches between opening and closing the extraction vessel 9 to the ambient air, and opens the extraction vessel 9 to the ambient air when an abnormal pressure occurs in the extraction vessel 9 (such as when the pressure in the extraction vessel 9 is higher than 5 atmospheres).

Each time the production of a cup of coffee beverage ends, in this embodiment, the interior of the extraction vessel 9 is cleaned with tap water. When performing the cleaning, the solenoid valve 73f is opened to supply tap water to the extraction vessel 9.

Next, the switch unit 10 will be described. The switch unit 10 is a unit that switches the destination of the liquid delivered from the extraction vessel 9 between the pouring part 10c and a waste tank T. The switch unit 10 includes a switch valve 10a and a motor 10b that drives the switch valve 10a. When delivering the coffee beverage from the extraction vessel 9, the switch valve 10a switches the flow channel to the pouring part 10c. Then, the coffee beverage is poured into the cup C from the pouring part 10c. When discharging the waste liquid (tap water) used for the cleaning and the residue (ground beans), the switch valve 10a switches the flow channel to the waste tank T. In this embodiment, the switch valve 10a is a 3-port ball valve. Since the residue passes through the switch valve 10a during the cleaning, the switch valve 10a is preferably a ball valve. The motor 10b rotates a rotating shaft of the ball valve to switch the flow channel.

<3. Bean Processing Device>

With reference to FIGS. 1 and 2, the bean processing device 2 will be described. The bean processing device 2 includes a storage device 4 and a grinding device 5.

<3-1. Storage Device>

The storage device 4 includes a plurality of canisters 40 that store roasted coffee beans. In this embodiment, three canisters 40 are provided. The canister 40 includes a cylindrical main body 40a that stores roasted coffee beans and a handle 40b provided on the main body 40a. The canister 40 is configured to be removable from the beverage making apparatus 1.

Each canister 40 may store a different type of roasted coffee beans so that the type of roasted coffee beans used to produce a coffee beverage can be selected by an input operation on the information display device 12. The different types of roasted coffee beans may be different breeds of roasted coffee beans, for example. The different types of roasted coffee beans may be the same breed of coffee beans roasted to different roasting degree. The different types of roasted coffee beans may be different breeds of coffee beans roasted to different roasting degree. At least any one of the three canisters 40 may store a mixture of a plurality of breeds of roasted coffee beans. In the latter case, the breeds of roasted coffee beans may be roasted to the same roasting degree.

Although a plurality of canisters 40 is provided in this embodiment, only one canister 40 may be provided. When a plurality of canisters 40 are provided, all or some of the plurality of canisters 40 may store the same type of roasted coffee beans.

Each canister 40 is removably mounted on a metering and conveying device 41. The metering and conveying device 41 is an electric screw conveyor, for example, and automatically measures out a predetermined amount of roasted coffee beans stored in the canister 40 and delivers the roasted coffee beans downstream.

Each metering and conveying device 41 discharges the roasted coffee beans to a gathering and conveying part 42 located downstream thereof. The gathering and conveying part 42 is formed by a hollow member and forms a conveyance channel for roasted coffee beans from each conveyor 41 to the grinding device 5 (the grinder 5A, in particular). The roasted coffee beans discharged from each metering and conveying device 41 move in the gathering and conveying part 42 under their own weight, and flow down into the grinding device 5.

In the gathering and conveying part 42, a guide part 42a is formed at a location corresponding to the bean inlet 103. The guide part 42a forms a channel that guides the roasted coffee beans input to the bean inlet 103 to the grinding device 5 (the grinder 5A, in particular). This allows production of a coffee beverage containing not only the roasted coffee beans stored in the canisters 40 but also roasted coffee beans input to the bean inlet 103 as an ingredient.

<3-2. Gridding Device>

Figure 4:
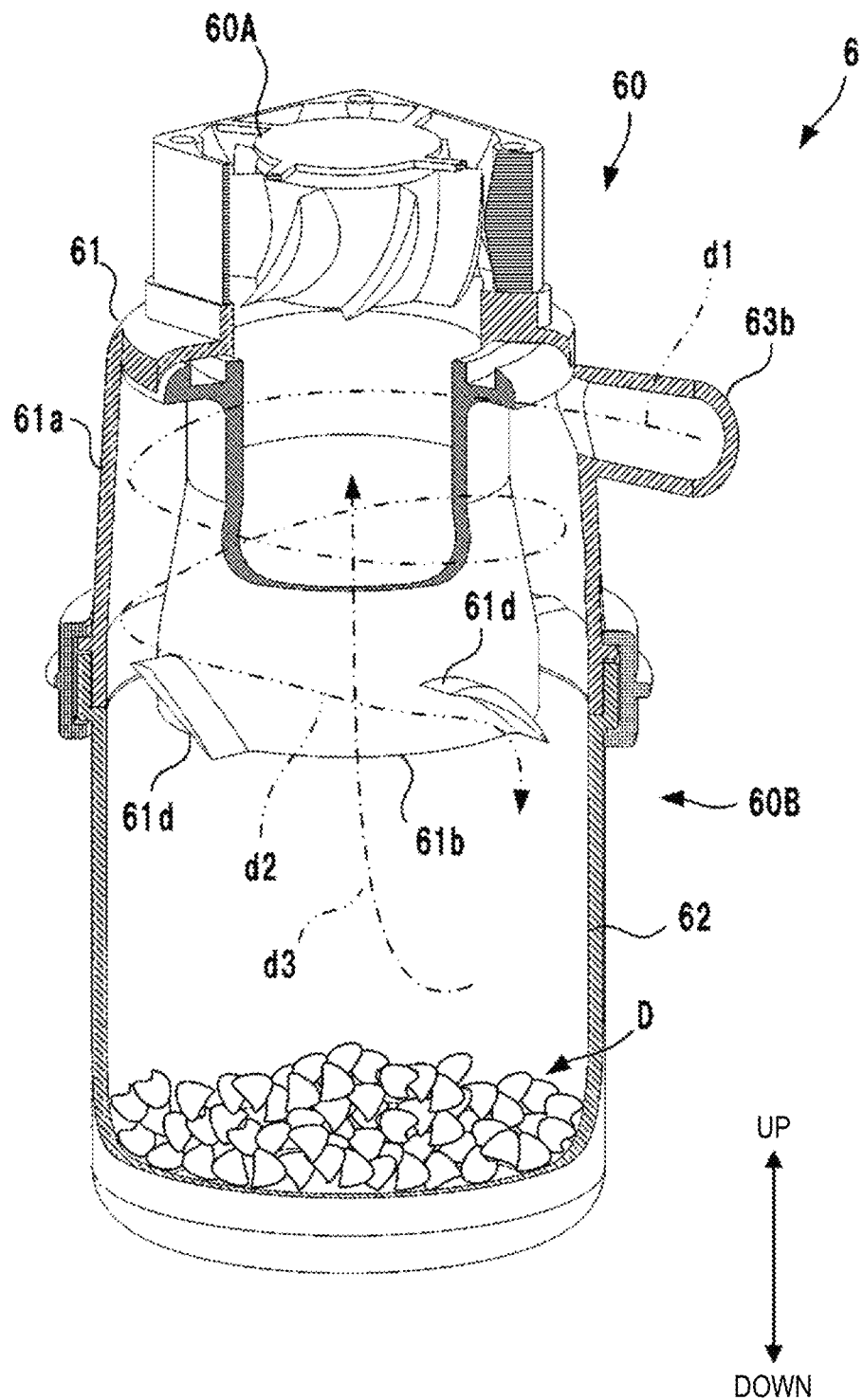
FIG. 4 is a partially cut-away perspective view of a separating device.

With reference to FIGS. 2 and 4, the grinding device 5 will be described. FIG. 4 is a partially cut-away perspective view of the separating device 6. The grinding device 5 includes the grinders 5A and 5B and the separating device 6. The grinders aA and 5B are a mechanism that grinds roasted coffee beans supplied from the storage device 4. The roasted coffee beans supplied from the storage device 4 are first ground by the grinder aA, then further ground into powder by the grinder 5B, and then input to the extraction vessel 9 through a discharge pipe 5C.

The grinders aA and 5B differ in grind size. The grinder aA is a grinder for coarse grinding, and the grinder 5B is a grinder for fine grinding. The grinders aA and 5B are electric grinders, and include a motor as a drive source and a rotary blade or the like driven by the motor. The size (grind size) of the roasted coffee beans ground can be changed by changing the number of revolutions of the rotary blade.

The separating device 6 is a mechanism that separates an unwanted matter from the ground beans. The separating device 6 includes a channel part 63a arranged between the grinder 5A and the grinder 5B. The channel part 63a is a hollow body that forms a separating chamber through which the ground beans falling freely from the grinder 5A. To the channel part 63a, a channel part 63b extending in a direction (the left-right direction in this embodiment) intersecting with the direction (the up-down direction in this embodiment) of passage of the ground beans is connected, and a suction unit 60 is connected to the channel part 63b. The suction unit 60 sucks in the air in the channel part 63a, thereby sucking in light matters, such as chaff or fine powder. In this way, unwanted matters can be separated from the ground beans.

The suction unit 60 is a centrifugal separation mechanism. The suction unit 60 includes a blower unit 60A and a collecting vessel 60B. In this embodiment, the blower unit 60A is a fan motor, and discharges the air in the collecting vessel 60B upward.

The collecting vessel 60B includes an upper part 61 and a lower part 62 that are separably engaged with each other. The upper part 62 has the shape of a cylinder with an open top and a closed bottom, and defines a space for storing unwanted matters. The upper part 61 forms a lid part attached to the opening of the lower part 62. The upper part 61 includes an outer wall 61a having a cylindrical shape, and an exhaust pipe 61b formed coaxially with the outer wall 61a. The blower unit 60A is fixed to the upper part 61 above the exhaust pipe 61b so as to suck in the air in the exhaust pipe 61b. The channel part 63b is connected to the upper part 61. The channel part 63b opens at the side of the exhaust pipe 61b.

When the blower unit 60A is activated, airflows indicated by arrows d1 to d3 in FIG. 4 are caused. By the airflows, air containing unwanted matters is sucked from the channel part 63a into the collecting vessel 60B through the channel part 63b. Since the channel part 63b opens at the side of the exhaust pipe 61b, the air containing unwanted matters swirls round the exhaust pipe 61b. Unwanted matters D fall under their own weight and are collected at a part of the collecting vessel 60B (that is, accumulated on the bottom face of the lower part 62). The air is discharged upward through inside the exhaust pipe 61b.

A plurality of fins 61d are integrally formed on a circumferential face of the exhaust pipe 61b. The plurality of fins 61d are arranged in the circumferential direction of the exhaust pipe 61b. Each fin 61d is inclined with respect to the axial direction of the exhaust pipe 61b. The fins 61 provided in this way promote the swirl of the air containing the unwanted matters D around the exhaust pipe 61b.

In this embodiment, the lower part 62 is made of a transparent material, such as acrylic or glass, and forms a transparent vessel the whole of which is transparent. The lower part 62 is covered with the cover part 102 (FIG. 2). The administrator or the beverage consumer can see the unwanted matters D accumulated in the lower part 62 through the circumferential walls of the cover part 102 and the lower part 62. The administrator can easily determine the timing to clean the lower part 62, and the beverage consumer can feel assured about the quality of the coffee beverage being produced by seeing that unwanted matters D have been cleaned off.

In this embodiment, as described above, the roasted coffee beans supplied from the storage device 4 are first coarsely ground by the grinder 5A, and the separating device 6 separates unwanted matters from the coarsely ground beans while the beans are passing through the channel part 63a. The coarsely ground beans from which unwanted matters have been removed are then finely ground by the grinder 5B. The unwanted matters separated by the separating device 6 mainly include chaff and fine powder. These unwanted matters may ruin the flavor of the coffee beverage, and the quality of the coffee beverage can be improved by removing the chaff and the like from the ground beans.

The roasted coffee beans may be ground by one grinder (that is, in one grinding step). However, if the roasted coffee beans are ground in two steps by the two grinders 5A and 5B, the beans can be more easily ground to a uniform grind size, and the coffee liquid can be more uniformly extracted. While grinding beans, a frictional heat may be generated between the cutter and the beans. The two-step grinding can reduce the frictional heat and prevent deterioration (such as in flavor) of the ground beans.

In addition, since the process begins with the coarse grinding, continues with the separation of unwanted matters and ends with the fine grinding, the difference in weight between the unwanted matters and the ground beans (required matter) can be made large when the unwanted matters such as chaff are separated. Therefore, the efficiency of separation of the unwanted matters can be increased, and the ground beans (required matter) can be prevented from being separated as unwanted matters. In addition, since the step of separation of unwanted matters by means of air suction is performed between the coarse grinding and the fine grinding, the ground beans can be cooled by air and prevented from generating heat.

<4. Drive Unit and Extraction Vessel>

<4-1. Overview>

Figure 5:
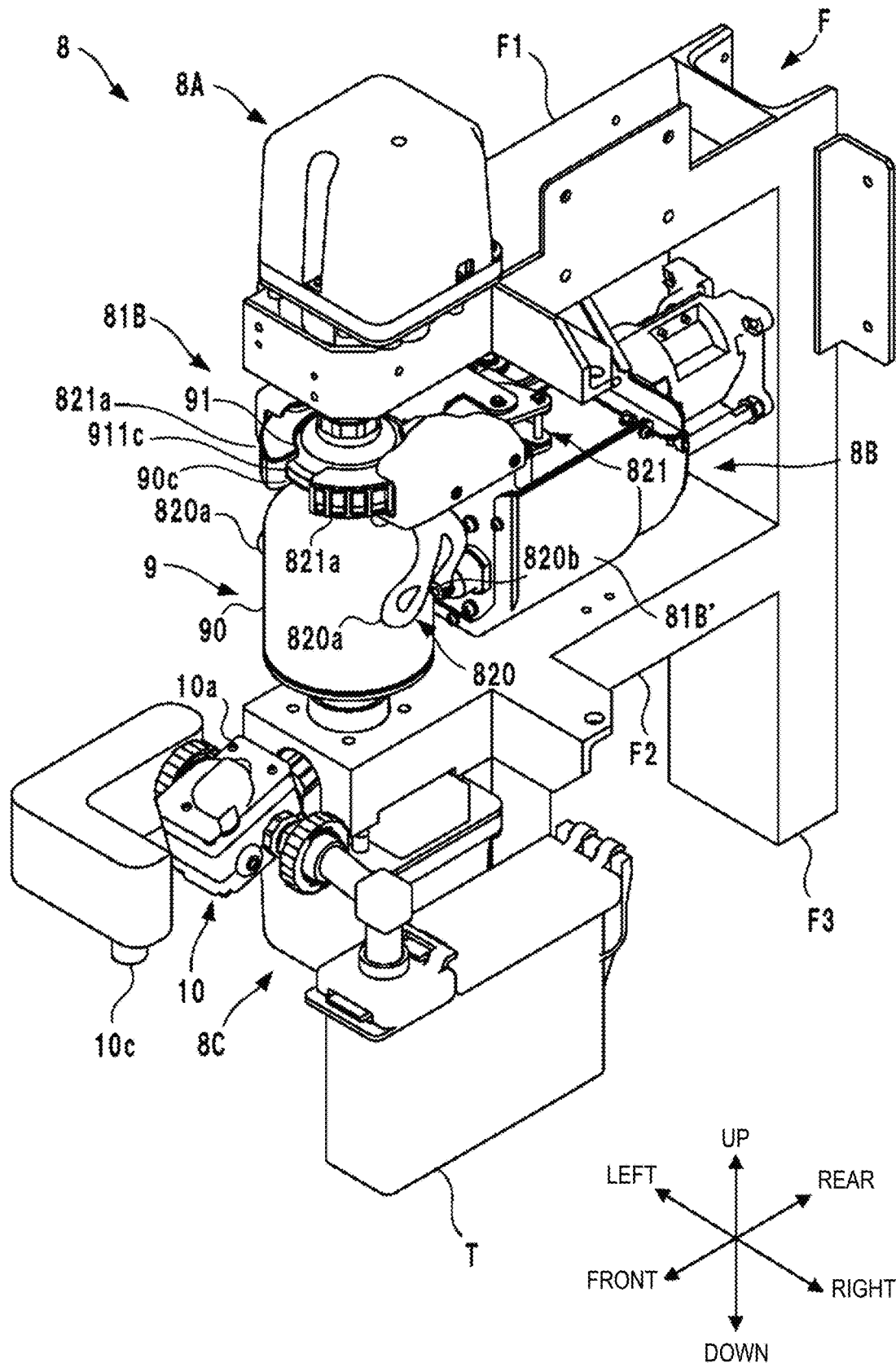
FIG. 5 is a perspective view of a drive unit and an extraction vessel.

With reference to FIG. 5, the drive unit 8 and the extraction vessel 9 of the extraction device 3 will be described. FIG. 5 is a perspective view of the drive unit 8 and the extraction vessel 9. A large part of the drive unit 8 is enclosed with the main body part 101.

The drive unit 8 is supported by a frame F. The frame F includes upper and lower beam parts F1 and F2 and a column part F3 that supports the beam parts F1 and F2. The drive unit 8 is generally divided into three units, an upper unit 8A, a middle unit 8B and a lower unit 8C. The upper unit 8A is supported by the beam part F1. The middle unit 8B is supported by the beam part F1 and the column part F3 between the beam part F1 and the beam part F2. The lower unit 8C is supported by the beam part F2.

The extraction vessel 9 is a chamber that includes a vessel main body 90 and a lid unit 91. The middle unit 9 is referred to also as a chamber. The middle unit 8B includes an arm member 820 that removably holds the vessel main body 90. The arm member 820 includes a holding member 820a and a pair of shaft members 820b spaced apart from each other in the left-right direction. The holding member 820a is an elastic C-shaped clip-like member made of resin or the like, and holds the vessel main body 90 by means of the elastic force thereof. The holding member 82a holds the vessel main body 90 by the left and right side parts thereof, and the front of the vessel main body 90 is exposed. Therefore, the inside of the vessel main body 90 can be easily seen from the front.

The vessel main body 90 is manually attached to and detached from the holding member 820a. The vessel main body 90 is attached to the holding member 820a by pressing the vessel main body 90 rearward in the front-rear direction against the holding member 820a. The vessel main body 90 can be separated from the holding member 820a by pulling the vessel main body 90 frontward in the front-rear direction from the holding member 820a.

Each of the pair of shaft members 820b is a rod extending in the front-rear direction and is a member that supports the holding member 820a. Although the number of the shaft members 820b is two in this embodiment, the number of the shaft members 820b may be one or three or more. The holding member 820a is fixed to front end parts of the pair of shaft members 820b. A mechanism described later can move the pair of shaft members 82b back and forth in the front-rear direction, thereby moving the holding member 820a back and forth, thereby translating the vessel main body 90 in the front-rear direction. The middle unit 8B can also rotate to invert the extraction vessel 9 upside down as described later.

<4-2. Extraction Vessel>

Figure 6:
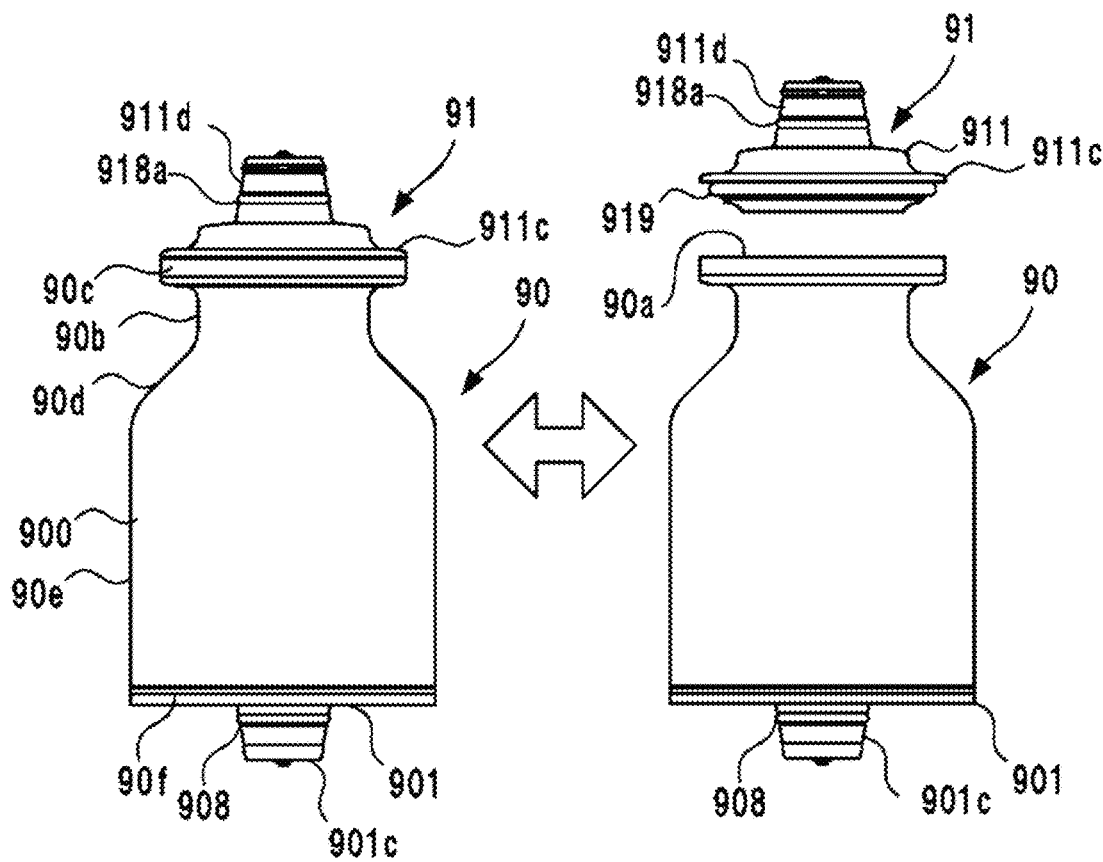
FIG. 6 is diagram showing an open state and a closed state of the extraction vessel in FIG. 5.

With reference to FIG. 6, the extraction vessel 9 will be described. FIG. 6 is a diagram showing an open state and a closed state of the extraction vessel 9. As described above, the extraction vessel 9 is inverted upside down by the middle unit 8B. The extraction vessel 9 in FIG. 6 is in a basic posture, in which the lid unit 91 is located at the top of the middle unit 9. In the following description, any vertical positional relationship means the vertical positional relationship in the basic posture unless otherwise specified.

The vessel main body 90 is a vessel with a closed bottom. The vessel main body 90 has a bottle-like shape and includes a neck part 90b, a shoulder part 90d, a trunk part 90e and a bottom part 90f. The neck part 90b has a flange part 90c formed at an end part thereof (an upper end part of the vessel main body 90), and the flange part 90c defines an opening 90a that is in communication with the interior space of the vessel main body 90.

The neck part 90b and the trunk part 90e have a cylindrical shape. The shoulder part 90d is a part between the neck part 90b and the trunk part 90e, and has a tapered shape with the cross-sectional area of the interior space thereof gradually decreasing as it goes from the trunk part 90e to the neck part 90b.

The lid unit 91 is a unit that opens and closes the opening 90a. The lid unit 91 is opened and closed (raised and lowered) by the action of the upper unit 8A.

The vessel main body 90 includes a main body member 900 and a bottom member 901. The main body member 900 is a cylindrical member with an open top and an open bottom that forms the neck part 90b, the shoulder part 90d and the trunk part 90e. The bottom member 901 is a member that forms the bottom part 90f, and is inserted and fixed in a lower part of the main body member 900. A seal member 902 is interposed between the main body member 900 and the bottom member 901 to improve the air tightness of the interior of the vessel main body 90.

In this embodiment, the main body member 900 is made of a transparent material, such as acrylic or glass, and forms a transparent vessel the whole of which is transparent. The administrator or the beverage consumer can see the process of brewing the coffee beverage in the vessel main body 90 through the cover part 102 and the main body member 900 of the vessel main body 90. The administrator can easily check the brewing operation, and the beverage consumer can enjoy seeing the brewing process.

The bottom member 901 has a projection part 901c at the center thereof, and a communicating hole that connects the interior of the vessel main body 90 to the outside and a valve (a valve 903 in FIG. 8) that opens and closes the communicating hole are provided on the projection part 901c. The communicating hole is used to discharge the waste liquid and residue in the cleaning of the interior of the vessel main body 90. The projection part 901c is provided with a seal member 908, which is a member for hermetically sealing between the upper unit 8A or lower unit 8C and the bottom member 901.

The lid unit 91 includes a cap-like base member 911. The base member 911 has a projection part 911d and a collar part 911c that rests on the flange part 90c when the lid unit 91 is closed. The projection part 911d has the same structure as the projection part 901c of the vessel main body 90, and is provided with a communicating hole that connects the interior of the vessel main body 90 to the outside and a valve (a valve 913 in FIG. 8) that opens and closes the communicating hole. The communicating hole of the projection part 911d is mainly used to pour hot water into the vessel main body 90 and deliver the coffee beverage. The projection part 911d is provided with a seal member 918a. The seal member 918a is a member for hermetically seals between the upper unit 8A or lower unit 8C and the base member 911. The lid unit 91 is also provided with a seal member 919. The seal member 919 improves the air tightness between the lid unit 91 and the vessel main body 90 when the lid unit 91 is closed. The lid unit 91 retains a filter for filtration.

<4-3. Upper Unit and Lower Unit>

Figure 7:
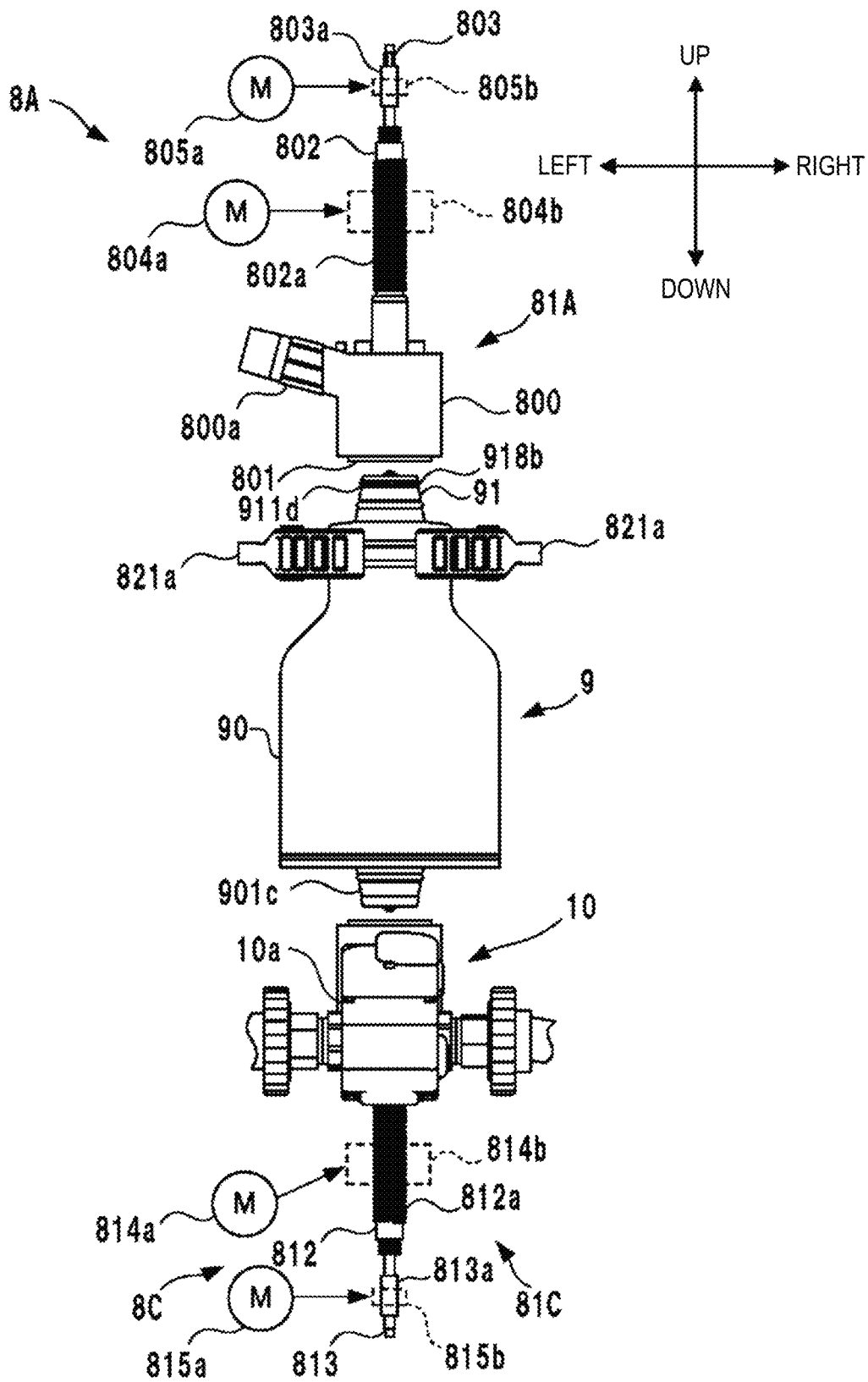
FIG. 7 is a front view showing some components of an upper unit and a lower unit.
Figure 8:
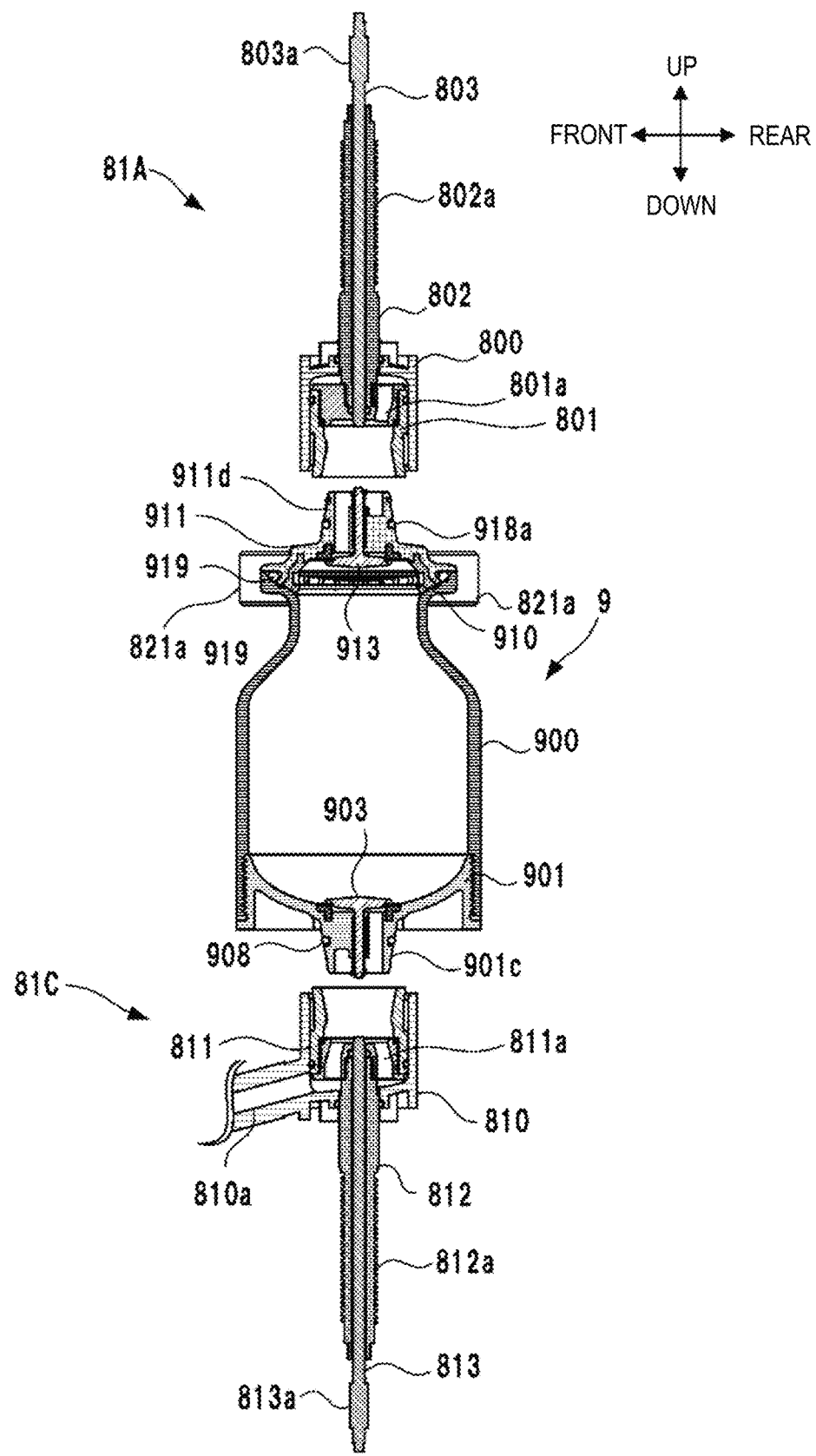
FIG. 8 is a vertical cross-sectional view of the components shown in FIG. 7.

With reference to FIGS. 7 and 8, the upper unit 8A and the lower unit 8C will be described. FIG. 7 is a front view showing some components of the upper unit 8A and the lower unit 8C, and FIG. 8 is a vertical cross-sectional view of the components shown in FIG. 7.

The upper unit 8A includes an operational unit 81A. The operational unit 81A performs an operation of opening and closing (raising and lowering) the lid unit 91 on the vessel main body 90 and an operation of opening and closing the valves of the projection parts 901c and 911d. The operational unit 81A includes a supporting member 800, a holding member 801, a lifting shaft 802 and a probe 803.

The supporting member 800 is fixed so that the relative position thereof with respect to the frame F does not change, and houses the holding member 801. The supporting member 800 also includes a communicating part 800a that connects the piping L3 to the interior of the supporting member 800. The hot water, tap water or air pressure supplied from the piping L3 is introduced into the supporting member 800 through the communicating part 800a.

The holding member 801 is a member capable of removably holding the lid unit 91. The holding member 801 has a cylindrical space in which the projection part 911d of the lid unit 91 or the projection part 901c of the bottom member 901 is inserted, and has a mechanism that removably holds the projection parts 911d and 901c. The mechanism is a snap-ring mechanism, for example, and is engaged with the projection part when the projection part is pressed against the mechanism with a certain pressing force and is disengaged from the projection part when the projection part is pulled with a certain separating force. The hot water, tap water or air pressure supplied from the piping L3 can be supplied into the extraction vessel 9 through the communicating part 800a and the communicating hole 801a of the holding member 801.

The holding member 801 is a movable member that can slide in the vertical direction in the supporting member 800. The lifting shaft 802 is provided with the axial direction thereof coinciding with the vertical direction. The lifting shaft 802 hermetically passes through a top part of the supporting member 800 in the vertical direction, and can be vertically raised and lowered with respect to the supporting member 800.

A lower end part of the lifting shaft 802 is fixed to a top part of the holding member 801. The lifting shaft 802 can be raised and lowered to make the holding member 801 slide upward and downward in the vertical direction, thereby mounting and separating the holding member 801 onto and from the projection part 911d or 901c. The lifting shaft 802 can also be raised and lowered to open and close the lid unit 91 on the vessel main body 90.

A thread 802a is formed on an outer circumferential surface of the lifting shaft 802 to form a lead screw mechanism. A nut 804b is screwed on the thread 802a. The upper unit 8A includes a motor 804a, which drives the nut 804b to rotate at the fixed position (without vertically moving). The rotation of the nut 804b causes raising and lowering of the lifting shaft 802.

The lifting shaft 802 is a tubular shaft having a through-hole along the central axis thereof, and the probe 803 is inserted in the through-hole in such a manner that the probe 803 can vertically slide. The probe 803 hermetically passes through a top part of the holding member 801 in the vertical direction, and can be vertically raised and lowered with respect to the supporting member 800 and the holding member 801.

The probe 803 is an operational element that opens and closes the valves 913 and 903 in the projection parts 911d and 901c. As the probe 803 is lowered, the valves 913 and 903 in the closed state are opened. As the probe 803 is raised, the valves 913 and 903 in the open state are closed (by the action or a return spring (not shown)).

A thread 803a is formed on an outer circumferential surface of the probe 803 to form a lead screw mechanism. A nut 805b is screwed on the thread 803a. The upper unit 8A includes a motor 805a, which drives the nut 805b to rotate at the fixed position (without vertically moving). The rotation of the nut 805b causes raising and lowering of the probe 803.

The lower unit 8C includes an operational unit 81C. The operational unit 81C has the same structure as the operational unit 81A vertically inverted, and performs an operation of opening and closing the valve 913 or 903 in the projection part 911d or 901c. The operational unit 81C is also configured to be able to open and close the lid unit 91. In this embodiment, however, the operational unit 81C is not used to open and close the lid unit 91.

In the following, the operational unit 81C will be described, although the description will be substantially the same as that of the operational unit 81A. The operational unit 81C includes a supporting member 810, a holding member 811, a lifting shaft 812 and a probe 813.

The supporting member 810 is fixed so that the relative position thereof with respect to the frame F does not change, and houses the holding member 811. The supporting member 810 also includes a communicating part 810a that connects the switch valve 10a of the switch unit 10 and the interior of the supporting member 810 to each other. The coffee beverage, tap water or the residue of the ground beans in the vessel main body 90 is introduced to the switch valve 10a through the communicating part 810a.

The holding member 811 has a cylindrical space in which the projection part 911d of the lid unit 91 or the projection part 901c of the bottom member 901 is inserted, and has a mechanism that removably holds the projection parts 911d and 901c. The mechanism is a snap-ring mechanism, for example, and is engaged with the projection part when the projection part is pressed against the mechanism with a certain pressing force and is disengaged from the projection part when the projection part is pulled with a certain separating force. The coffee beverage, tap water or the residue of the ground beans in the vessel main body 90 is introduced to the switch valve 10a through the communicating part 810a and a communicating hole 811a of the holding member 811.

The holding member 811 is a movable member that can slide in the vertical direction in the supporting member 810. The lifting shaft 812 is provided with the axial direction thereof coinciding with the vertical direction. The lifting shaft 812 hermetically passes through a bottom part of the supporting member 800 in the vertical direction, and can be vertically raised and lowered with respect to the supporting member 810.

A lower end part of the lifting shaft 812 is fixed to a bottom part of the holding member 811. The lifting shaft 812 can be raised and lowered to make the holding member 811 slide upward and downward in the vertical direction, thereby mounting and separating the holding member 811 onto and from the projection part 901*c* or 911*d*.

A thread 812*a* is formed on an outer circumferential surface of the lifting shaft 812 to form a lead screw mechanism. A nut 814*b* is screwed on the thread 812*a*. The lower unit 8C includes a motor 814*a*, which drives the nut 814*b* to rotate at the fixed position (without vertically moving). The rotation of the nut 814*b* causes raising and lowering of the lifting shaft 812.

The lifting shaft 812 is a tubular shaft having a through-hole along the central axis thereof, and the probe 813 is inserted in the through-hole in such a manner that the probe 813 can vertically slide. The probe 813 hermetically passes through a bottom part of the holding member 811 in the vertical direction, and can be vertically raised and lowered with respect to the supporting member 810 and the holding member 811.

The probe 813 is an operational element that opens and closes the valves 913 and 903 in the projection parts 911*d* and 901*c*. As the probe 813 is raised, the valves 913 and 903 in the closed state are opened. As the probe 813 is lowered, the valves 913 and 903 in the open state are closed (by the action or a return spring (not shown)).

A thread 813*a* is formed on an outer circumferential surface of the probe 813 to form a lead screw mechanism. A nut 815*b* is screwed on the thread 813*a*. The lower unit 8C includes a motor 815*a*, which drives the nut 815*b* to rotate at the fixed position (without vertically moving). The rotation of the nut 815*b* causes raising and lowering of the probe 813.

<4-4. Middle Unit>

Figure 9:
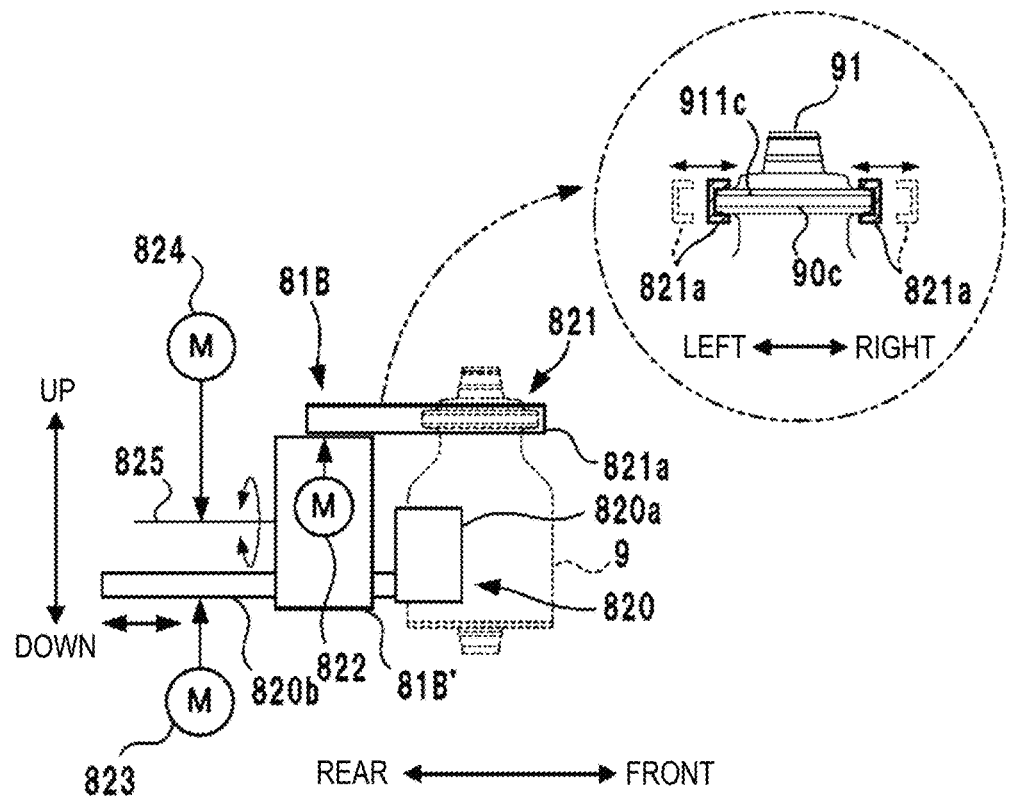
FIG. 9 is a schematic diagram showing a middle unit.
Figure 9:
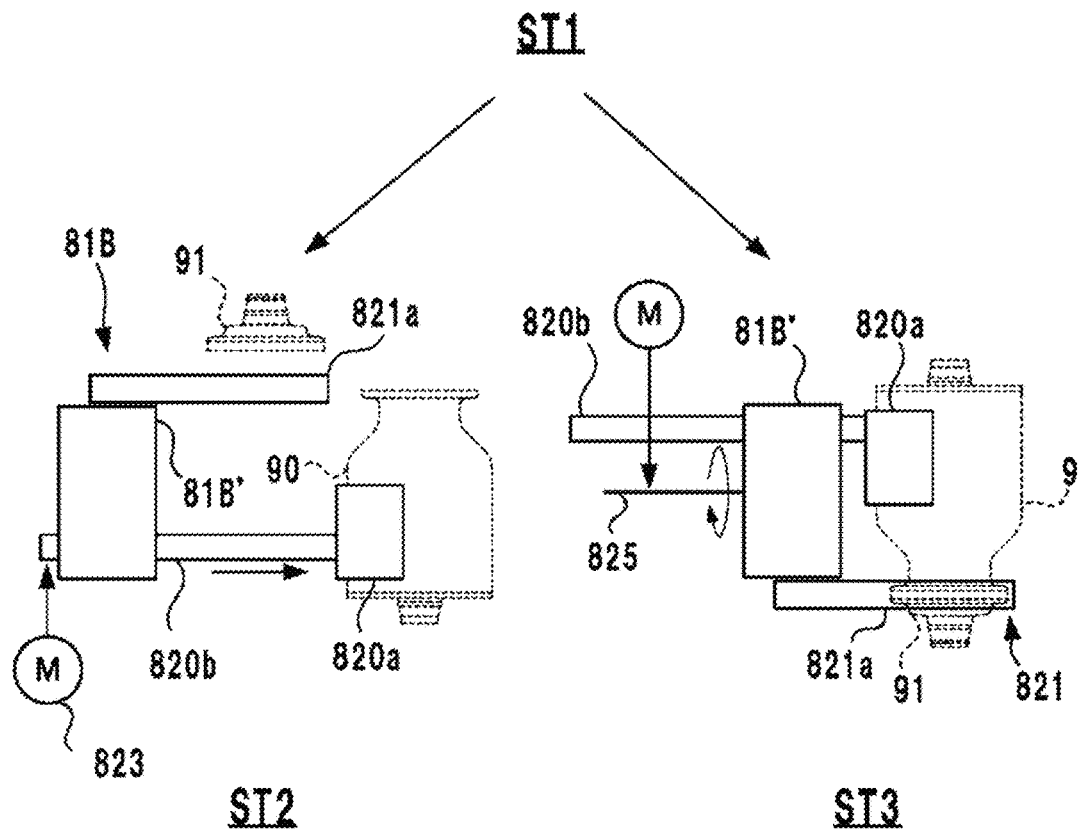

With reference to FIGS. 5 and 9, the middle unit 8B will be described. FIG. 9 is a schematic diagram showing the middle unit 8B. The middle unit 8B includes a supporting unit 81B that supports the extraction vessel 9. The supporting unit 81B includes a unit main body 81B' that supports a lock mechanism 821 in addition to the arm member 820 described above.

The lock mechanism 821 is a mechanism that keeps the lid unit 91 in the closed state on the vessel main body 90. The lock mechanism 821 includes a pair of grasping members 821*a* that pinch the collar part 911*c* of the lid unit 91 and the flange part 90*c* of the vessel main body 90 from above and below. The pair of grasping members 821*a* have a C-shaped cross section so as to be fitted around the collar part 911*c* and the flange part 90*c*, and are opened and closed in the left-right direction by the driving force of a motor 822. When the pair of grasping members 821*a* are in the closed state, as shown by the solid line in the encircled part of FIG. 9, the grasping members 821*a* are fitted onto the collar part 911*c* and the flange part 90*c* to pinch them from above and below, thereby hermetically locking the lid unit 91 onto the vessel main body 90. In this locked state, even if someone tries to open the lid unit 91 by raising the holding member 801 with the lifting shaft 802, the lid unit 91 does not move (the lock is not released). That is, the locking force of the lock mechanism 821 is set to be higher than the force to open the lid unit 91 with the holding member 801. In this way, the lid unit 91 on the vessel main body 90 can be prevented from being opened when an abnormality occurs.

When the pair of grasping members 821*a* are in the open state, as shown by the dashed line in the encircled part of FIG. 9, the grasping members 821*a* are spaced apart from the collar part 911*c* and the flange part 90*c*, and the lid unit 91 and the vessel main body 90 are unlocked from each other.

When the holding member 801 is holding the lid unit 91, and the holding member 801 is raised from a lowered position to a raised position, the lid unit 91 is separated from the vessel main body 90 if the pair of grasping members 821*a* are in the open state. To the contrary, if the pair of grasping members 821*a* are in the closed state, the holding member 801 releases the lid unit 91, and only the holding member 801 is raised.

The middle unit 8B further includes a mechanism that horizontally moves the arm member 820 in the front-rear direction with a motor 823 as a drive source. This mechanism allows the vessel main body 90 supported by the arm member 820 to be moved between an extraction position (a state ST1) toward the rear of the beverage making apparatus 1 and a bean input position (a state ST2) toward the front of the beverage making apparatus 1. The bean input position is a position where ground beans are input to the vessel main body 90, and beans ground by the grinder 5B are input through the discharge pipe 5C to the opening 90*a* of the vessel main body 90 with the lid unit 91 separated therefrom. In other words, the discharge pipe 5C is positioned above the vessel main body 90 located in the bean input position.

The extraction position is a position where the vessel main body 90 can be operated by the operational units 81A and 81C. The extraction position is a position on the same axis as the probes 803 and 813 where the coffee liquid is extracted. The extraction position is located further toward the rear than the bean input position. FIGS. 5, 7 and 8 show the vessel main body 90 in the extraction position. Since the vessel main body 90 is located at different positions between when inputting ground beans and when extracting the coffee liquid and supplying water, steam produced when extracting the coffee liquid can be prevented from coming into contact with the discharge pipe 5C, which is a part for supplying ground beans.

The middle unit 8B further includes a mechanism that rotates the supporting unit 81B about a shaft 825 extending in the front-rear direction with a motor 824 as a drive source. This mechanism allows the posture of the vessel main body 90 to be changed from an upright posture with the neck part 90*b* at the top (in the state ST1) to an inverted posture with the neck part 90*b* at the bottom (in a state ST3). While the extraction vessel 9 is being rotated, the lock mechanism 821 keeps the lid unit 91 locked onto the vessel main body 90. The vertical positional relationship concerning the extraction vessel 9 is inverse between the upright posture and the inverted posture. In the inverted posture, the projection part 911*d* is located at the position of the projection part 901*c* in the upright posture. In the inverted posture, the projection part 901*c* is located at the position of the projection part 911*d* in the upright posture. Therefore, in the inverted posture, the operational unit 81A can perform the operation of opening and closing the valve 903, and the operational unit 81C can perform the operation of opening and closing the valve 913.

<5. Control Device>

Figure 10:
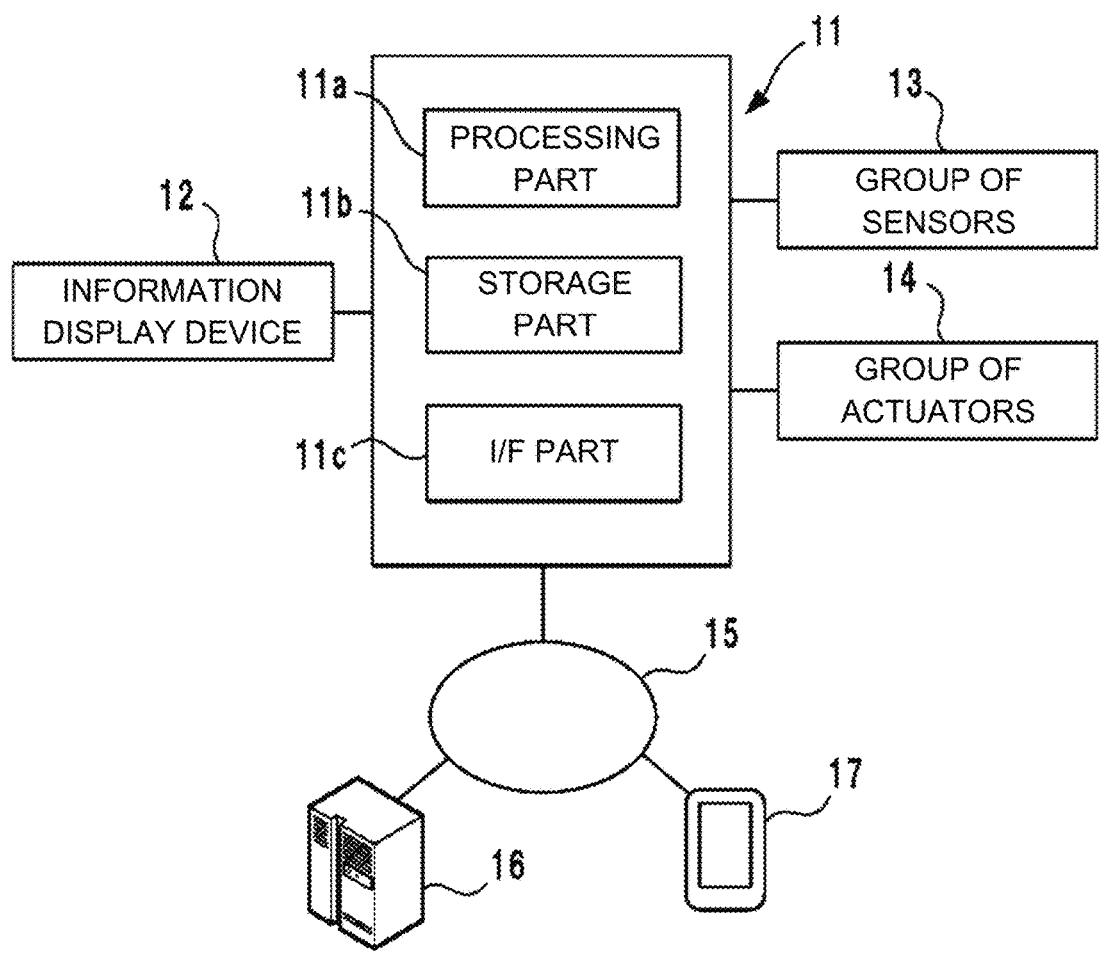
FIG. 10 is a block diagram showing a control device of the beverage making apparatus in FIG. 1.

With reference to FIG. 10, a control device 11 of the beverage making apparatus 1 will be described. FIG. 10 is a block diagram showing the control device 11.

The control device 11 controls the whole of the beverage making apparatus 1. The control device includes a processing part 11a, a storage part 11b, and an interface (I/F) part 11c. The processing part 11a is a processor, such as a CPU. The storage part 11b is a RAM or ROM, for example. The I/F part 11c includes an input/output interface for input and output signals between an external device and the processing part 11a. The I/F part 11c further includes a communication interface capable of data communication with a server 16 over a communication network 15, such as the Internet. The server 16 can communicate with a mobile terminal 17, such as a smartphone, over the communication network 15, and can receive a request for beverage production, customer feedback or other information from the mobile terminal 17 of the beverage consumer.

The processing part 11a executes a program stored in the storage part 11b and controls a group of actuators 14 according to a command from the information display device 12, a detection result from a group of sensors 13, or a command from the server 16. The group of sensors 13 includes various sensors provided in the beverage making apparatus 1 (such as a temperature sensor for hot water, an operating position sensor for a mechanism, or a pressure sensor). The group of actuators 14 includes various actuators provided in the beverage making apparatus 1 (such as a motor, a solenoid valve, or a heater).

<6. Example of Operation Control>

Figure 11:
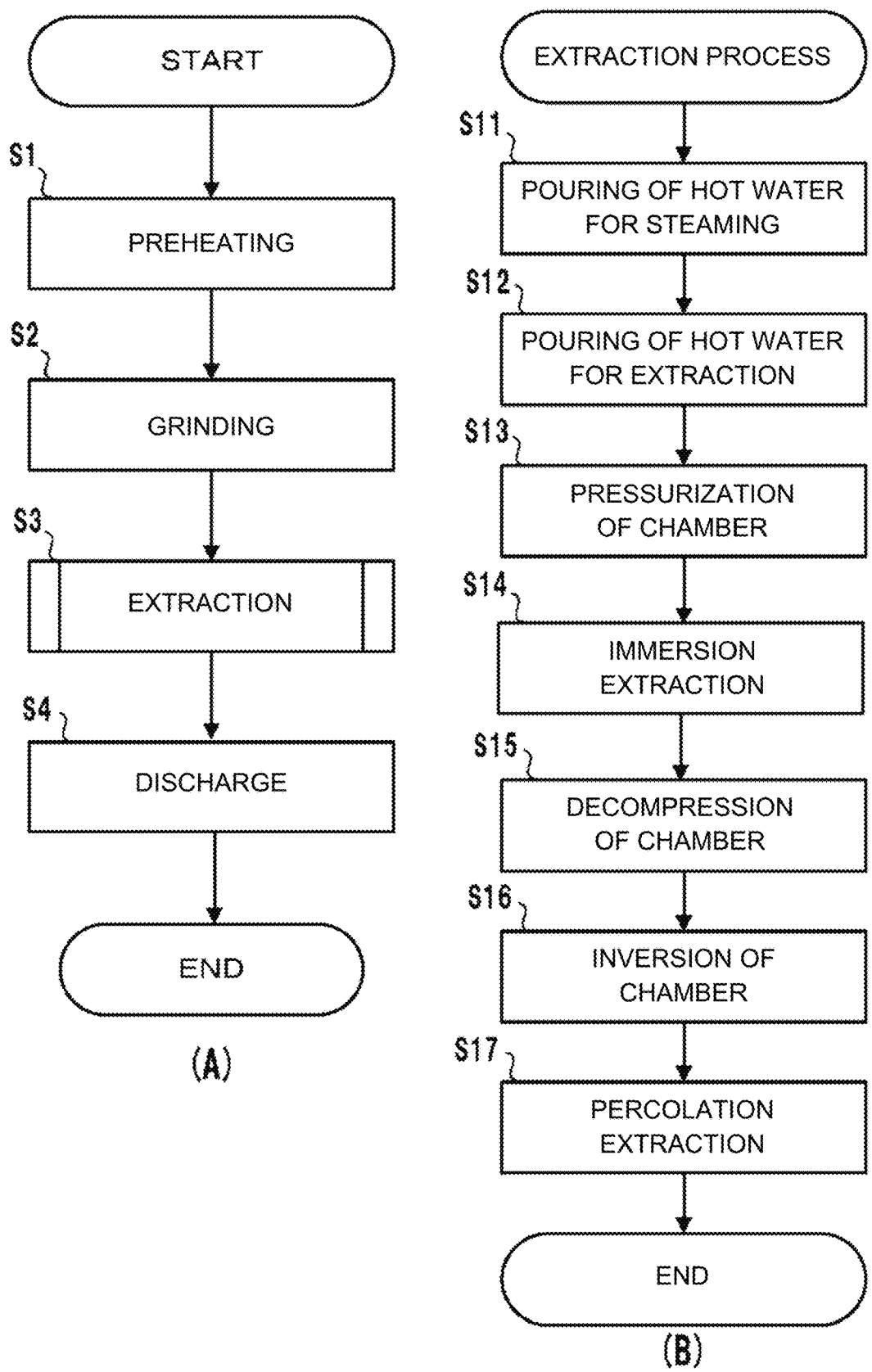
FIGS. 11(A) and 11(B) are flowcharts showing an example of a control performed by the control device.

With reference to FIGS. 11A(A) and 11(B), an example of a process of controlling the beverage making apparatus 1 performed by the processing part 11a will be described. FIG. 11(A) shows an example of a control involved with one coffee beverage production process. A state of the beverage making apparatus 1 before a production command is referred to as a standby state. In the standby state, each mechanism is in the state described below.

The extraction device 3 is in the state shown in FIG. 5. The extraction vessel 9 is in the upright posture and is located in the extraction position. The lock mechanism 821 is in the closed state, and the lid unit 91 closes the opening 90a of the vessel main body 90. The holding member 801 is at the lowered position and is mounted on the projection part 911d. The holding member 811 is at the raised position and is mounted on the projection part 901c. The valves 903 and 913 are in the closed state. The switch valve 10a allows communication of the communicating part 810a of the operational unit 8C to the waste tank T.

In the standby state, when a coffee beverage production command occurs, the process shown in FIG. 11(A) is performed. In Step S1, a preheating processing is performed. This processing is a processing of pouring hot water into the vessel main body 90 to heat the vessel main body 90 in advance. First, the valves 903 and 913 are opened. As a result, the piping L3, the extraction vessel 9 and the waste tank T come into communication with each other.

The solenoid valve 72i is opened and kept open for a predetermined time (1500 ms, for example) and then closed. This allows hot water to be poured from the water tank 72 into the extraction vessel 9. The solenoid valve 73 is then opened and kept open for a predetermined time (500 ms, for example) and then closed. This allows the air in the extraction vessel 9 to be compressed to promote discharge of hot water to the waste tank T. By this processing, the interior of the extraction vessel 9 and the piping L2 are preheated, and the decrease of the temperature of the hot water can be reduced in the following production of the coffee beverage.

In Step S2, a grinding processing is performed. In this step, roasted coffee beans are ground, and the ground beans are input to the vessel main body 90. First, the lock mechanism 821 is opened, and the holding member 801 is raised to the raised position. The lid unit 91 is held by the holding member 801 and therefore raised with the holding member 801. As a result, the lid unit 91 is separated from the vessel main body 90. The holding member 811 is lowered to the lowered position. The vessel main body 90 is moved to the bean input position. The storage device 4 and the grinding device 5 are then activated. This allows roasted coffee beans for a cup of coffee beverage to be supplied to the grinder 5A from the storage device 4. The grinders 5A and 5B grind the roasted coffee beans in two steps, and the separating device 6 separates unwanted matters from the roasted coffee beans. The ground beans are input to the vessel main body 90.

The vessel main body 90 is returned to the extraction position. The holding member 801 is lowered to the lowered position to mount the lid unit 91 onto the vessel main body 90. The lock mechanism 821 is closed to hermetically lock the lid unit 91 onto the vessel main body 90. The holding member 811 is raised to the raised position. Of the valves 903 and 913, the valve 903 is in the open state, and the valve 913 is in the closed state.

In Step S3, an extraction processing is performed. In this example, coffee liquid is extracted from the ground beans in the vessel main body 90. FIG. 11(B) is a flowchart showing the extraction processing of Step S3.

In Step S11, in order to steam the ground beans in the extraction vessel 9, a smaller amount of hot water than the amount of hot water for a cup is poured into the extraction vessel 9. In this example, the solenoid valve 72i is opened and kept open for a predetermined time (500 ms, for example) and then closed. This allows hot water to be poured from the water tank 72 into the extraction vessel 9. The processing of Step S11 is then ended after a predetermined waiting time (5000 ms, for example). By this processing, the ground beans can be steamed. By steaming the ground beans, carbonic acid gas can be released from the ground beans, and the subsequent extraction can be more effectively performed.

In Step S12, the remainder of the hot water for a cup of coffee beverage is poured into the extraction vessel 9 so that the hot water for a cup of coffee beverage is accommodated in the extraction vessel 9. In this example, the solenoid valve 72i is opened and kept open for a predetermined time (7000 ms, for example) and then closed. This allows the hot water to be poured from the water tank 72 into the extraction vessel 9.

The processing of Step S12 can set the interior of the extraction vessel 9 at a temperature (about 110° C., for example) higher than 100° C. at 1 atmosphere. In Step S13, the interior of the extraction vessel 9 is then pressurized. In this example, the solenoid valve 73b is opened and kept open for a predetermined time (1000 ms, for example) and then closed, thereby pressuring the interior of the extraction vessel 9 to an air pressure (about 4 atmospheres (a gauge pressure of about 3 atmospheres), for example) at which the hot water does not boil. The valve 903 is then closed.

This state is then kept for a predetermined time (7000 ms, for example) to perform immersion extraction of coffee liquid (S14). In this way, immersion extraction of coffee liquid is performed at high temperature and high pressure. The immersion extraction at high temperature and high pressure can have the following advantages. First, the high pressure facilitates penetration of hot water into the ground beans and extraction of coffee liquid. Second, the high temperature promotes extraction of coffee liquid. Third, because of the high temperature, the viscosity of oil in the ground beans decreases, and extraction of the oil is promoted. In this way, a more flavorful coffee beverage can be produced.

Although the temperature of the hot water (high-temperature water) can be any temperature higher than 100° C., a higher temperature is more advantageous for extraction of coffee liquid. In general, however, raising the temperature of the hot water leads to an increase of cost. For these reasons, the temperature of the hot water can be set to be equal to or higher than 105° C., 110° C. or 115° C. and equal to or lower than 130° C. or 120° C., for example. The air pressure can be any air pressure at which the hot water does not boil.

In Step S15, the interior of the extraction vessel 9 is decompressed. In this example, the air pressure in the extraction vessel 9 is set at an air pressure at which the hot water boils. Specifically, the valve 913 is opened, and the solenoid valve 73c is opened and kept open for a predetermined time (1000 ms, for example) and then closed. The extraction vessel 9 is opened to the ambient air. The valve 913 is then closed again.

The interior of the extraction vessel 9 is rapidly decompressed to an air pressure lower than the bubble point pressure, and the hot water in the extraction vessel 9 rapidly boils. The hot water and the ground beans in the extraction vessel 9 are explosively scattered in the extraction vessel 9. In this way, the hot water can be made to uniformly boil. In addition, destruction of the cell walls of the ground beans can be promoted, and the subsequent extraction of coffee liquid can be further promoted. In addition, the ground beans and the hot water can be agitated by this boiling, and the extraction of coffee liquid can be promoted. In this embodiment, in this way, the efficiency of extraction of coffee liquid can be improved.

In Step S16, the extraction vessel 9 is inverted from the upright posture to the inverted posture. In this example, the holding member 801 is moved to the raised position, and the holding member 811 is moved to the lowered position. The supporting unit 81B is then rotated. The holding member 801 is then returned to the lowered position, and the holding member 811 is returned to the raised position. In the inverted posture, the extraction vessel 9 has the neck part 90b and the lid unit 91 located at the bottom.

In Step S17, percolation extraction of coffee liquid is performed, and the coffee beverage is delivered into the cup C. In this example, the switch valve 10a is switched to make the pouring part 10c be in communication with the channel part 810a of the operational unit 81C. The valves 903 and 913 are closed. Furthermore, the solenoid valve 73b is opened and kept open for a predetermined time (10000 ms, for example) to set the interior of the extraction vessel 9 at a predetermined air pressure (1.7 atmospheres (a gauge pressure of 0.7 atmospheres), for example). In the extraction vessel 9, the coffee beverage made of hot water and coffee liquid dissolved in the hot water passes through a filter in the lid unit 91 and is delivered into the cup C. The filter prevents the residue of the ground beans from being delivered. This is the end of the extraction processing.

In this embodiment, the efficiency of extraction of coffee liquid is improved by the combination of the immersion extraction in Step S14 and the percolation extraction in Step S17. When the extraction vessel 9 is in the upright posture, the ground beans are accumulated on the bottom part 90f in the trunk part 90e. When the extraction vessel 9 is in the inverted posture, the ground beans are accumulated in the neck part 90b and the shoulder part 90d. The trunk part 90e has a greater cross-sectional area than the neck part 90b, so that the thickness of the accumulated ground beans is greater in the inverted posture than in the upright posture. That is, the ground beans are accumulated in the extraction vessel 9 to a relatively small thickness over a relatively wide area in the upright posture and accumulated to a relatively great thickness over a relatively narrow area in the inverted posture.

In this embodiment, the immersion extraction in Step S14 is performed with the extraction vessel 9 in the upright posture, so that the hot water and the ground beans can come into contact with each other over a wider area, so that the efficiency of the extraction of coffee liquid can be improved. In the immersion extraction, however, the hot water and the ground beans tend to partially come into contact with each other. On the other hand, the percolation extraction in Step S17 is performed with the extraction vessel 9 in the inverted posture, the hot water passes through the accumulated ground beans while coming into contact with more ground beans. The hot water more uniformly comes into contact with the ground beans, so that the efficiency of the extraction of coffee liquid can be further improved.

Referring back to FIG. 11(A), after the extraction processing in Step S3, a discharge processing is performed in Step S4. In this example, a processing relating to cleaning of the interior of the extraction vessel 9 is performed. The cleaning of the extraction vessel 9 is performed by returning the extraction vessel 9 from the inverted posture to the upright posture and then supplying tap water (purified water) to the extraction vessel 9. The interior of the extraction vessel 9 is then pressurized to discharge the water in the extraction vessel 9 and the residue of the ground beans to the waste tank T.

This is the end of one coffee beverage production process. After that, the same process is repeated each time a production command occurs. The time required for one coffee beverage production is about 60 to 90 seconds, for example.

Figure 12:
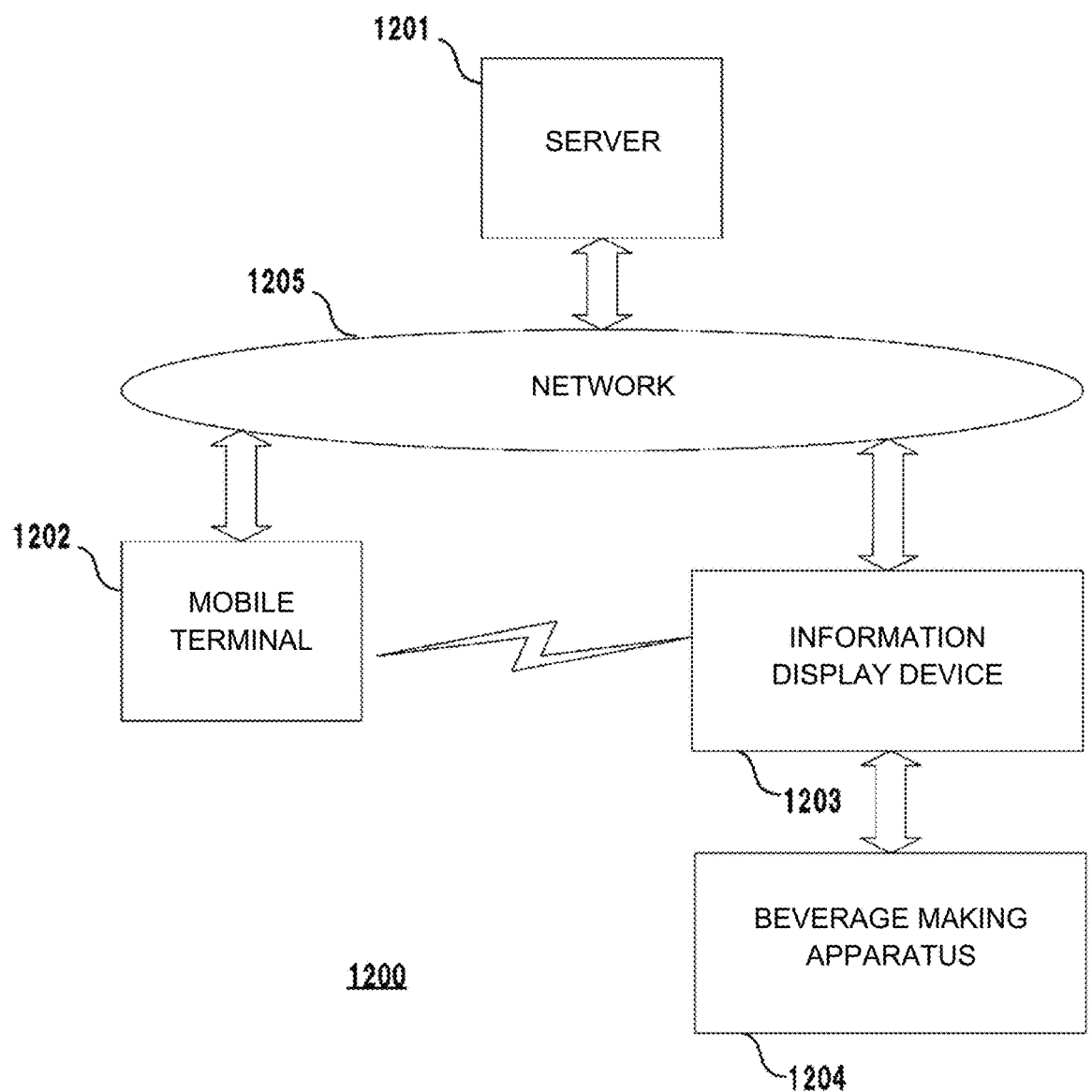
FIG. 12 is a diagram showing a general configuration of a system including the beverage making apparatus.

Next, with reference to FIG. 12, an application system (referred to simply as a system, hereinafter) including the beverage making apparatus 1 will be described. FIG. 12 is a diagram showing a general configuration of a system 1200 including the beverage making apparatus 1. The system 1200 includes a server 1201, a mobile terminal 1202, an information display device 1203, and a beverage making apparatus 1204. The beverage making apparatus 1204 corresponds to the beverage making apparatus 1, and the interface production device 1204 corresponds to the information display device 12. The mobile terminal 1202 is a smartphone of a user, for example. The server 1201, the mobile terminal 1202 and the information display device 1203 are communicably connected to each other over a network 1205, such as the Internet. The information display device 1203 and the beverage making apparatus 1204 are located at a shop that provides coffee beans or beverage, for example, and the information display device 1203 is capable of short-range radio communication based on Bluetooth (registered trademark) or the like with the mobile terminal 1202 of the user.

In the system 1200, the server 1201 can provide various services (functions) relating to coffee via an application downloaded to the mobile terminal 1202. The functions provided by the server 1201 include a service concerning rewards points that can be used at a shop (such as a cafe), a coffee beans online shopping service, a review service concerning purchases, such as commenting or rating, and a custom recipe service described later, for example. The services provided by the server 1201 are not limited to these but may include a cafe search service or a service for editing an image of a cup of coffee ordered by the user taken by the mobile terminal 1202 before uploading the image to the user's social media site. The user can receive various services relating to coffee, such as those described above, by clicking or otherwise activating the application downloaded from the server 1201.

Figure 13:
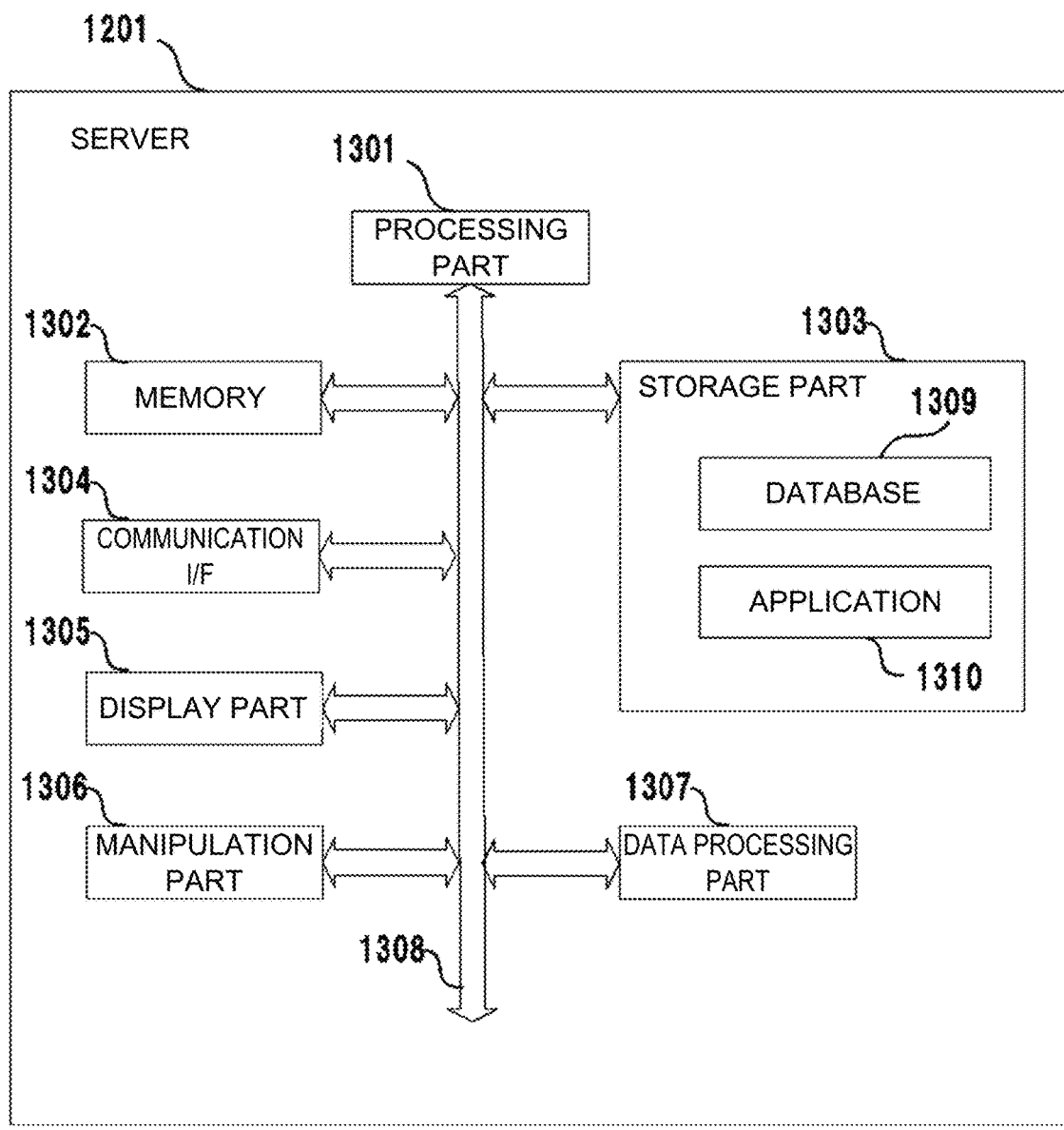
FIG. 13 is a diagram showing a configuration of a server.

FIG. 13 is a diagram showing a configuration of the server 1201. A processing part 1301 includes a CPU, for example, and controls the server 1201 in a centralized manner. In this embodiment, the operation of the server 1201 is achieved by the processing part 1301 loading a program stored in a storage part 1303 to a memory 1302 and executing the program. The memory 1302 is also used as a working memory for the CPU of the processing part 1301. The storage part 1303 stores a basic control program, data and a parameter that allow the server 1201 to operate. Various databases 1309 are built in the storage part 1303. For example, the databases are built based on review information or comment information transmitted from the mobile terminal 1202 of each user or information on a custom recipe. The storage part 1303 also stores various applications 1310, such as an application that can provide any of the services described above. The user can access the server 1201 via the mobile terminal 1202 to download an application to the mobile terminal 1202.

A communication interface (I/F) 1304 is configured to the medium of the network 1205, such as whether the medium is wired or wireless. A display part 1305 is a display, for example, and displays a user interface screen to an administrator who builds the databases 1309, for example. A manipulation part 1306 is a keyboard or a mouse, for example, and can receive a manipulation of the administrator.

A data processing part 1307 includes a GPU, for example, and analyzes a feature value based on big data transmitted from the mobile terminal 1202 of each user. The big data transmitted from the mobile terminal 1202 of each user may be organized as a database 1309, or the result of an analysis by the data processing part 1307 may be organized as a database 1309. The parts shown in FIG. 13 can be connected to each other by a bus 1308.

Figure 14:
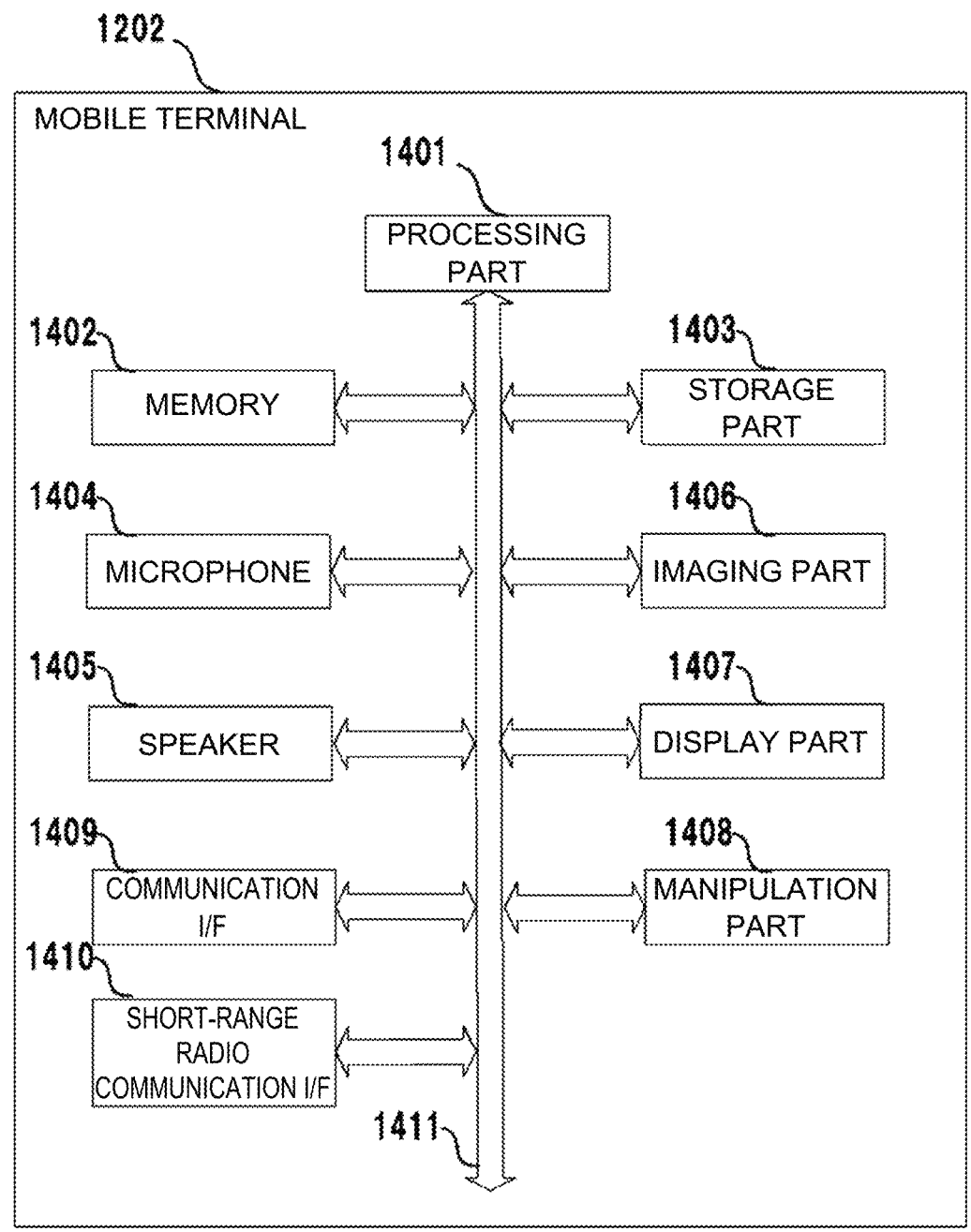
FIG. 14 is a diagram showing a configuration of a mobile terminal.

FIG. 14 is a diagram showing a configuration of the mobile terminal 1202. As described above, the mobile terminal 1202 is a smartphone of a user, for example. A processing part 1401 includes a CPU, for example, and controls the mobile terminal 1202 in a centralized manner. In this embodiment, the operation of the mobile terminal 1202 is achieved by the processing part 1401 loading a program stored in a storage part 1403 to a memory 1402 and executing the program, for example. The memory 1402 is also used as a working memory for the CPU of the processing part 1401. The storage part 1403 stores a basic control program, data and a parameter that allow the mobile terminal 1202 to operate. The storage part 1403 also stores an application 1310 downloaded from the server 1201.

A microphone 1404 receives a voice of the user, a speaker 1405 outputs a voice of another user or reproduces a message based on predetermined sound data. An imaging part 1406 is a camera and generates image data of a static image or a moving image. A display part 1407 is a touch panel and displays an icon for activating the application 1310 or various user interface screens relating to the application 1310, for example. The display part 1407 can also receive a manipulation from the user via the touch panel. A manipulation part 1408 can receive a manipulation of the user, and is a power button or a volume button, for example.

A communication I/F 1409 is configured to the medium of the network 1205, such as whether the medium is wired or wireless. A short-range radio communication I/F 1410 performs a communication according to a different communication scheme than that of the communication I/F 1409, such as Bluetooth. In this embodiment, the mobile terminal 1202 can communicate information on a custom recipe or the like to the information display device 1203 via the short-range radio communication I/F 1410. The parts shown in FIG. 14 can be connected to each other by a bus 1411.

Figure 15:
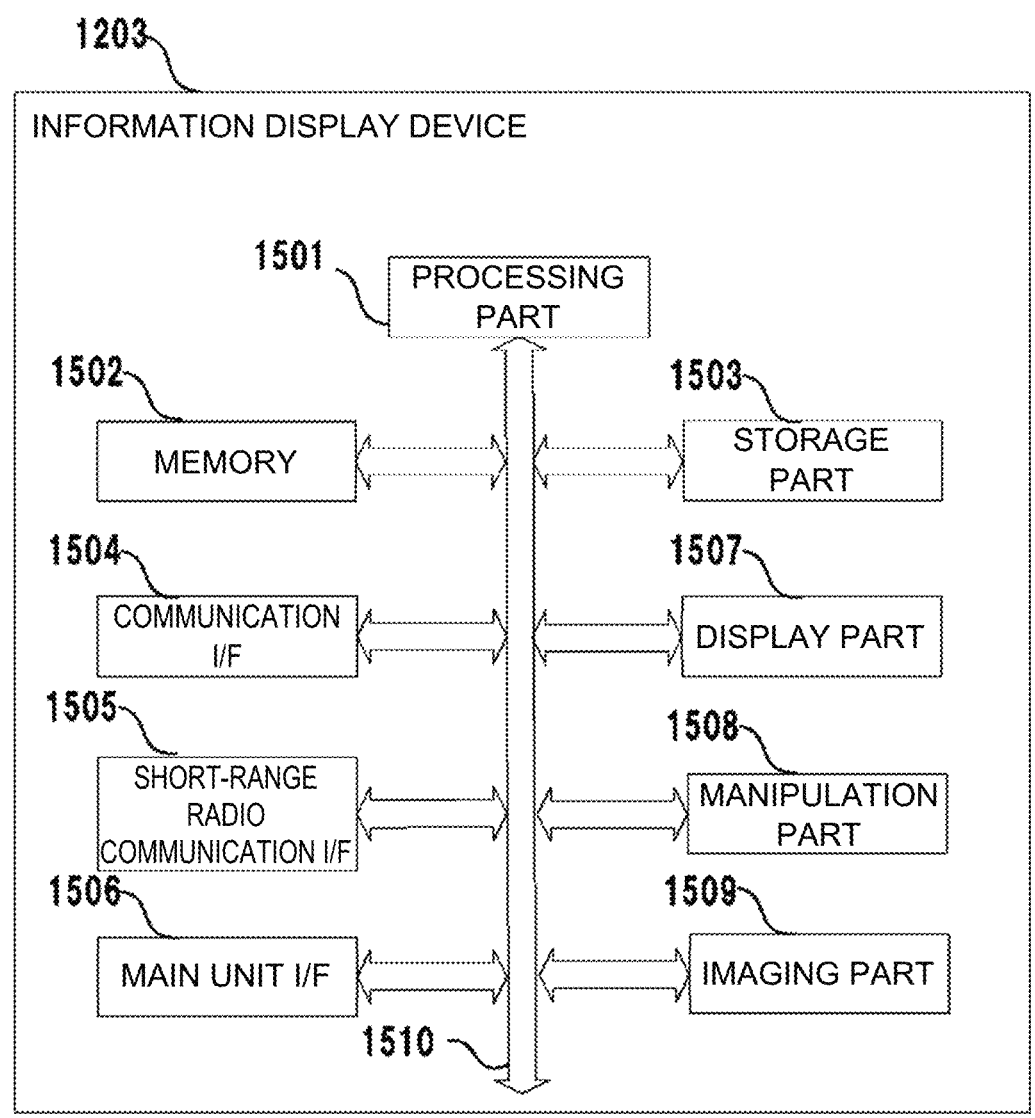
FIG. 15 is a diagram showing a configuration of an information display device.

FIG. 15 is a diagram showing a configuration of the information display device 1203. As described above, the information display device 1203 corresponds to the information display device 12. A processing part 1501 includes a CPU, for example, and controls the information display device 1203 in a centralized manner. In this embodiment, the operation of the information display device 1203 is achieved by the processing part 1501 loading a program stored in a storage part 1503 to a memory 1502 and executing the program, for example. The memory 1502 is also used as a working memory for the CPU of the processing part 1501. The storage part 1503 stores a basic control program, data and a parameter that allow the information display device 1203 to operate.

A communication I/F 1504 is configured to the medium of the network 1205, such as whether the medium is wired or wireless. A short-range radio communication I/F 1505 performs a communication according to a different communication scheme than that of the communication I/F 1504, such as Bluetooth. In this embodiment, the information display device 1203 can receive information on a custom recipe or the like from the mobile terminal 1202 via the short-range radio communication I/F 1505.

A display part 1507 is a touch panel and displays a user interface screen that allows the user to use the beverage making apparatus 1204. A manipulation part 1508 can receive a manipulation from the user and includes a hardware key for entry or the like. When the display part 1507 is a touch panel, the manipulation part 1508 may be implemented as a software key on the touch panel.

An imaging part 1509 is a camera and generates image data of a static image. The imaging part 1509 can take a photograph of coffee beans brought to the shop by the user or of a two-dimensional code displayed on the display part 1407 of the mobile terminal 1202, for example. By taking a photograph of a two-dimensional code displayed on the display part 1407 of the mobile terminal 1202, the information display device 1203 becomes able to communicate with the mobile terminal 1202 according to a communication scheme different from the communication schemes of the communication I/F 1504 and the short-range radio communication I/F 1505. A main unit I/F 1506 is an interface part to the control device 11 and transmits coffee beans choice information or extraction profile information set by the user via the display part 1507 and the manipulation part 1508 to the control device 11, for example. The parts shown in FIG. 15 can be connected to each other by a bus 1510.

Each of the devices shown in FIGS. 13 to 15 can be a computer that forms a part of the present invention.

Figure 16:
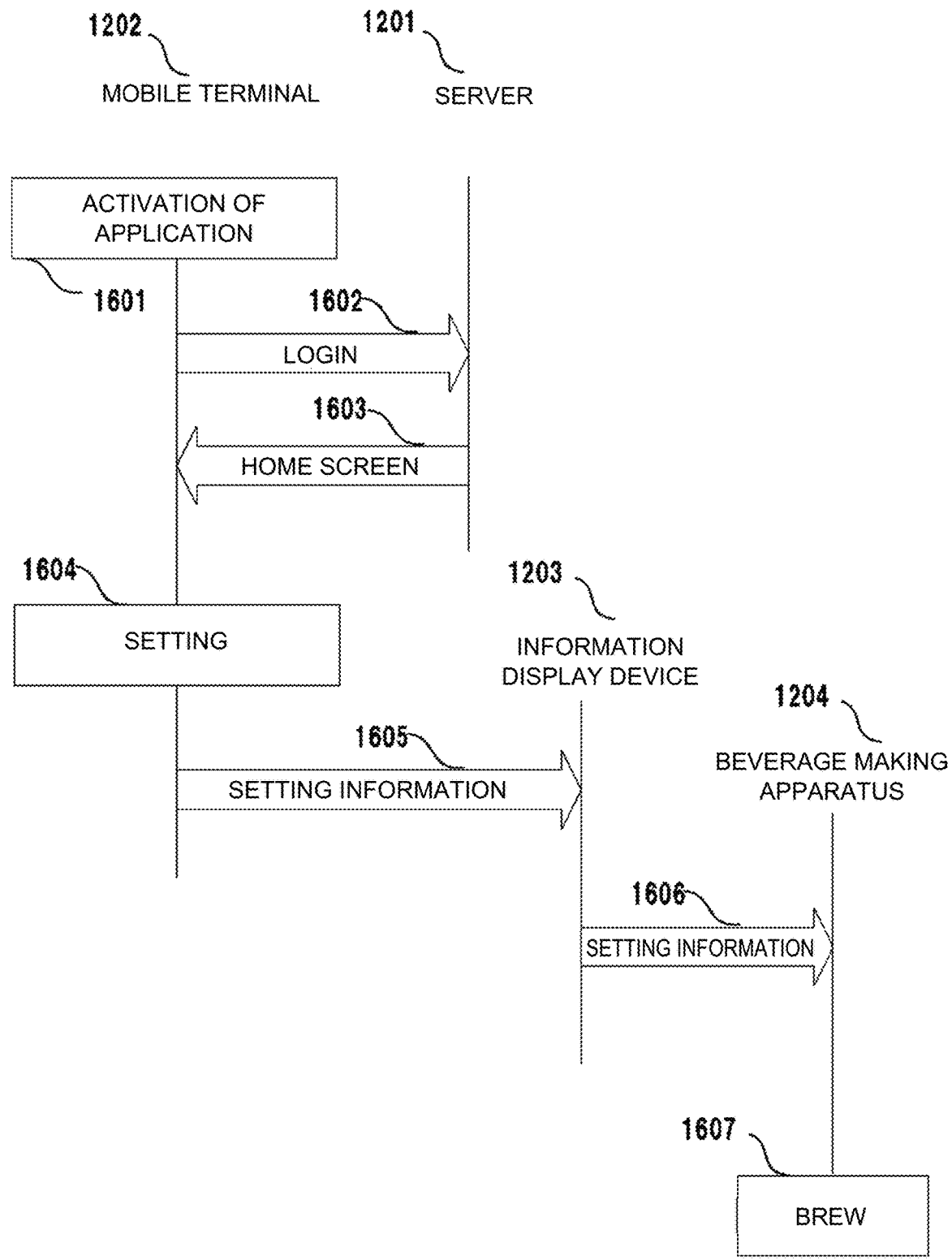
FIG. 16 is a diagram for illustrating a flow of a process until coffee is brewed.

FIG. 16 is a diagram for illustrating a flow of a process in which the user uses the mobile terminal 1202 to customize a recipe and uses the beverage making apparatus 1204 to brew coffee in the system 1200.

First, the user clicks an icon displayed on the display part 1407 of the mobile terminal 1202 to activate the application 1310 that has been downloaded from the server 1201 in advance (Step 1601). Once the application 1310 is activated on the mobile terminal 1202, a login screen that allows the user to log in the server 1201 is displayed on the display part 1407 of the mobile terminal 1202. The user inputs an ID and a password obtained in advance on the login screen (Step 1602). Once the server 1201 has authenticated the user, the server 1201 returns a home screen of the application 1310 to the mobile terminal 1202.

Figure 18:
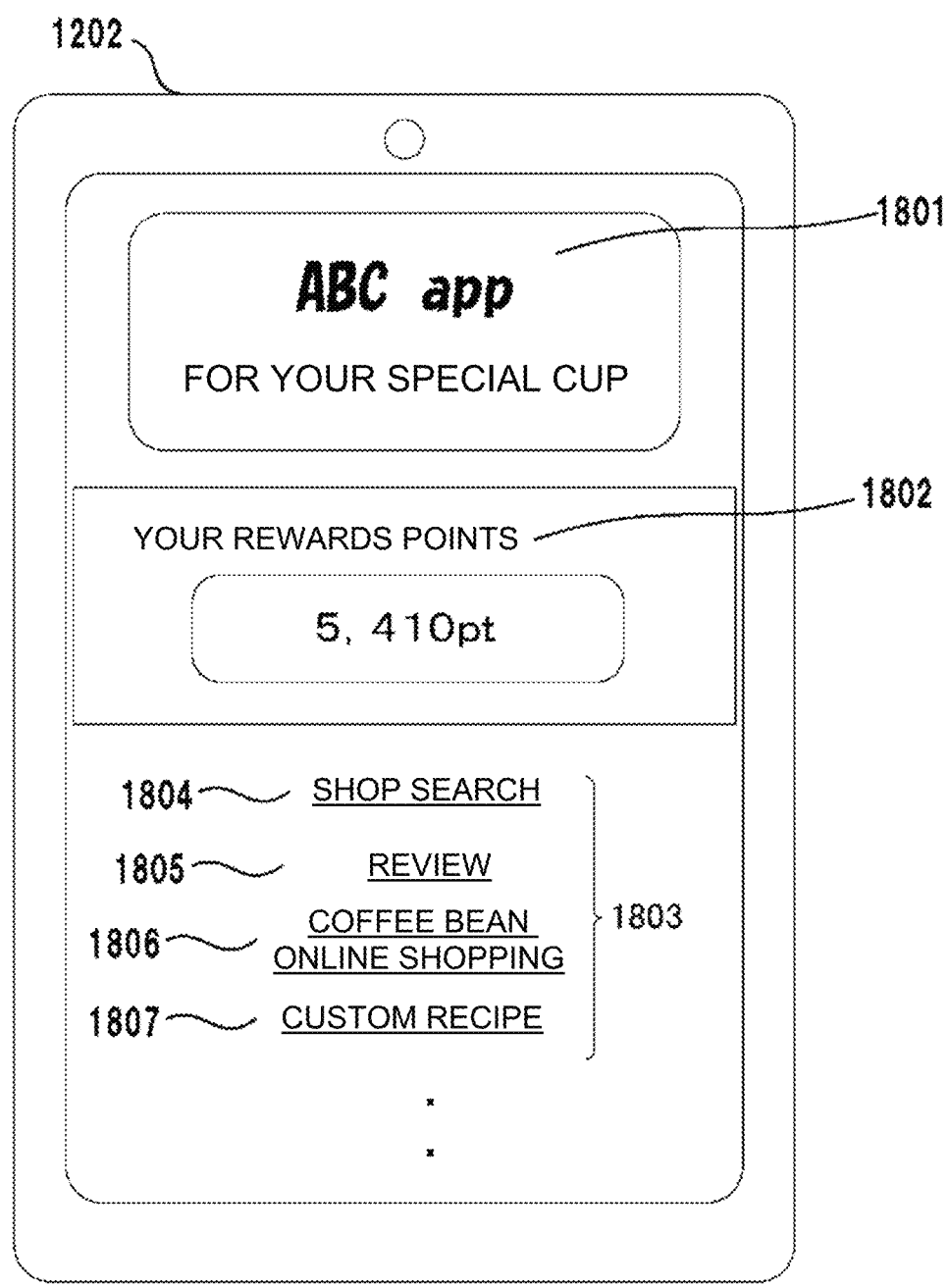
FIG. 18 is a diagram showing an example of a home screen of an application displayed on the mobile terminal.

FIG. 18 is a diagram showing an example of the home screen of the application 1310 displayed on the display part 1407 of the mobile terminal 1202. In a display area 1801, the name "ABC app" of the application 1310 is displayed. In a display area 1802, the current rewards points of the user are displayed. The user can use the rewards points to purchase coffee beans on an online shop, for example. In a display area 1803, a list of services that can be provided by the application 1310 is displayed. The user can click any of display areas 1804, 1805, 1806 and 1807. Once any of the display areas is clicked, a screen of the corresponding service is displayed.

The display area 1804 shows a shop search service, which allows the user to search for a cafe participating in the rewards points program, for example. The display area 1805 shows a review service, which allows the user to make a comment on or rate a cafe the user has visited, for example. The display area 1806 shows a coffee beans online shopping service, which allows the user to browse an online shop of coffee beans and purchase coffee beans. The display area 1807 shows a custom recipe service, which allows the user to adjust an extraction profile on the mobile terminal 1202.

Figure 19:
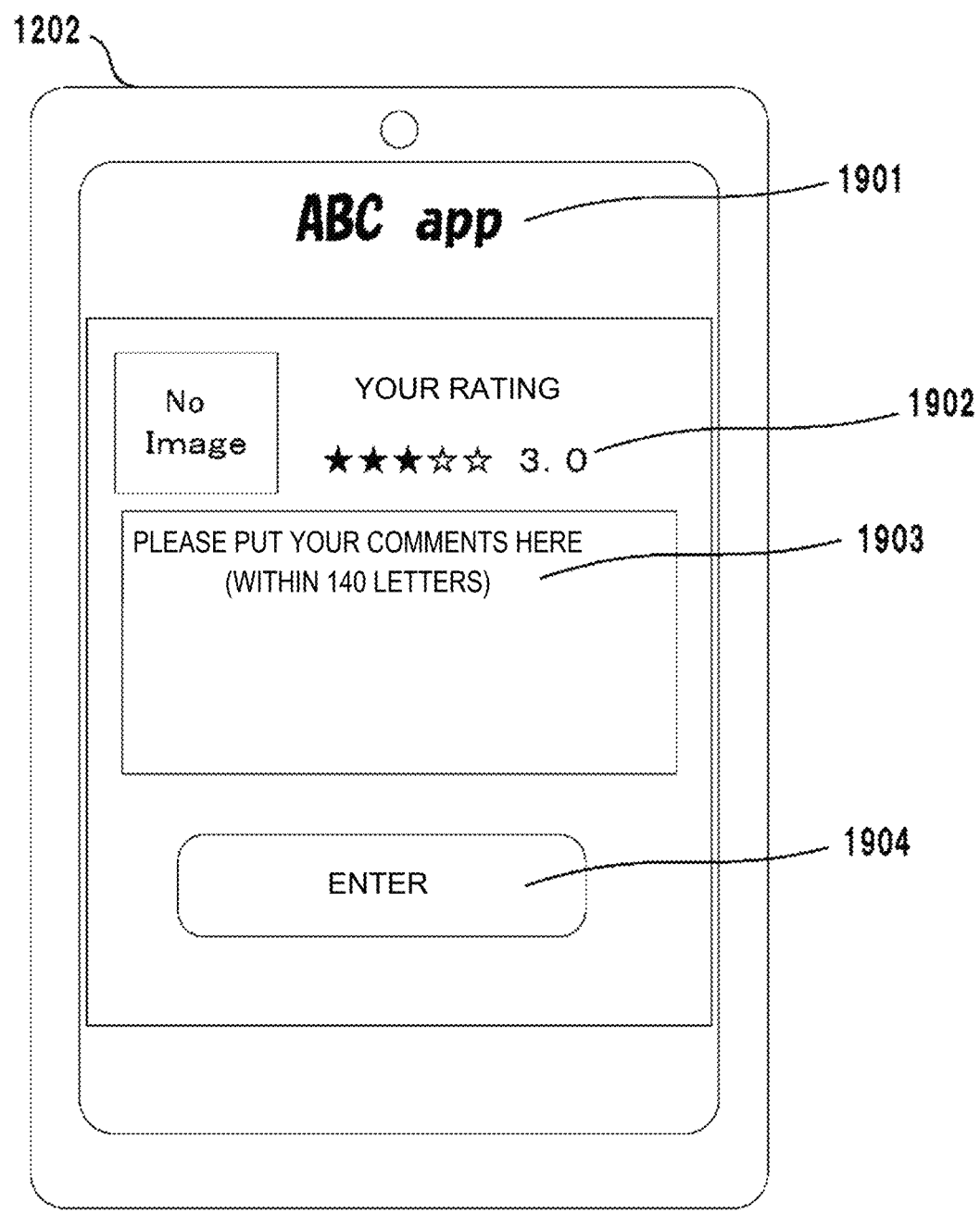
FIG. 19 is a diagram showing a service screen.

FIG. 19 is a diagram showing an example of a service screen displayed when the user clicks the display area 1805. In a display area 1901, the name "ABC app" of the application 1310 is displayed. In a display area 1902, rating information is displayed, and the user can rate the coffee the user has purchased at the cafe the user visited. In a display area 1903, a comment field is displayed, and the user can make a comment on the cafe the user visited. When an enter button 1904 is pressed, the comment made by the user with this review service is entered. In this embodiment, once the enter button 1904 is pressed and the comment is entered, the entered comment is transmitted to the server 1201. In this way, the server 1201 collects review information from the users, and the data processing part 1307 can analyze the review information.

Figure 20:
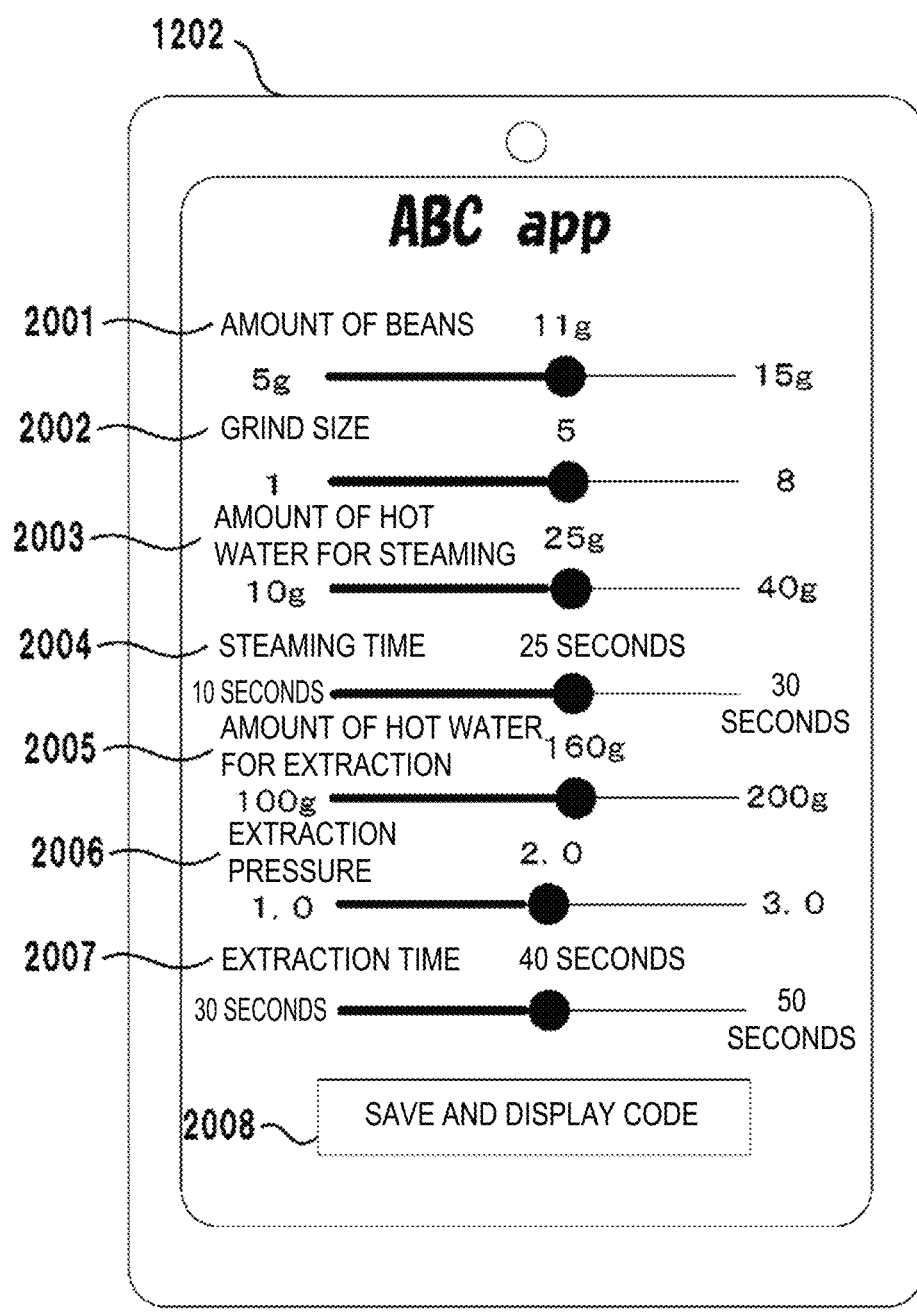
FIG. 20 is a diagram showing a service screen.

FIG. 20 is a diagram showing an example of a service screen displayed when the user clicks the display area 1807. The screen shown in FIG. 20 allows the user to adjust the amount of hot water for extraction or the like on the mobile terminal 1202. The screen in FIG. 20 shows basically the same setting items as those displayed on the information display device 1203, and the user can adjust the amount of hot water for extraction or the like to a preferable value on the mobile terminal 1202 before visiting the cafe.

A display area 2001 allows the user to adjust and set the amount of coffee beans as desired. A display area 2002 allows the user to adjust and set the grind size as desired. A display area 2003 allows the user to adjust and set the amount of hot water for steaming as desired. A display area 2004 allows the user to adjust and set the steaming time as desired. A display area 2005 allows the user to adjust and set the amount of hot water for extraction as desired. A display area 2006 allows the user to adjust and set the extraction pressure as desired. A display area 2007 allows the user to adjust and set the extraction time as desired.

A button 2008 is a button to enter the settings in the display areas 2001 to 2007. In the case shown in FIG. 20, once the button 2008 is pressed, the settings in the display areas 2001 to 2007 are saved, and a two-dimensional code is displayed. In the cafe, the user can communicate the settings in the display areas 2001 to 2007 to the information display device 1203 by holding the two-dimensional code displayed on the mobile terminal 1202 over the imaging part 1509 of the information display device 1203. The button 2008 may not be a button for displaying a two-dimensional code. For example, the button 2008 may be a button for entering and saving the settings in the display areas 2001 to 2007, and the settings in the display areas 2001 to 2007 may be transmitted to the information display device 1203 via the short-range radio communication I/F 1410.

By adjusting the parameters for brewing of a coffee beverage shown in FIG. 20 on the mobile terminal 1202, the user can easily feel as if the user were a barista and brewed coffee. In this embodiment, a set of parameters for brewing of a coffee beverage such as those shown in FIG. 20 is referred to as an extraction profile or a recipe.

Refer back to FIG. 16. Once the mobile terminal 1202 receives the home screen from the server 1201 in Step 1603, the user clicks the display area 1807 and adjusts and sets the extraction profile on the screen shown in FIG. 20 (Step 1604). After that, as described above, the user visits the cafe and communicates setting information from the mobile terminal 1202 to the information display device 1203 (Step 1605). The setting information here is the settings in the display areas 2001 to 2007 shown in FIG. 20, for example. The setting information may be communicated via a two-dimensional code or short-range radio communication.

Once the information display device 1203 has obtained the setting information, the information display device 1203 transmits the setting information to the control device 11 of the beverage making apparatus 1204 via the main unit I/F 1506 (Step 1606). The beverage making apparatus 1204 brews a coffee beverage based on the setting information (Step 1607).

Figure 17:
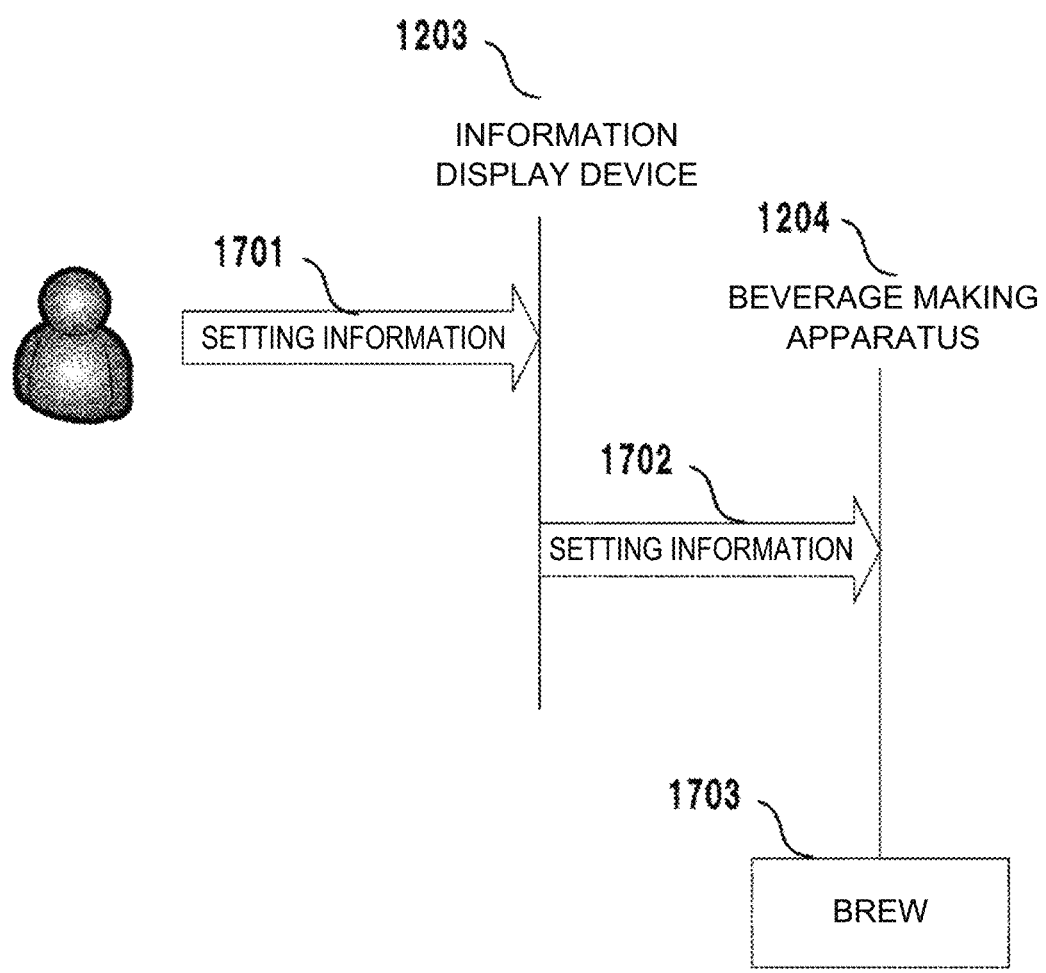
FIG. 17 is a diagram for illustrating a flow of a process until coffee is brewed.

FIG. 17 is a diagram for illustrating a flow of a process in which the user customizes a recipe on the information display device 1203 and the beverage making apparatus 1204 brews coffee in the system 1200.

Although FIG. 16 shows a situation where the user adjusts the extraction profile on the mobile terminal 1202, FIG. 17 shows a situation where the user adjusts the extraction profile on the information display device 1203 in the cafe.

The user adjusts and sets the extraction profile on the user interface screen displayed on the display part 1507 of the information display device 1203 (Step 1701). The user interface screen displays basically the same items as those displayed on the screen shown in FIG. 20. Once the information display device 1203 has obtained the setting information, the information display device 1203 transmits the setting information to the control device 11 of the beverage making apparatus 1204 via the main unit I/F 1506 (Step 1702). The beverage making apparatus 1204 brews a coffee beverage based on the setting information (Step 1703).

First Embodiment

Next, a configuration for estimating properties of coffee beans from photograph data of the coffee beans will be described. In this embodiment, as an example, a case will be described where a general user brings coffee beans to a shop such as a cafe, a photograph of the coffee beans is taken, and the properties of the coffee beans are estimated from the photograph data of the coffee beans.

Figure 21:
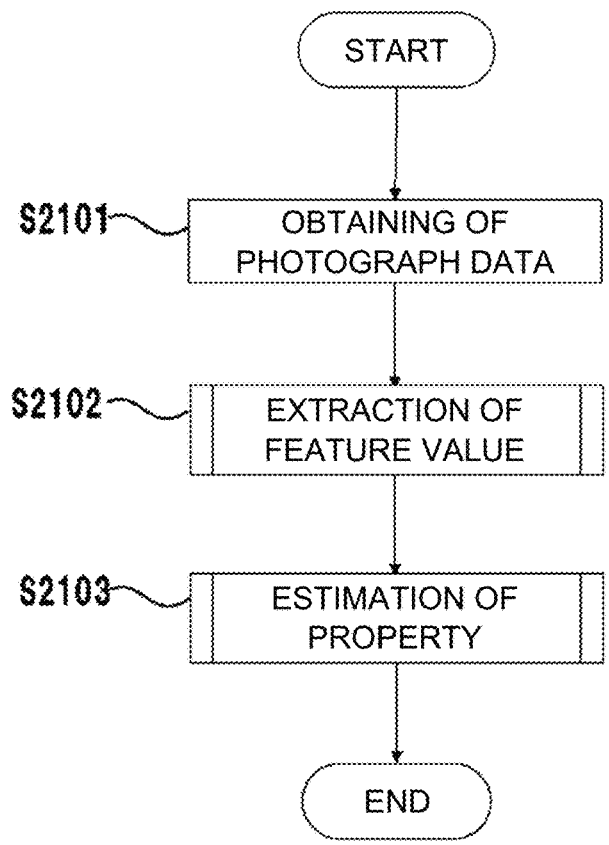
FIG. 21 is a flowchart showing a process of estimating properties of coffee beans.

FIG. 21 is a flowchart showing a process of estimating properties of coffee beans. The process shown in FIG. 21 is achieved by the processing part 1301 of the server 1201 loading a program stored in the storage part 1303 to the memory 1302 and executing the program, for example.

In Step S2101, the processing part 1301 obtains photograph data of coffee beans. In this embodiment, it is supposed that the photograph data is photograph data of coffee beans brought to a shop such as a cafe by a general user. Therefore, first, the imaging part 1509 of the information display device 1203 takes a photograph of the coffee beans brought by the general user, and the processing part 1501 transmits the photograph data to the server 1201 over the network 1205. The processing part 1301 obtains the photograph data received from the information display device 1203. When the photograph data is transmitted, identification information, such as user information, is also transmitted.

Figure 22:
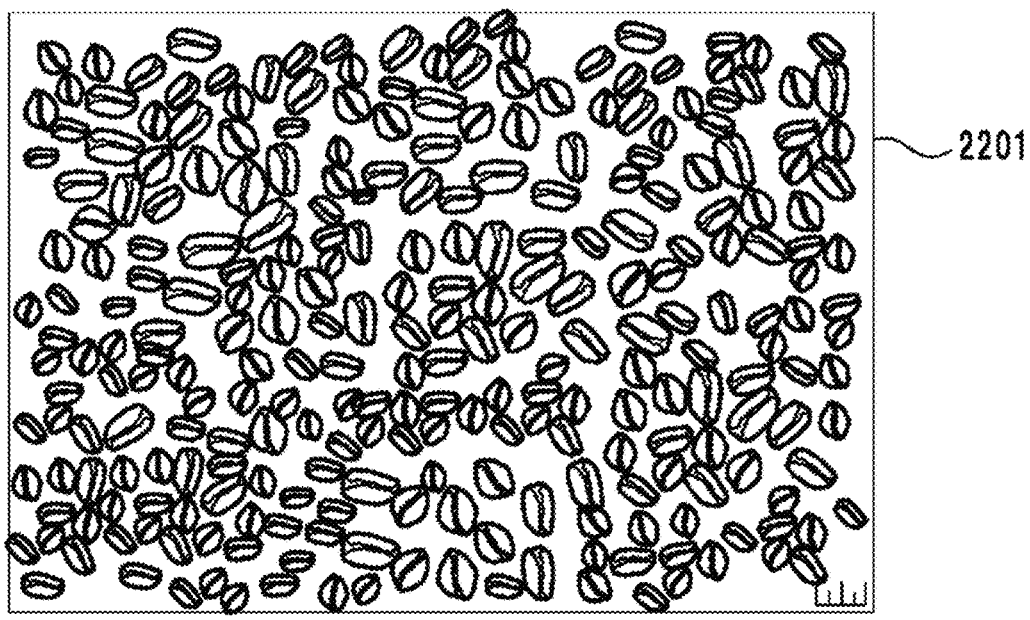
FIG. 22 is a diagram showing photograph data.

FIG. 22 is a conceptual diagram showing the photograph data of coffee beans transmitted from the information display device 1203 to the server 1201. As shown in FIG. 22, photograph data 2201 is preferably taken to include a large number of coffee beans, rather than a single coffee bean or a small amount of coffee beans. In the shop, a photograph of the coffee beans placed on a mount provided to the imaging part 1509 is taken. The distance between the imaging part 1509 the mount, which is provided with a reference scale, is fixed in advance, so that the measurements of the actual size of the coffee beans can be estimated from the photograph data. The photograph data is taken in such a manner that the photograph includes not only the coffee beans but also the reference scale described above.

Figure 23:
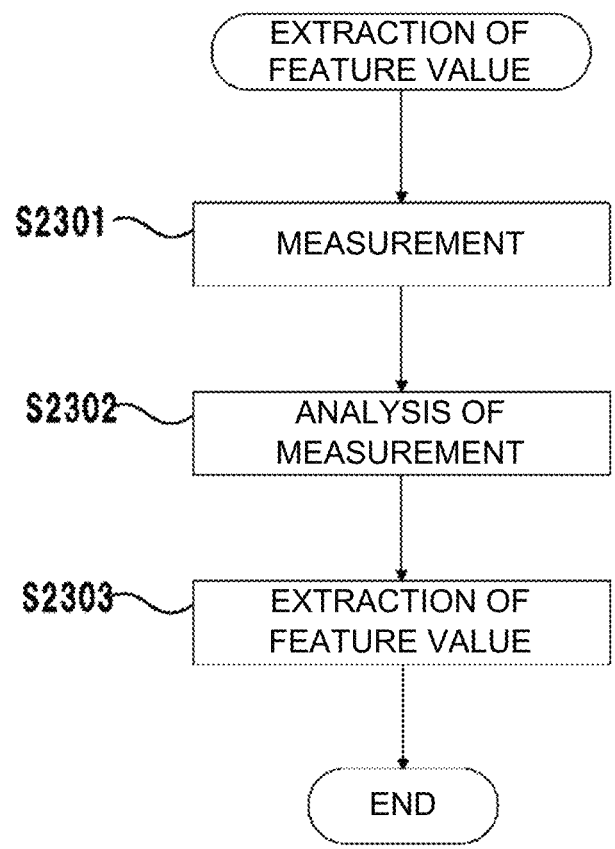
FIG. 23 is a flowchart showing a process of extracting a feature value of a coffee bean.
Figure 24:
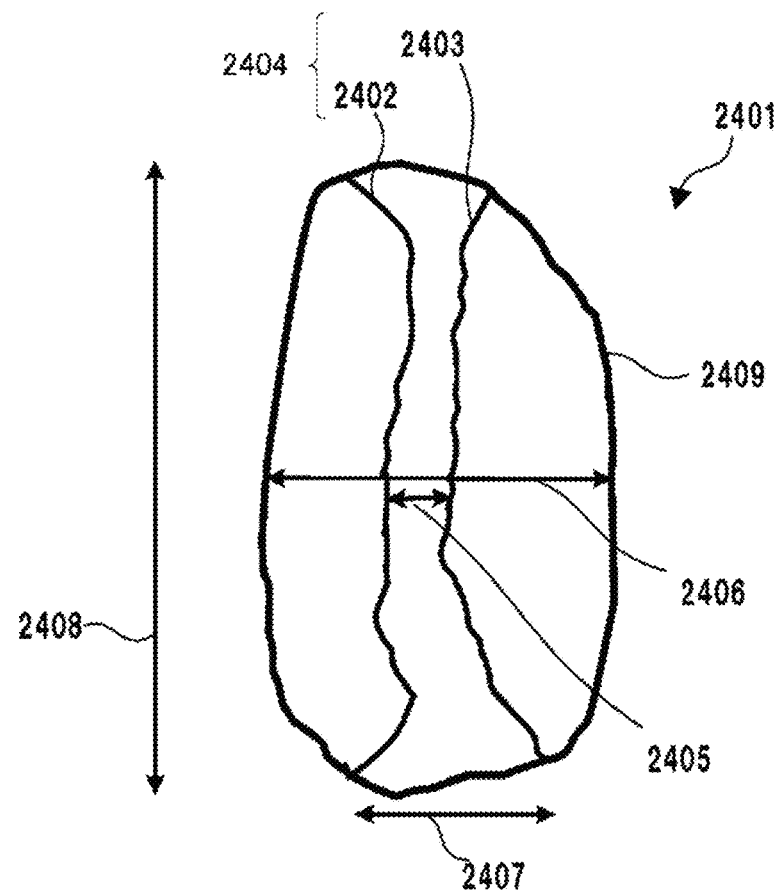
FIG. 24 is a diagram for illustrating measurement points of a coffee bean.

In Step S2102, the processing part 1301 requests the data processing part 1307 to extract a feature value based on the obtained photograph data. FIG. 23 is a flowchart showing a process of extracting a feature value. In Step S2301, the data processing part 1307 measures each coffee bean in the photograph data. FIG. 24 is a diagram for illustrating measurement points of a coffee bean. A front face 2401 is a front face of a coffee bean, and a back face 2401 is a back face of the coffee bean. The front face is a face with a center cut 2404, and the back face is a face without the center cut 2404. The center cut 2404 is a recess longitudinally extending in the middle of the coffee bean, a line 2402 is a left-side line of the recess, and a line 2403 is a right-side line of the recess. A screen size 2406 is a dimension of the coffee bean in a direction perpendicular to the center cut 2408 at the middle of a center cut length 2408. A center cut width is the distance between the lines 2402 and 2403 at the middle of the center cut length 2408. A center cut end width 2407 is the distance between the lines 2402 and 2403 at an end of the center cut 2404. In Step S2301, not only the dimensions at the measurement points described above but also a contour shape 2409 or color information are also measured. The photograph data probably shows not only front faces 2401 of coffee beans but also back faces 2410 of coffee beans. In Step S2301, the data processing part 1307 may measure only the coffee beans whose front faces 2401 are shown, or may measure the contour shape 2409 and color information for both the coffee beans whose front faces 2401 are shown and the coffee beans whose back faces 2410 are shown. The color information described above may be average color information on the overall surface of the coffee bean, or may be color information on the part between the lines 2402 and 2403 (that is, the center cut 2404), which makes a great contribution to the flavor.

Figures 25, 26:
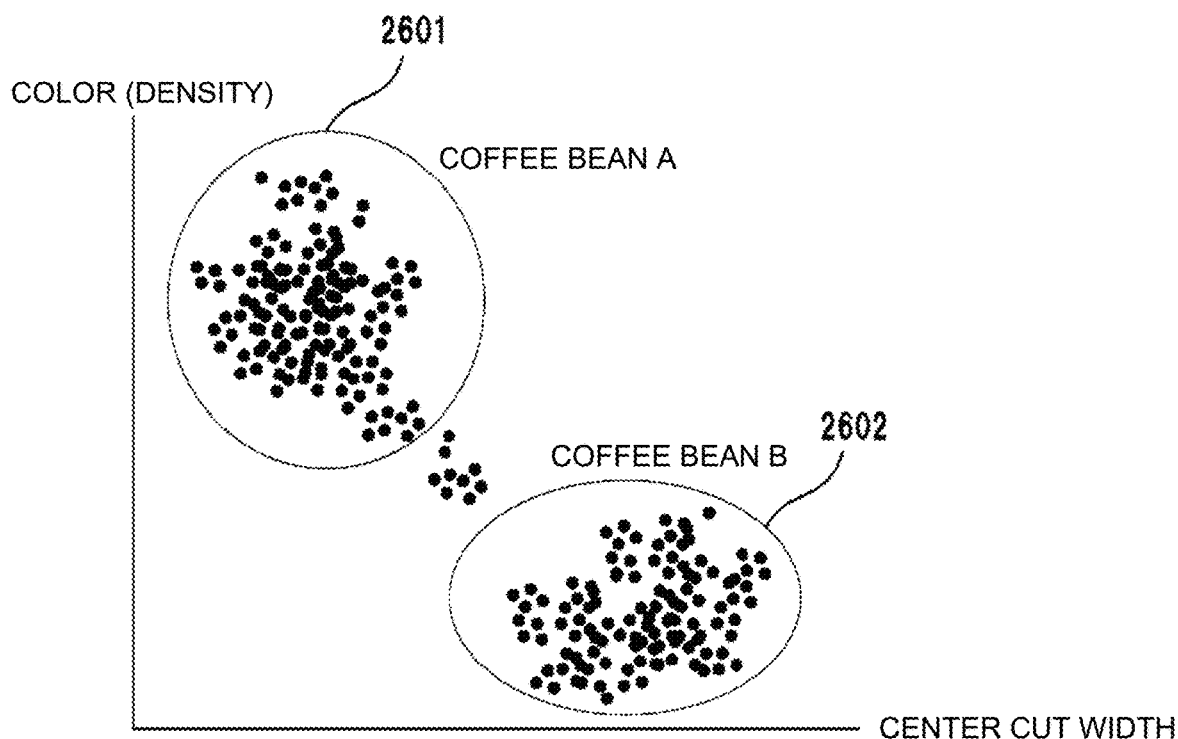
FIG. 25 is a diagram showing measurements of a coffee bean.
FIG. 26 is a diagram for illustrating a classification of measurements.

FIG. 25 is a diagram showing an example of measurements of one coffee bean obtained from the photograph data. Identification information 2501 is information for identifying the coffee bean in the photograph data. A measurement 2502 is the center cut length 2408, and a measurement 2504 is the center cut width 2405. A measurement 2505 is the center cut end width 2407, and a measurement 2506 is the screen size 2406. A measurement 2502 is a value that represents the contour shape. In this embodiment, the contour shape is defined as "screen size 2406/center cut length 2408" (that is, ellipticity). A measurement 2507 is a value that represents the center cut shape. In this embodiment, the center cut shape is defined as "center cut width 2405/center cut end width 2407" (that is, degree of thinness). The contour shape and the center cut shape can be calculated in a different manner than described above as far as the contour shape and the center cut shape define a characteristic of the shape of the coffee bean. A measurement 2508 is the color information on the front face 2401 or the back face 2410.

Once each coffee bean is measured in the photograph data in Step S2301, in Step S2302, the data processing part 1307 analyzes the measurements.

As described above with reference to FIG. 22, the photograph data shows a large number of coffee beans, which may be a blend of a plurality of types of coffee beans. For example, when the coffee beans are a blend of two types of coffee beans, the measurements obtained from the photograph data can be generally classified into two types. FIG. 26 is a diagram for illustrating that the measurements can be generally classified into two types. In FIG. 26, each black dot corresponds to measurements of one coffee bean. FIG. 26 shows a distribution of measurements of coffee beans obtained from photograph data in a space defined by two axes indicating two indices, color (density) and center cut width 2405, for example. As shown in FIG. 26, the distribution of the measurements can be classified into a group 2601 and a group 2602. That is, it can be estimated that the coffee beans shown in the photograph data are a blend of coffee beans A that have smaller center cut widths 2405 and darker colors (which correspond to the group 2601) and coffee beans B that have greater center cut widths 2405 and lighter colors (which correspond to the group 2602). Although classification of measurements in a space defined by two axes indicating two indices has been described with reference to FIG. 26, the measurements may be classified in a space defined by three or more axes.

Once the measurements are analyzed in Step S2302, in Step S2303, the data processing part 1307 extracts a feature value.

FIG. 27 is a diagram for illustrating extraction of feature values. In each group of measurements classified, feature values are extracted. Identification information 2701 is information for identifying photograph data and is a user name, for example. Identification information 2702 and 2710 are information for identifying a group of measurements classified. For example, the identification information 2702 corresponds to the group 2601 in FIG. 26, and the identification information 2710 corresponds to the groups 2602 in FIG. 26.

Feature values 2703, 2704, 2705, 2706, 2707, 2708 and 2709 are feature values for the group (Bean0001) identified by the identification information 2702. The feature value is a value derived from a plurality of measurements in each group and is an average value or median of the measurements in each group, for example. Specifically, the feature value 2703 is an average value or median concerning the contour shape for the group Bean0001, for example. The feature value 2704 is an average value or median concerning the center cut length 2408. The feature value 2705 is an average value or median concerning the center cut width 2405. The feature value 2706 is an average value or median concerning the center cut end width 2407. The feature value 2707 is an average value or median concerning the screen size 2406. The feature value 2708 is an average value or median concerning the center cut shape. The feature value 2709 is an average value or median concerning the color information.

Feature values 2711, 2712, 2713, 2714, 2715, 2716 and 2717 are feature values for the group (Bean0002) identified by the identification information 2710. Each feature value is the same as the corresponding feature value for the group Bean0001 described above. Although the feature value has been described as an average value or median, the feature value may be another statistical value. The information shown in FIG. 27 is not limited to the feature values described above but may include the ratio between the groups (such as 20% of Bean0001 and 80% of Bean0002).

Once the feature values are extracted in Step S2303, the process in FIG. 23 ends, and in Step S2103 in FIG. 21, the data processing part 1307 estimates the properties of the coffee beans.

Figure 28:
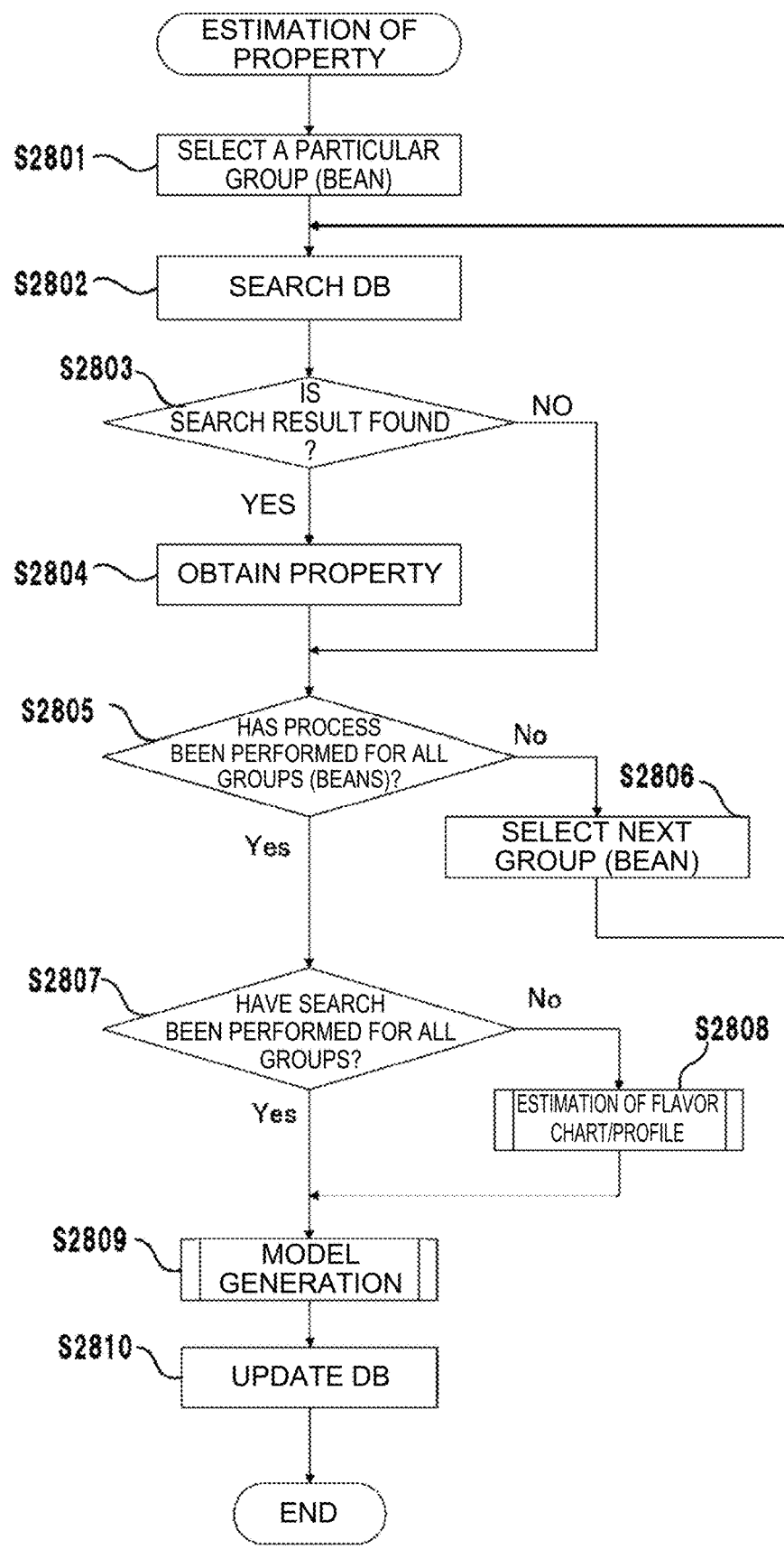
FIG. 28 is a flowchart showing a process of estimating the properties of coffee beans.

FIG. 28 is a flowchart showing a process of estimating the properties. In Step S2801, the data processing part 1307 selects a particular group from the plurality of groups (such as Bean0001) shown in FIG. 27. In this example, it is supposed that the group Bean0001 is selected. In Step S2802, the data processing part 1307 refers to the database 1309 to search for a data set of a coffee bean that corresponds to the feature values 2703 to 2709. In the search, for example, a data set that matches each feature value within a predetermined range is searched for. The database 1309 stores feature values of coffee beans and data indicating properties of coffee beans linked with the types of the coffee beans. The data indicating properties of coffee beans includes breed, producing area, degree of roasting (degree of processing), days from roasting, flavor chart, and extraction profile, for example. The flavor chart indicates the intensities of aroma, sweetness, bitterness, sour taste and richness in three grades.

In Step S2803, the data processing part 1307 determines whether or not a data set of a coffee bean that corresponds to the feature values 2703 to 2709 is found. If it is determined that such a data set is found, the process proceeds to Step S2804, and if it is determined that such a data set is not found, the process proceeds to Step S2805. In Step S2804, the data processing part 1307 obtains data indicating the properties of the coffee bean from the data set of the coffee bean.

In Step S2805, the data processing part 1307 determines whether or not the process described above has been performed for all the groups. In this example, the group Bean0002 in FIG. 27 is yet to be treated, it is determined that the process has not been performed for all the groups yet, and the process proceeds to Step S2806. In Step S2806, the data processing part 1307 selects the next group (Bean0002), and repeats the process from Step S2802 for the group.

In Step S2802, the data processing part 1307 refers to the database 1309 to search for a data set of a coffee bean that corresponds to the feature values 2711 to 2717. In Step S2803, the data processing part 1307 determines whether or not a data set of a coffee bean that corresponds to the feature values 2711 to 2717 is found. After Step S2804, in Step S2805, it is determined whether or not the process has been performed for all the groups. In this example, it is supposed that the process has been performed for all the groups. Then, the process proceeds to Step S2807.

In Step S2807, the data processing part 1307 determines whether or not the search of the database 1309 in Step S2803 has been performed for all the groups. If the search of the database 1309 has been performed for all the groups, and data indicating properties of a coffee bean has been obtained in Step S2804, the process proceeds to Step S2809, and a model described later is generated. On the other hand, of all the groups, if there is a group for which the search of the database 1309 has not been performed yet, that is, there is a group for which data indicating properties of a coffee bean has not been obtained in Step S2804, the process proceeds to Step S2808, and a flavor chart/profile described later is estimated.

Figure 29:
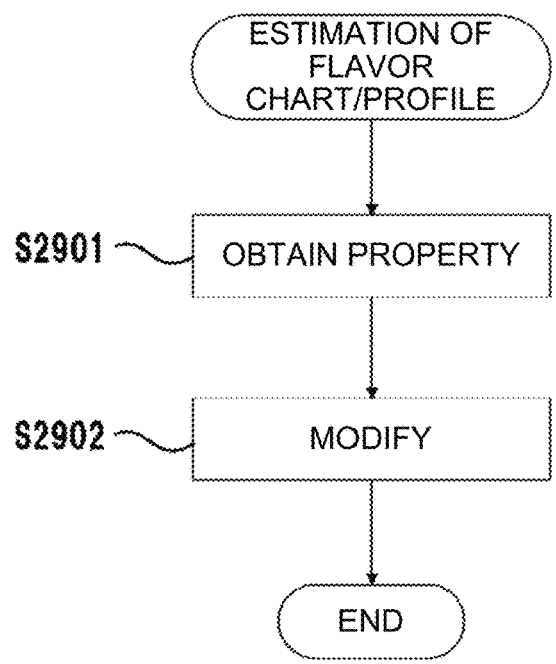
FIG. 29 is a flowchart showing a process of estimating a flavor chart/profile.

FIG. 29 is a flowchart showing a process of estimating a flavor chart/profile in Step S2808. The process in Step S2808 is performed for a group for which the search of the database 1309 cannot be performed and therefore data indicating properties of a coffee bean cannot be obtained. In this example, the process shown in FIG. 29 is performed for the group Bean0002.

In Step S2901, the data processing part 1307 obtains data indicating properties of a coffee bean from the database 1309 based on the feature values 2711 to 2717. The obtaining in this step differs from the obtaining in Step S2804. In Step S2901, for example, for the data set of each coffee bean in the database 1309, a square error of each of the feature values 2711 to 2717 is calculated, and the coffee bean for the data set of which the minimum errors are calculated is determined. In Step S2902, the data processing part 1307 modifies the data indicating the properties of the determined coffee bean. That is, the flavor chart and the extraction profile are modified based on the errors of the feature values 2711 to 2717.

The error is a difference in color information, for example. For example, if the part of the center cut 2404 is whitish compared with the data indicating the properties of the determined coffee bean in the database 1309, the flavor chart is modified by raising the intensity of sour taste. This is because the bean having a whitish center cut part is estimated to be a bean processed in the washed process and tends to be increased in sour taste. To the contrary, if the part of the center cut 2404 is dark compared with the data indicating the properties of the determined coffee bean in the database 1309, the flavor chart is modified by raising the intensity of sweetness or richness. That is, one or both of the flavor chart and the extraction profile is modified by estimating the tendency of the flavor based on the errors. Although the square error is calculated for each of the feature values 2711 to 2717 in the above description, the square error may be calculated for only a predetermined feature value. For example, the square error may be calculated for only the feature values concerning the center cut 2404, which makes a great contribution to the flavor. After Step S2902, the process in FIG. 29 ends, and the process proceeds to Step S2809, where a model is generated.

Figure 30:
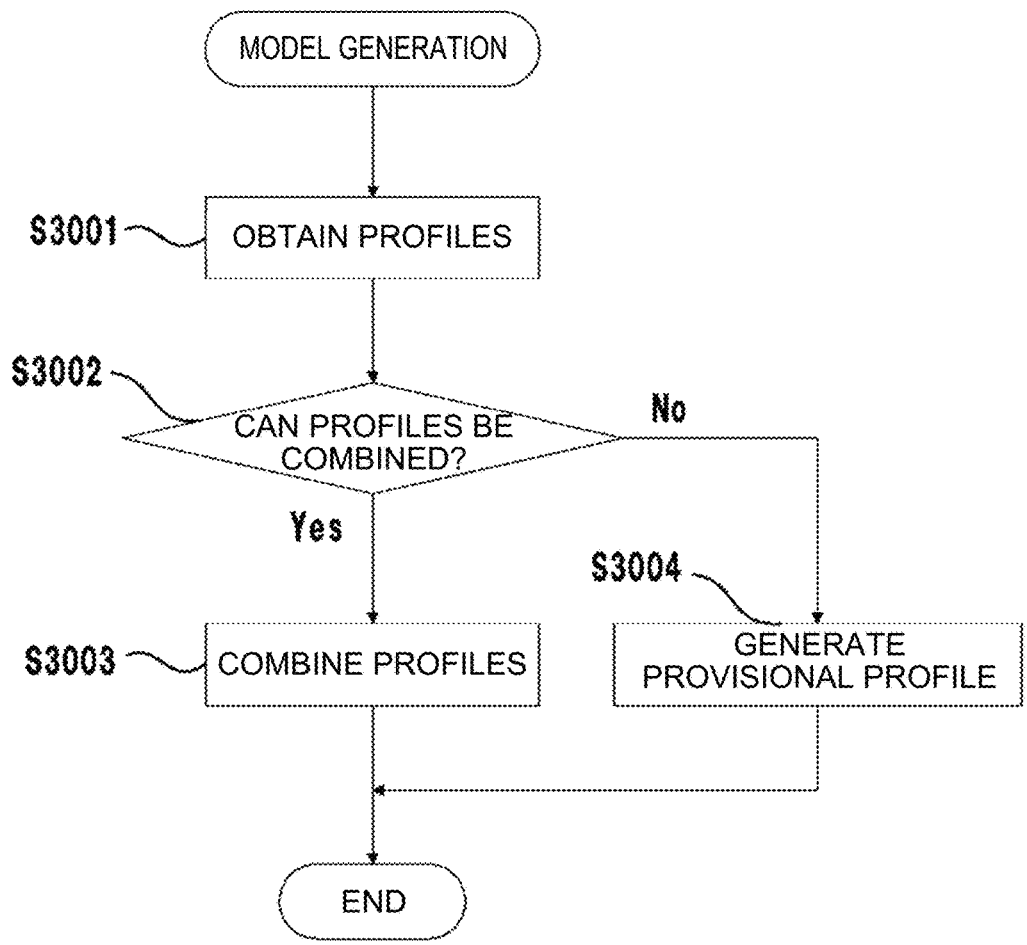
FIG. 30 is a flowchart showing a process of model generation.

FIG. 30 is a flowchart showing a process of model generation in Step S2809. In Step S3001, the data processing part 1307 obtains an extraction profile for each group (such as Bean0001 and Bean0002 in FIG. 27).

In Step S3002, the data processing part 1307 determines whether or not the obtained extraction profiles can be combined with each other in terms of each setting item. The setting items include amount of hot water for steaming, steaming time, amount of hot water for extraction, and extraction time, for example. It is determined that the extraction profiles can be combined with each other if the difference of each setting item between the extraction profiles falls within a predetermined range, that is, if the values of each setting item of the extraction profiles are substantially the same. If it is determined that the extraction profiles can be combined with each other, the process proceeds to Step S3003, where the data processing part 1307 combines the extraction profiles in terms of the setting items. When combining the extraction profiles, an average value, a median or other statistical value of the values of each setting item of the extraction profiles may be used. On the other hand, if it is determined that the extraction profiles cannot be combined with each other, the process proceeds to Step S3004, where the data processing part 1307 provisionally adopts the value of the setting item of any of the extraction profiles. For example, if the difference of the amount of hot water for extraction falls outside the predetermined range, the value of any of the extraction profiles is provisionally adopted.

After Step S3003 or S3004, the process in FIG. 30 ends, and the process proceeds to Step S2810 in FIG. 28.

In Step S2810, the data processing part 1307 stores, as a model, the feature values, the data indicating the properties of the coffee bean (breed and the like, and the flavor chart), and the combined or provisionally generated extraction profile for each group in the photograph data obtained in Step S2101 in the database 1309. After that, the process in FIG. 28 ends.

According to this embodiment, as described above, from the photograph data of coffee beans brought to a shop such as a cafe by a general user, the properties of the coffee beans can be estimated. In the database 1309 of the storage part 1303 of the server 1201, not only the models for known types of coffee beans but also models for coffee beans brought by general users are accumulated. With such a configuration, big data of models of coffee beans blended in a wide variety of combinations is built in the database 1309, and the reliability of the estimation of the properties of coffee beans can be further increased.

Second Embodiment

In this embodiment, a configuration for providing a display on the information display device 1203 based on the properties of coffee beans brought to the shop such as a cafe by a general user estimated from the photograph data of the coffee beans will be described. The following description will be focused on the differences from the first embodiment.

Figure 31:
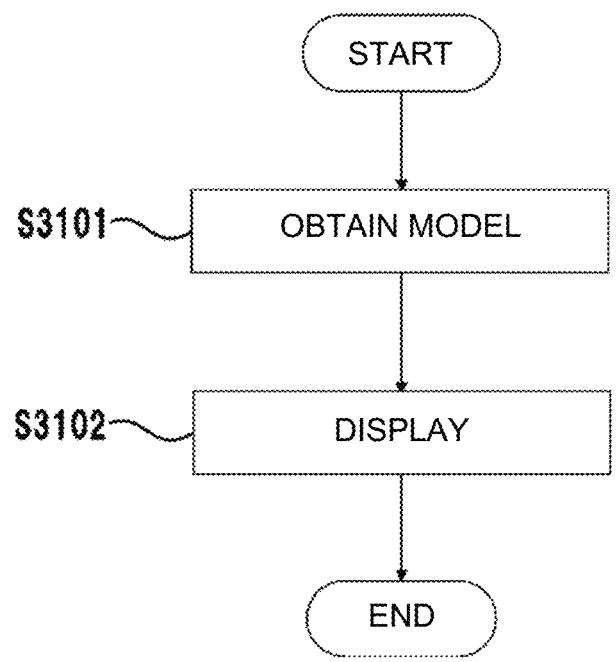
FIG. 31 is a flowchart showing a display process.

FIG. 31 is a flowchart showing a process of providing a display based on properties of a coffee bean estimated from photograph data. The process in FIG. 31 is achieved by the processing part 1501 of the information display device 1203 loading a program stored in the storage part 1503 to the memory 1502 and executing the program, for example.

In Step S3101, the processing part 1501 obtains the model generated in Step S2809 and stored in the database 1309 in Step S2810 from the server 1201 over the network 1205. What is obtained as the model in this step includes the feature values, the data indicating the properties of the coffee beans (breed and the like, and the flavor chart), and the combined or provisionally generated extraction profile for each group in the photograph data obtained in Step S2101.

In Step S3102, the processing part 1501 provides a display based on the obtained model. After Step S3102, the process in FIG. 31 ends.

Figure 32:
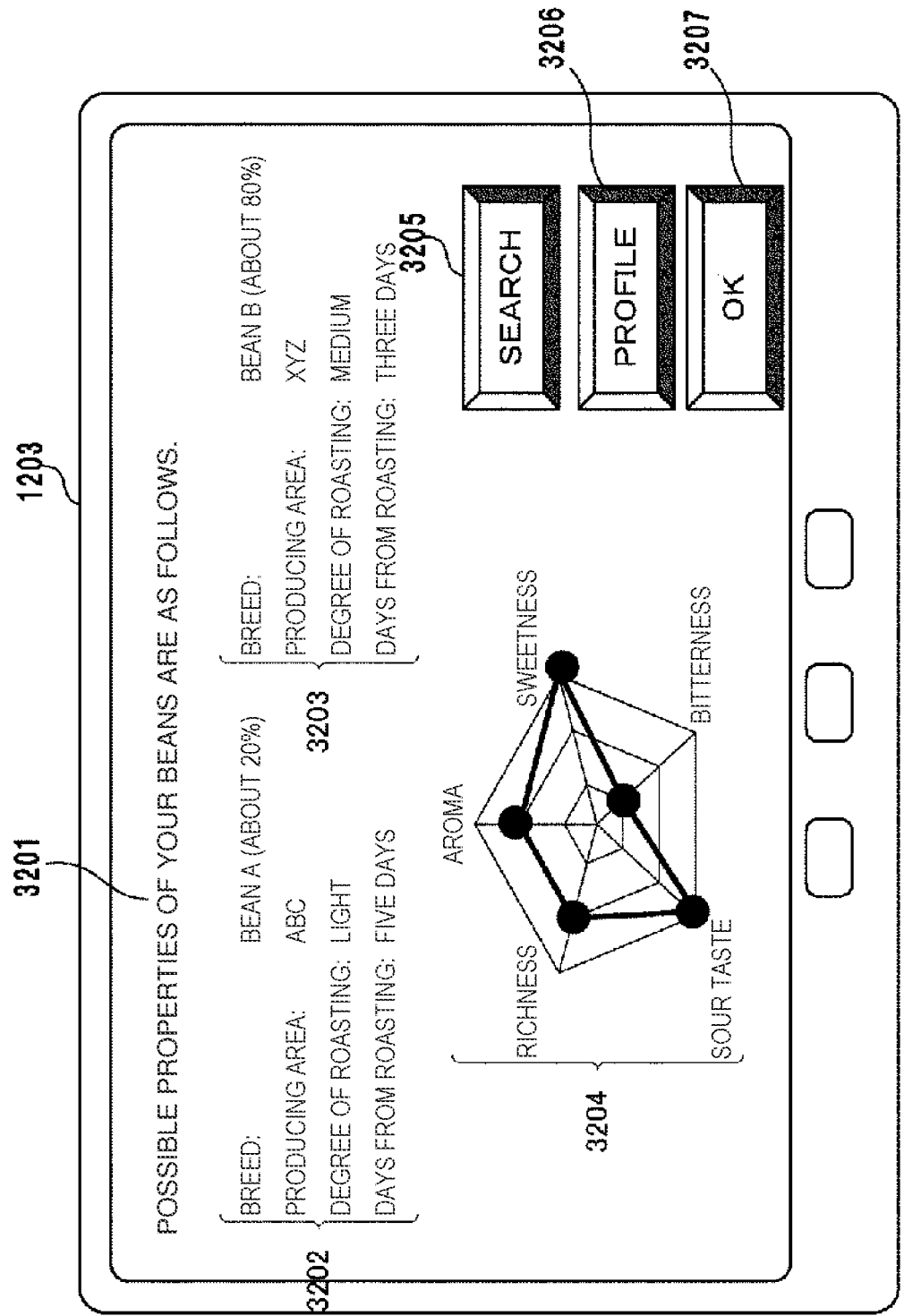
FIG. 32 is a diagram showing a user interface screen displayed on the information display device.

FIG. 32 is a diagram showing an example of a user interface screen displayed based on the obtained model. The screen shown in FIG. 32 is displayed based on the photograph data of the coffee beans brought to the store such as a cafe by a general user, so that a field 3201 displays a message "POSSIBLE PROPERTIES OF YOUR BEANS ARE AS FOLLOWS", for example.

As a result of the analysis of the photograph data, if the coffee beans brought by the general user are a blend of coffee beans A and coffee beans B, fields 3202 and 3203 display information based on the data indicating the properties of the coffee beans obtained for the respective groups. In FIG. 32, the fields 3202 and 3203 display information on the groups for which the properties have been able to be obtained in Step S2804. For any group for which the properties have not been able to be obtained, it is typically difficult to estimate specific information such as breed, producing area, degree of roasting and days from roasting, although the flavor chart and the extraction profile are estimated in Step S2808. Therefore, for such a group, the fields 3202 and 3203 may display a mark such as "-". Alternatively, the specific information may be estimated. For example, the degree of roasting can be estimated from the feature values.

In FIG. 32, a flavor chart 3204 is displayed. For example, of the coffee beans blended, the flavor chart for the coffee beans forming the larger proportion may be displayed. In FIG. 32, the flavor chart for the coffee beans B displayed in the field 3203 is displayed. Alternatively, the flavor charts for both the displayed coffee beans, that is, the coffee beans displayed in the fields 3202 and 3203 in the case shown in FIG. 32, may be displayed.

A button 3205 is a button for searching for coffee beans that have a flavor chart closest to the flavor chart 3204. When a button 3206 is pressed, an extraction profile screen described later is displayed. When a button 3207 is pressed, the display shown in FIG. 32 is exited, and a predetermined main screen or the like of the information display device 1203 is displayed again.

Figure 33:
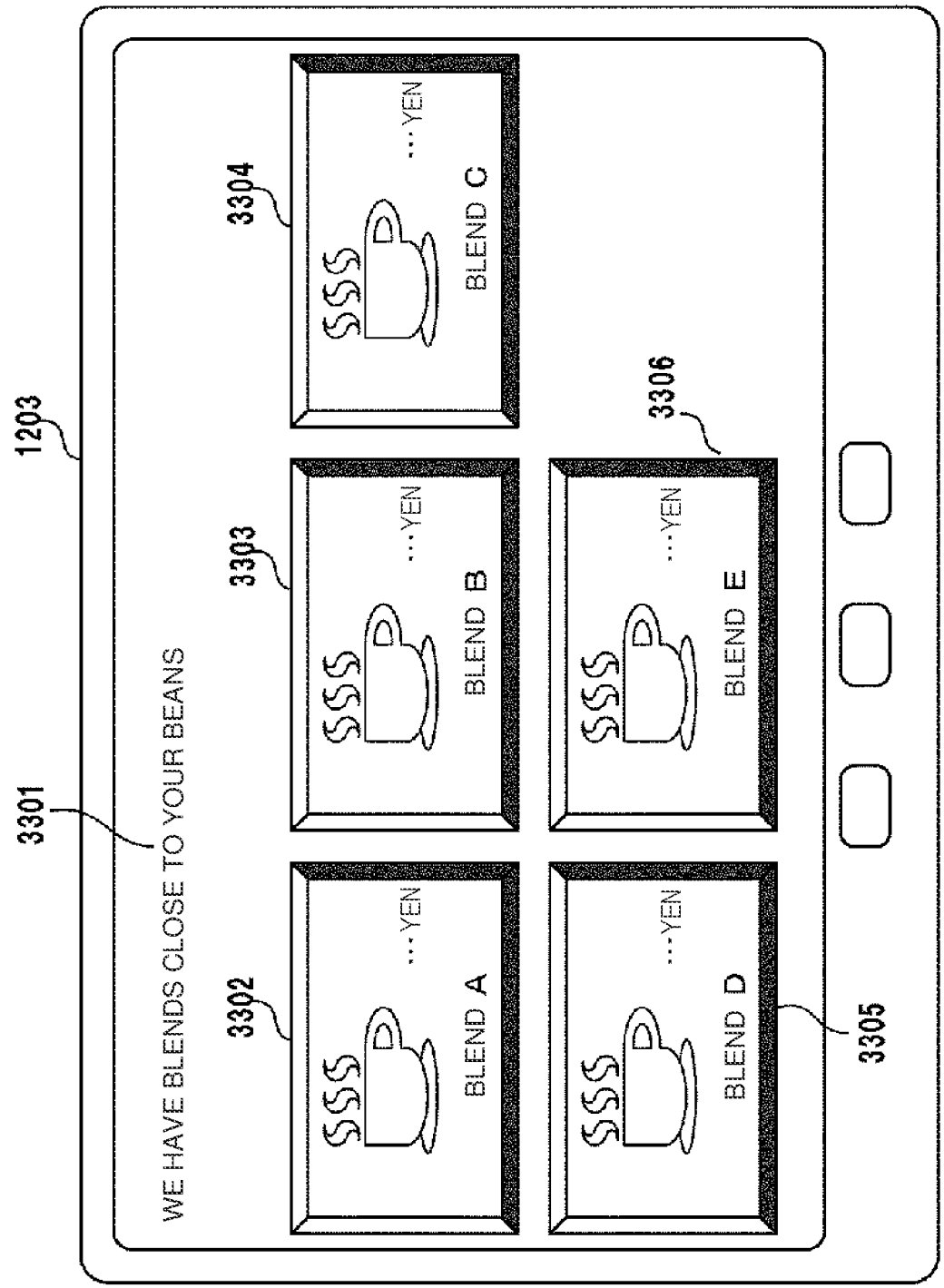
FIG. 33 is a diagram showing a user interface screen displayed on the information display device.

FIG. 33 is a diagram showing an example of a user interface screen displayed when the button 3205 (SEARCH) is pressed. The storage part 1503 of the information display device 1203 stores the types of coffee beans and the data indicating the properties of the coffee beans linked to each other. When the button 3205 is pressed, the processing part 1501 displays a list of coffee beans whose properties, such as tendencies of flavor charts, are closest to the model obtained in Step S3101. FIG. 33 shows fields 3302, 3303, 3304, 3305 and 3306 in a selectable manner.

Figure 34:
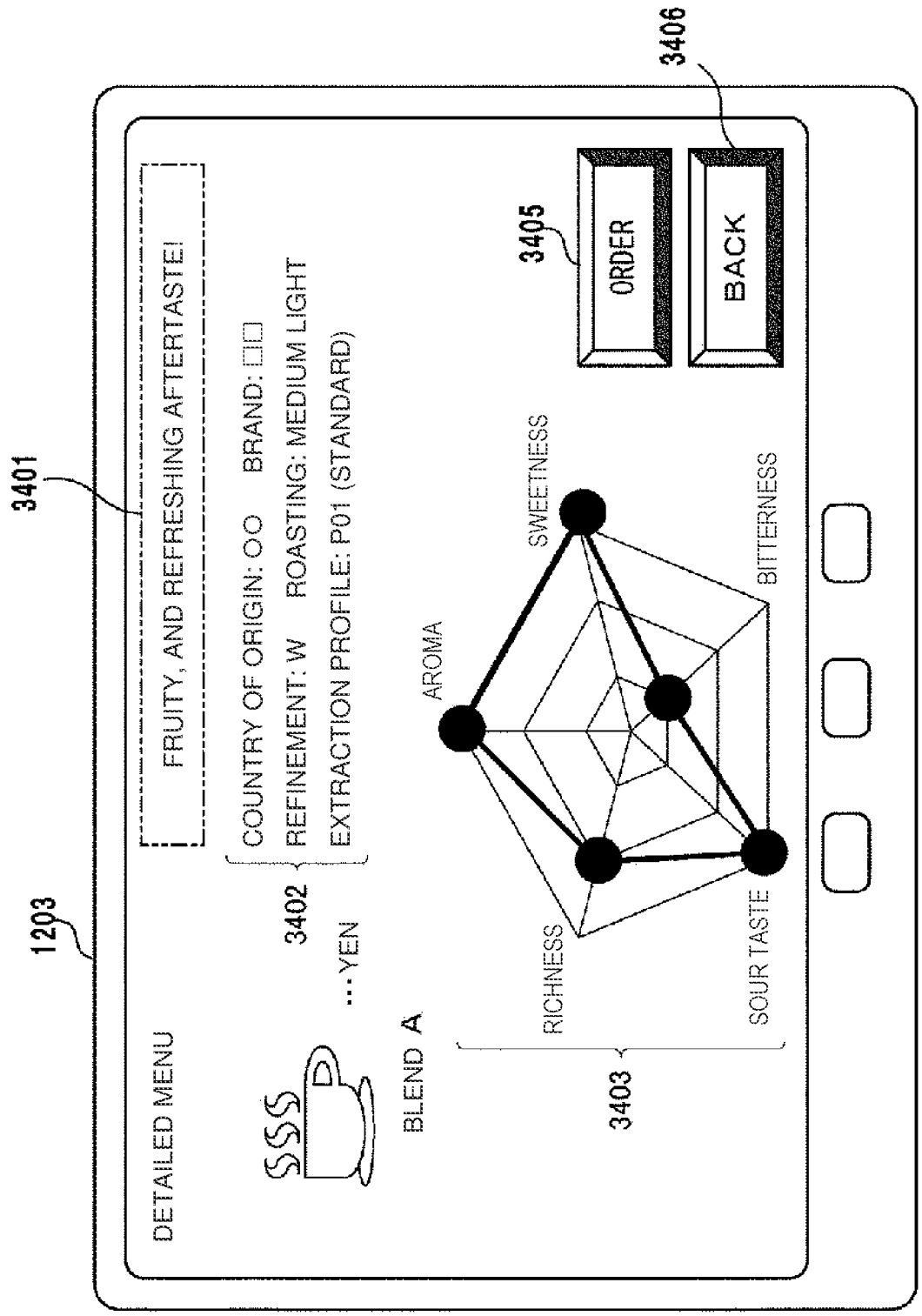
FIG. 34 is a diagram showing a user interface screen displayed on the information display device.

FIG. 34 is a diagram showing an example of a user interface screen displayed when the field 3302 is pressed. If another field is selected on the screen shown in FIG. 33, information on the properties of the selected coffee beans is similarly displayed. A field 3401 displays a phrase suggesting characteristics of the selected coffee beans, and a field 3402 displays information on the properties of the selected coffee beans. A field 3403 displays the flavor chart for the selected coffee beans. A button 3405 is a button to accept an order from the user. When the button 3405 is pressed, the processing part 1501 instructs the control device 11 to perform the process for the selected coffee beans up to the discharge thereof (see FIGS. 11(A) and 11(B)). When a button 3406 is pressed, the screen shown in FIG. 33 is displayed again. The flavor chart shown in the field 3403 may be displayed in the manners described below. Although each index in the flavor chart is represented by a dot and a line (that is, indicated by a value) in FIG. 34, each index may be represented by a bar or the like indicating a predetermined range of values, thereby displaying a possible range of indices of the selected coffee beans. When providing such a display, the range of variation of each index may be determined in advance based on the range in which each setting item of the extraction profile linked with the coffee beans can be changed, and the display may be provided based on the determined information. Alternatively, the possible range of each index of the selected coffee beans may be displayed in such a manner that a recommendable section of the range can be distinguished. For example, the range of variation of each index may be determined based on the range in which each setting item of the extraction profile linked with the selected coffee beans can be changed, and a recommendable section of the range of variation may be determined in advance by a barista or the like. Then, the display may be provided based on the determined information. By displaying the flavor chart in the field 3403 in the manners described above, the general user can intuitively recognize the range in which the flavor of the selected coffee beans is not ruined. Furthermore, the flavor chart displayed in the various manners described above may be configured to accept a specification from the user. For example, a specification of each index is accepted from the user within the range of the index indicated by a bar, and data of the extraction profile corresponding to the data set of the indices may be obtained from the storage part or the like of the device shown in FIG. 12 and displayed. With such a configuration, for example, if the user wants to raise the intensity of bitterness, the user can obtain information on an extraction profile that does not ruin the flavor by making a specification to raise the intensity of bitterness on the flavor chart.

Figure 35:
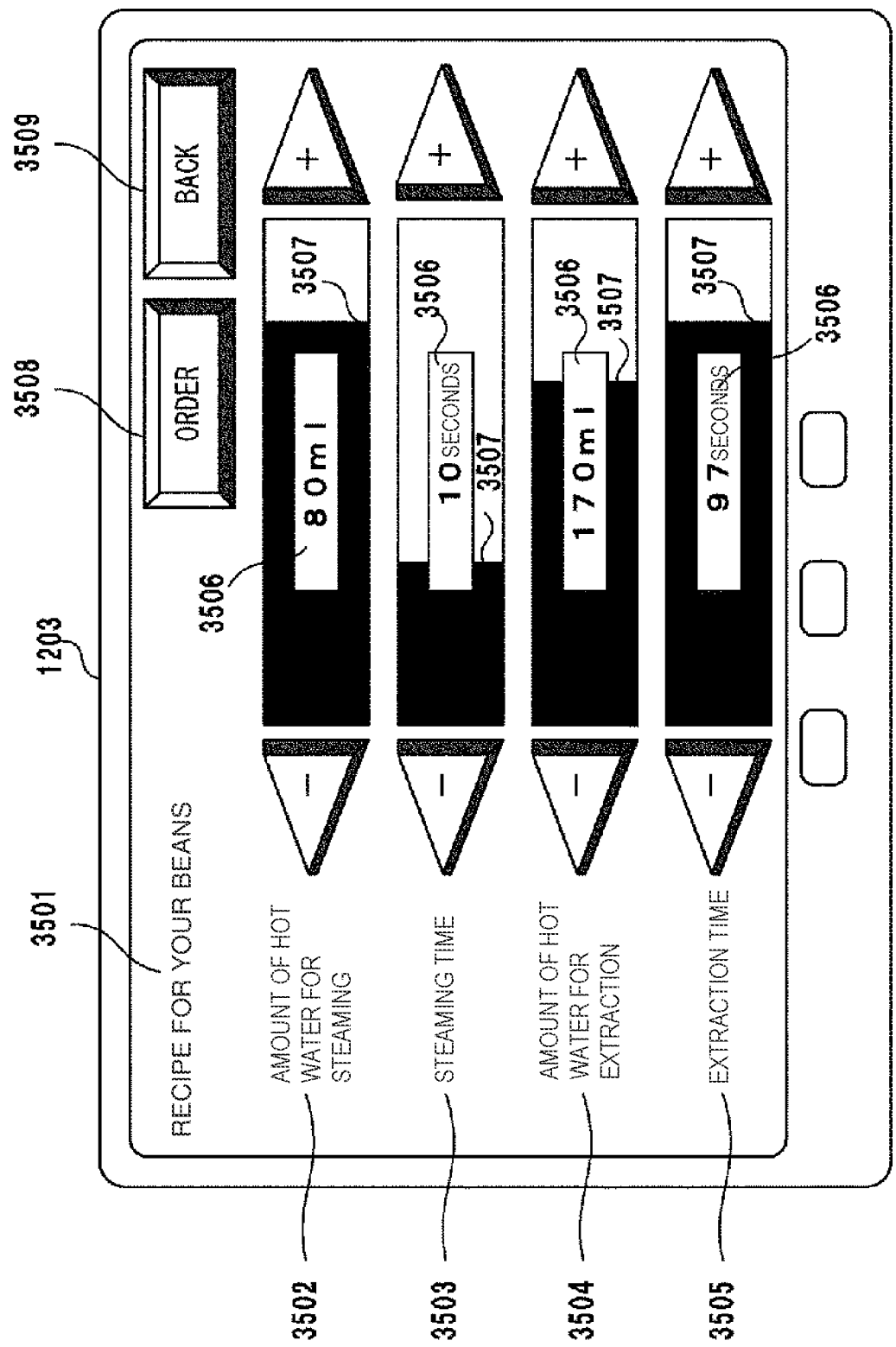
FIG. 35 is a diagram showing a user interface screen displayed on the information display device.

FIG. 35 is a diagram showing an example of a user interface screen displayed when the button 3206 (PROFILE) in FIG. 32 is pressed. FIG. 35 shows a screen for a model generated by combining extraction profiles for different groups with each other in Step S3003 in FIG. 30 after it is determined in Step S3002 that the extraction profiles can be combined with each other. A field 3501 displays a message "RECIPE FOR YOUR BEANS", and the general user can see an extraction profile of the coffee beans brought by the user. As setting items of the extraction profile, a field 3502 (amount of hot water for steaming), a field 3503 (steaming time), a field 3504 (amount of hot water for extraction), and a field 3505 (extraction time) are displayed. However, the present invention is not limited to these fields, and another field for extraction pressure or the like may be displayed. The setting item in each field can be adjusted by a user operation via a plus button and a minus button. As shown in FIG. 35, each field contains two kinds of display areas, a numerical display area 3506 and an analog display area 3507. The numerical display area 3506 displays a value, such as 80 ml, and the analog display area 3507 displays a slide bar. Such a display can allow the user to recognize the numerical value of 80 ml and to intuitively recognize that the amount is 80% of the maximum amount within which the user can adjust the amount in the field 3502, for example. A button 3508 is a button for accepting an order from the user. When a button 3509 is pressed, the screen shown in FIG. 32 is displayed again. Although FIG. 35 shows a screen displaying an extraction profile for coffee beans brought by a general user, the screen may provide the display described below. That is, the screen shown in FIG. 35 may display profile information that can be used for another coffee machine (such as a home coffee machine). To this end, for example, a "convert" button is displayed on the screen shown in FIG. 35. When the general user presses the "convert" button, profile information (such as amount of hot water for extraction or extraction time) that can be used for another coffee machine is generated based on the information on the extraction profile shown in FIG. 35 and displayed. The information displayed may be output as a data file that can be shared and used by the coffee machines. If another coffee machine uses such a data file, the other coffee machine can easily reproduce the brewing of coffee without ruining the flavor of the coffee beans provided by the extraction profile shown in FIG. 35, even if the extraction mechanism of the other coffee machine differs from that of the beverage making apparatus 1204. The profile information generated from the extraction profile of the beverage making apparatus 1204 may take the dripping operation at home into account, and may include amount of hot water for steaming, steaming time, interval time, amount of hot water for extraction in each of a predetermined number of extraction operations, extraction time, and interval time.

Figure 36:
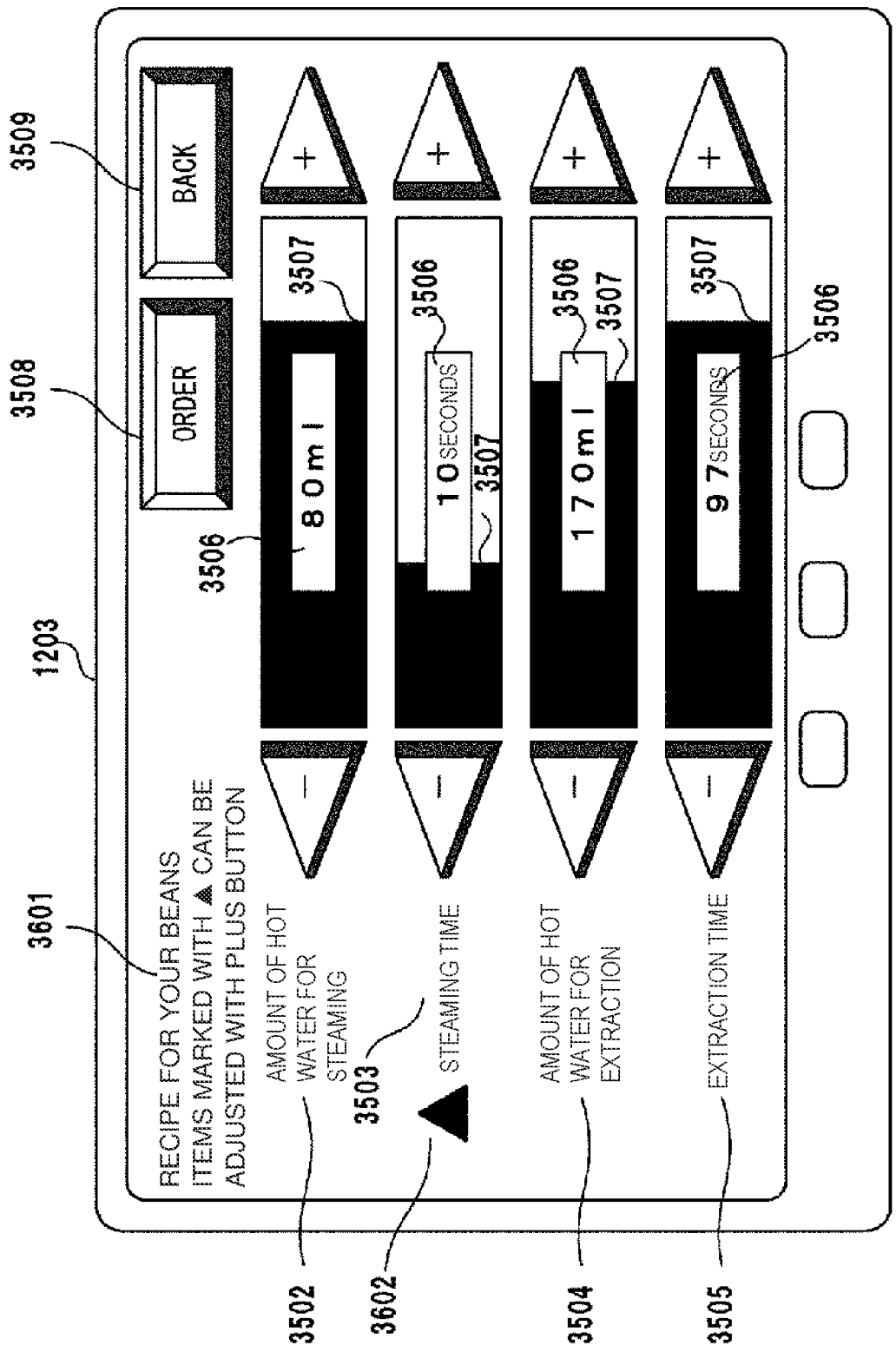
FIG. 36 is a diagram showing a user interface screen displayed on the information display device.

FIG. 36 is a diagram showing an example of a user interface screen displayed when the button 3206 (PROFILE) shown in FIG. 32 is pressed. FIG. 36 shows a screen for a model generated by provisionally generating an extraction profile in Step S3004 in FIG. 30 after it is determined in Step S3002 that the extraction profiles for different groups cannot be combined with each other. A field 3601 displays a message "ITEMS MARKED WITH ▲ CAN BE ADJUSTED WITH PLUS BUTTON" in addition to the message "RECIPE FOR YOUR BEANS". This is because, as described with regard to Step S3004, the values of the items of any of the extraction profiles, such as amount of hot water for extraction, have been provisionally adopted and therefore may not fit the taste of the general user who has brought the coffee beans. Therefore, a mark 3602 is displayed along with the item the value of which has been provisionally adopted, thereby recommending the general user to adjust the value of the item.

In Step S3004, if 150 ml has been provisionally adopted from among 150 ml and 170 ml as the amount of hot water for extraction, the field 3601 displays a message to prompt the user to make an adjustment to increase the amount (in the positive direction). On the other hand, in the same example, if 170 ml has been provisionally adopted, the field 3601 displays a message to prompt the user to make an adjustment to decrease the amount (in the negative direction).

Figure 37:
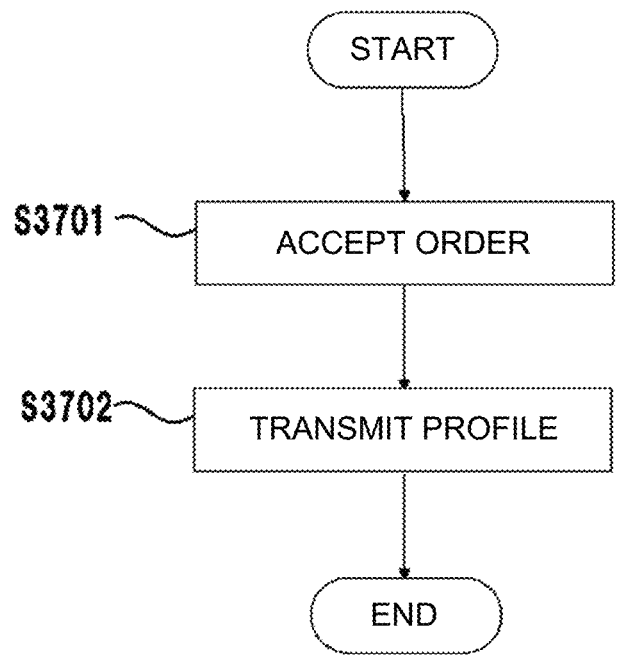
FIG. 37 is a flowchart showing a process of transmitting a extraction profile.

FIG. 37 is a flowchart showing a process that occurs when the button 3508 (ORDER) is pressed. The process shown in FIG. 37 is achieved by the processing part 1501 of the information display device 1203 loading a program stored in the storage part 1503 to the memory 1502 and executing the program, for example. In Step S3701, the processing part 1501 accepts the pressing of the button 3508. In Step S3702, the processing part 1501 then transmits information on the extraction profile to the server 1201 over the network 1205. After that, the process shown in FIG. 37 ends. When transmitting the information on the extraction profile, information for identifying the coffee beans or the user is also transmitted.

Figure 38:
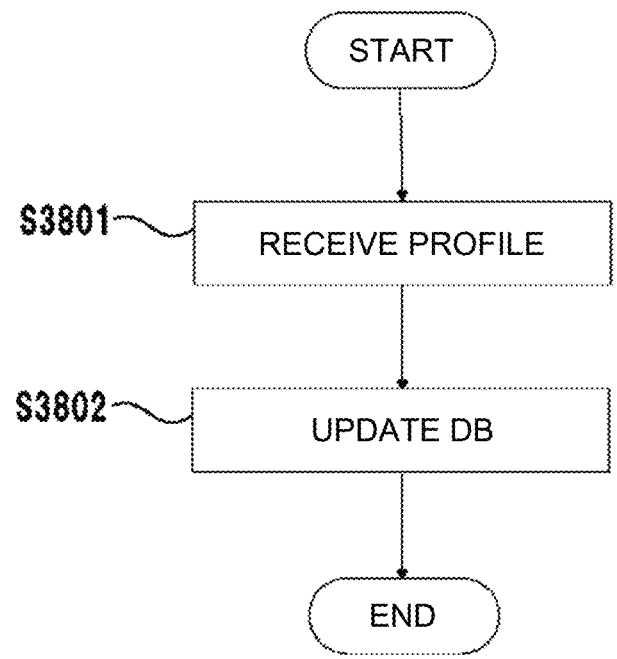
FIG. 38 is a flowchart showing a process of updating a database.

FIG. 38 is a flowchart showing a process that occurs in the server 1201 when the process shown in FIG. 37 occurs. The process shown in FIG. 38 is achieved by the processing part 1301 of the server 1201 loading a program stored in the storage part 1303 to the memory 1302 and executing the program, for example. In Step S3801, the processing part 1301 receives the information on the extraction profile from the information display device 1203 over the network 1205. In step S3802, the processing part 1301 updates the database 1309, which has already stored an extraction profile in Step S2810, with the received information on the extraction profile. After that, the process shown in FIG. 38 ends. Alternatively, in Step S3802, the extraction profile already stored in Step S2810 may not be updated with the received extraction profile, and the received extraction profile may be separately stored. With such a configuration, a plurality of extraction profiles can be retained for the estimated properties of the coffee beans.

According to the processes shown in FIGS. 37 and 38, an extraction profile for the coffee beans brought to the shop by the general user that more accurately reflects the taste of the user can be stored in the database 1309 of the server 1201.

Figure 39:
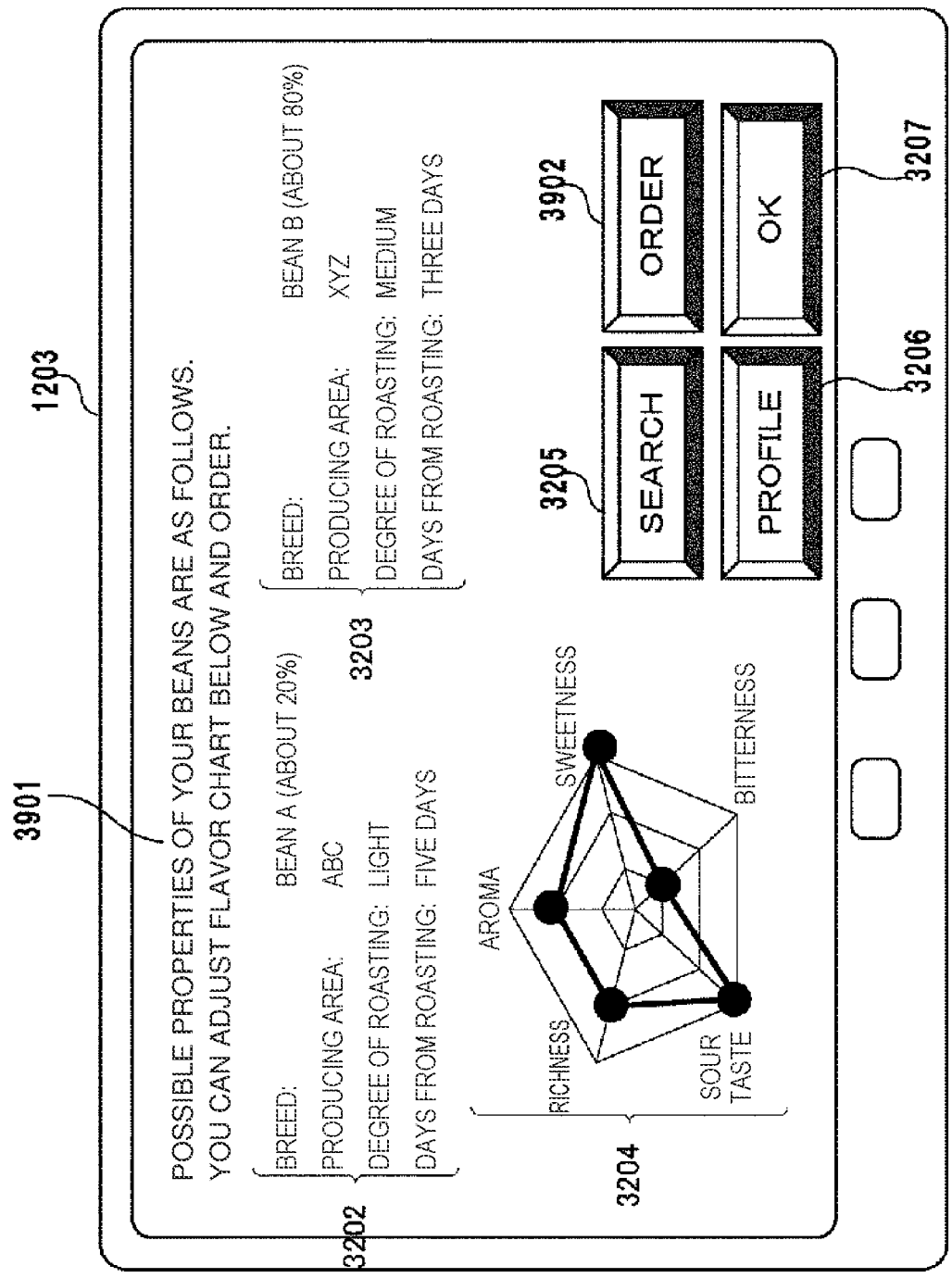
FIG. 39 is a diagram showing a user interface screen displayed on the information display device.

FIG. 39 is a diagram showing another example of the screen shown in FIG. 32. A field 3901 displays a message "YOU CAN ADJUST FLAVOR CHART BELOW AND ORDER" in addition to the message "POSSIBLE PROPERTIES OF YOUR BEANS ARE AS FOLLOWS". The flavor chart 3204 can be adjusted by a user operation. A button 3902 is a button for accepting an order from the general user. For example, if the general user raises the intensity of bitterness on the flavor chart 3204 and presses the button 3902, an extraction profile adjusted in amount of hot water to raise the intensity of bitterness is generated. The processing part 1501 instructs the control device 11 to perform the process shown in FIGS. 11(A) and 11(B) based on the extraction profile.

According to this embodiment, as described above, the information display device 1203 can provide a display based on the properties of the coffee beans brought to a shop such as a cafe by a general user estimated from the photograph data of the coffee beans. In addition, the taste of the general user can be reflected in the database 1309 of the server 1201.

Other Embodiments

Although only a coffee beverage has been described in the embodiments described above, the present invention can be applied to other various beverages, including teas such as green tea and black tea and soups. Furthermore, the extract has been described as being extracted from coffee beans, raw coffee beans, ground coffee beans, roasted coffee beans, ground roasted coffee beans, unroasted coffee beans, ground unroasted coffee beans, coffee bean powder, instant coffee, or coffee beans in a pod, for example, a coffee beverage has been described as an example of the beverage, and coffee liquid has been described as an example of the extract. However, the present invention is not limited to these. The extract may be extracted from any food, including tea leaves of green tea, black tea, oolong tea or the like, ground tea leaves, vegetables, ground vegetables, fruits, ground fruits, grains, ground grains, mushrooms such as Shiitake mushroom, ground mushrooms such as Shiitake mushroom, dried heated mushrooms such as Shiitake mushroom, ground dried heated mushrooms such as Shiitake mushroom, fishes such as skipjack tuna, ground fishes such as skipjack tuna, dried heated fishes such as skipjack tuna, ground dried heated fishes such as skipjack tuna, seaweeds such as Kombu seaweed, ground seaweeds such as Kombu seaweed, dried heated seaweeds such as Kombu seaweed, ground dried heated seaweeds such as Kombu seaweed, dried heated meat such as beef, pork or chicken, ground dried heated meat, dried heated bones such as beef bones, pork bones or chicken bones, and ground dried heated bones. The beverage may be any beverage, including green tea, black tea, oolong tea, vegetable juice, fruit juice, broth and soup. The extract may be any extract, including green tea extract, black tea extract, oolong tea extract, vegetable extract, fruit extract, mushroom extract, fish extract, meat extract, and bone extract. In the description of the embodiments, water, tap water, purified water, hot water and cleaned water have been mentioned, and any of these words may be replaced with another word. For example, the word "water" may be replaced with the word "hot water", or the word "hot water" may be replaced with the word "water". Furthermore, all of these words may be replaced with a word "liquid", "steam", "high temperature water", "cooled water" or "cold water". For example, a description that a material from which extract is to be extracted (such as ground roasted coffee beans) and hot water are put in the extraction vessel 9 may be rewritten as "a material from which extract is to be extracted (such as ground roasted coffee beans) and cold water (or, simply, water) are put in the extraction vessel 9". In the latter case, the extraction method and the beverage making apparatus according to the present invention can be considered as an extraction method and a beverage making apparatus for cold brew coffee.

Summary of Embodiments

An apparatus according to this embodiment includes photograph data obtaining means for obtaining photograph data of an ingredient of a beverage used for preparation of the beverage (S2101); and estimation means for estimating a property of the ingredient of the beverage based on the photograph data obtained by the photograph data obtaining means (S2103). The apparatus further includes extraction means for extracting a feature value of the ingredient of the beverage from the photograph data (S2102), and the estimation means estimates the property of the ingredient of the beverage from the feature value extracted by the extraction means. With such a configuration, for example, the properties of a coffee bean can be estimated from a photograph of the coffee bean.

The ingredient of the beverage is a bean, and the feature value includes at least any of a shape and a size of the bean. With such a configuration, for example, the feature value can be the shape or size of a coffee bean.

The apparatus further includes storage means (1303) for storing a result of the estimation by the estimation means, and the estimation means is capable of estimating the property of the ingredient of the beverage from an estimation result previously stored in the storage means. With such a configuration, an estimation can be made by learning a previous estimation result.

The apparatus further includes display means for displaying a screen corresponding to the result of the estimation by the estimation means (see FIGS. 35 and 36). With such a configuration, for example, the user interface screen can be changed according to the degree of estimation.

The display means displays one or more types of the ingredient of the beverage based on the result of the estimation by the estimation means (see FIG. 32). With such a configuration, for example, property information on a plurality of types of coffee beans blended can be displayed.

The display means displays the property of the ingredient of the beverage in such a manner that the property can be adjusted based on the result of the estimation by the estimation means (see FIGS. 35 and 36). With such a configuration, for example, a flavor chart can be displayed in such a manner that the flavor chart can be adjusted. In addition, the apparatus further includes update means for updating the result of the estimation stored in the storage means when the property of the ingredient of the beverage is adjusted (S3802). With such a configuration, for example, the result of an adjustment of an extraction profile can be reflected in the database.

The result of the estimation stored in the storage means is big data. With such a configuration, for example, an estimation can be made based on property information collected from a large number of users and organized as big data.

The apparatus further includes profile obtaining means for obtaining one or more pieces of profile information that allows the beverage to be produced from the ingredient of the beverage based on the result of the estimation by the estimation means (S3801, S3802). With such a configuration, for example, not only the estimation result but also an extraction profile adjusted by the user can be associated with the coffee beans whose properties are estimated.

The ingredient of the beverage is a coffee bean. In addition, the estimation means estimates the property of the ingredient of the beverage based on a shape of a center cut of the coffee bean. With such a configuration, for example, the properties of coffee beans can be estimated based on the center cuts thereof.

The property of the ingredient of the beverage includes at least any of breed, producing area, degree of processing, and days from processing. With such a configuration, for example, breed, producing area, degree of processing or days from processing can be used as a property.

REFERENCE SIGNS LIST 1, 1204 beverage making apparatus
1200 system
1201 server
1202 mobile terminal
1203 information display device
1301, 1401, 1501 processing part

The invention claimed is:

1. A system that produces a coffee beverage from a coffee bean, the system comprising an apparatus that performs an estimation process and a beverage making apparatus that produces the coffee beverage,
wherein the apparatus that performs an estimation process comprises:
obtaining means for obtaining photograph data of the coffee bean; and
estimation means for estimating a property of the coffee bean based on the photograph data obtained by the obtaining means; and
the beverage making apparatus comprises:
production means for producing the coffee beverage according to a type of coffee bean specified by a user in one or more types of coffee beans based on a result of the estimation by the estimation means.

2. The system according to claim 1, further comprising:
display means for displaying the one or more types of coffee beans based on the result of the estimation by the estimation means.

3. The system according to claim 1, further comprising:
profile obtaining means for obtaining one or more pieces of profile information that allows the beverage to be produced from the coffee bean based on the result of the estimation by the estimation means.

4. The system according to claim 1, wherein the property of the coffee bean includes at least any of breed, producing area, degree of processing, and days from processing.

5. The system according to claim 2, further comprising:
profile obtaining means for obtaining one or more pieces of profile information that allows the beverage to be produced from the coffee bean based on the result of the estimation by the estimation means.

6. The system according to claim 2, wherein the property of the coffee bean includes at least any of breed, producing area, degree of processing, and days from processing.

7. The system according to claim 3, wherein the property of the coffee bean includes at least any of breed, producing area, degree of processing, and days from processing.

8. The system according to claim 5, wherein the property of the coffee bean includes at least any of breed, producing area, degree of processing, and days from processing.

* * * * *